(12) United States Patent
Woodgate et al.

(10) Patent No.: US 9,740,034 B2
(45) Date of Patent: Aug. 22, 2017

(54) CONTROL OF DIRECTIONAL DISPLAY

(71) Applicant: RealD Spark, LLC, Beverly Hills, CA (US)

(72) Inventors: Graham J. Woodgate, Henley-on-Thames (GB); Michael G. Robinson, Boulder, CO (US); Adrian J. Hill, Lyons, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 15/028,694

(22) PCT Filed: Oct. 14, 2014

(86) PCT No.: PCT/US2014/060368
§ 371 (c)(1),
(2) Date: Apr. 25, 2016

(87) PCT Pub. No.: WO2015/057625
PCT Pub. Date: Apr. 23, 2015

(65) Prior Publication Data
US 2016/0252759 A1 Sep. 1, 2016

Related U.S. Application Data

(60) Provisional application No. 61/890,469, filed on Oct. 14, 2013.

(51) Int. Cl.
*G02F 1/1335* (2006.01)
*H04N 13/04* (2006.01)
(Continued)

(52) U.S. Cl.
CPC ......... *G02F 1/1323* (2013.01); *G02B 6/0048* (2013.01); *G02B 27/225* (2013.01);
(Continued)

(58) Field of Classification Search
None
See application file for complete search history.

(56) References Cited

U.S. PATENT DOCUMENTS 1,128,979 A 2/1915 Hess
1,970,311 A 8/1934 Ives
(Continued)

FOREIGN PATENT DOCUMENTS

CN 1142869 A 2/1997
CN 1377453 A 10/2002
(Continued)

OTHER PUBLICATIONS

International search report and written opinion of international searching authority for PCT/US2014/060368 dated Jan. 14, 2015.
(Continued)

*Primary Examiner* — Jerry Rahll
(74) *Attorney, Agent, or Firm* — Penny L. Lowry; Neil G. Mothew

(57) ABSTRACT

Disclosed is a light guiding valve apparatus including an imaging directional backlight, an illuminator array and an observer tracking system arranged to achieve control of an array of illuminators which may provide a directional display to an observer over a wide lateral and longitudinal viewing range, wherein the luminous intensity of optical windows presented to the observer as viewing windows is controlled dependent on the lateral and longitudinal position or speed of an observer. Further an optical window control system may comprise detection of an observer's hand. An image control system may comprise a method to provide an image that can be switched from a first mode with a first brightness into a second mode with a high brightness region
(Continued)

and low brightness region, where the brightness of the second low brightness region is matched to the first brightness.

41 Claims, 48 Drawing Sheets

(51) Int. Cl.
G02B 27/22 (2006.01)
G02F 1/13 (2006.01)
F21V 8/00 (2006.01)

(52) U.S. Cl.
CPC ... *G02F 1/133615* (2013.01); *H04N 13/0411* (2013.01); *H04N 13/0481* (2013.01); *H04N 13/0497* (2013.01)

(56) References Cited

U.S. PATENT DOCUMENTS

| | | | |
|---|---|---|---|
| 2,133,121 A | 10/1938 | Stearns |
| 2,247,969 A | 7/1941 | Lemuel |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,850,580 A | 12/1998 | Taguchi et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,144,118 A | 11/2000 | Cahill et al. |
| 6,172,723 B1 | 1/2001 | Inoue et al. |
| 6,199,995 B1 | 3/2001 | Umemoto et al. |
| 6,219,113 B1 | 4/2001 | Takahara |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Coker et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,798,406 B1 | 9/2004 | Jones et al. |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate et al. |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,415 B2 | 5/2007 | Maehara et al. |
| 7,215,475 B2 | 5/2007 | Woodgate et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,528,893 B2 | 5/2009 | Schultz et al. |
| 7,545,429 B2 | 6/2009 | Travis |
| 7,587,117 B2 | 9/2009 | Winston et al. |
| 7,614,777 B2 | 11/2009 | Koganezawa et al. |
| 7,660,047 B1 | 2/2010 | Travis et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,179,361 B2 | 5/2012 | Sugimoto et al. |
| 8,216,405 B2 | 7/2012 | Emerton et al. |
| 8,223,296 B2 | 7/2012 | Lee et al. |
| 8,251,562 B2 | 8/2012 | Kuramitsu et al. |
| 8,325,295 B2 | 12/2012 | Sugita et al. |
| 8,354,806 B2 | 1/2013 | Travis et al. |
| 8,477,261 B2 | 7/2013 | Travis et al. |
| 8,502,253 B2 | 8/2013 | Min |
| 8,534,901 B2 | 9/2013 | Panagotacos et al. |
| 8,556,491 B2 | 10/2013 | Lee |
| 8,651,725 B2 | 2/2014 | Ie et al. |
| 8,714,804 B2 | 5/2014 | Kim et al. |
| 8,752,995 B2 | 6/2014 | Park |
| 8,760,762 B1 | 6/2014 | Kelly et al. |
| 9,197,884 B2 | 11/2015 | Lee et al. |
| 9,350,980 B2 | 5/2016 | Robinson et al. |
| 9,519,153 B2 | 12/2016 | Robinson et al. |
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |

(56) References Cited

U.S. PATENT DOCUMENTS

| | | |
|---|---|---|
| 2002/0113866 A1 | 8/2002 | Taniguchi et al. |
| 2003/0046839 A1 | 3/2003 | Oda et al. |
| 2003/0117790 A1 | 6/2003 | Lee et al. |
| 2003/0133191 A1 | 7/2003 | Morita et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0105264 A1 | 6/2004 | Spero |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1 | 8/2005 | Hoelen et al. |
| 2005/0190180 A1 | 9/2005 | Jin et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2007/0279554 A1 | 12/2007 | Kowarz et al. |
| 2007/0279727 A1 | 12/2007 | Gandhi et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0014700 A1 | 1/2009 | Metcalf et al. |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0109705 A1 | 4/2009 | Pakhchyan et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Benitez et al. |
| 2009/0168459 A1 | 7/2009 | Holman et al. |
| 2009/0174700 A1 | 7/2009 | Daiku |
| 2009/0190072 A1 | 7/2009 | Nagata et al. |
| 2009/0190079 A1 | 7/2009 | Saitoh |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0091093 A1 | 4/2010 | Robinson |
| 2010/0091254 A1 | 4/2010 | Travis et al. |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0309296 A1 | 12/2010 | Harrold et al. |
| 2010/0321953 A1 | 12/2010 | Coleman et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0043501 A1 | 2/2011 | Daniel |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0228562 A1 | 9/2011 | Travis et al. |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0062991 A1 | 3/2012 | Mich et al. |
| 2012/0063166 A1 | 3/2012 | Panagotacos et al. |
| 2012/0075285 A1 | 3/2012 | Oyagi et al. |
| 2012/0081920 A1 | 4/2012 | Ie et al. |
| 2012/0086776 A1 | 4/2012 | Lo |
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0162966 A1 | 6/2012 | Kim et al. |

(56) References Cited

U.S. PATENT DOCUMENTS

| | | |
|---|---|---|
| 2012/0169838 A1 | 7/2012 | Sekine |
| 2012/0206050 A1 | 8/2012 | Spero |
| 2012/0236484 A1 | 9/2012 | Miyake |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0299913 A1 | 11/2012 | Robinson et al. |
| 2012/0314145 A1 | 12/2012 | Robinson |
| 2013/0101253 A1 | 4/2013 | Popovich et al. |
| 2013/0107340 A1 | 5/2013 | Wong et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0230136 A1 | 9/2013 | Sakaguchi et al. |
| 2013/0235561 A1 | 9/2013 | Etienne et al. |
| 2013/0294684 A1 | 11/2013 | Lipton et al. |
| 2013/0307831 A1 | 11/2013 | Robinson et al. |
| 2013/0307946 A1 | 11/2013 | Robinson et al. |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0022619 A1 | 1/2014 | Woodgate et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0098558 A1 | 4/2014 | Vasylyev |
| 2014/0126238 A1 | 5/2014 | Kao et al. |
| 2014/0240828 A1 | 8/2014 | Robinson et al. |
| 2014/0340728 A1 | 11/2014 | Taheri |
| 2014/0368602 A1 | 12/2014 | Woodgate et al. |
| 2015/0268479 A1 | 9/2015 | Woodgate et al. |
| 2015/0334365 A1 | 11/2015 | Tsubaki et al. |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1588196 A | 3/2005 |
| CN | 1678943 A | 10/2005 |
| CN | 1696788 A | 11/2005 |
| CN | 1769971 A | 5/2006 |
| CN | 1823292 A | 8/2006 |
| CN | 1826553 A | 8/2006 |
| CN | 1866112 A | 11/2006 |
| CN | 1900785 A | 1/2007 |
| CN | 1908753 A | 2/2007 |
| CN | 1910399 A | 2/2007 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 101266338 A | 9/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 102147079 A | 8/2011 |
| CN | 202486493 U | 10/2012 |
| EP | 0653891 A1 | 5/1995 |
| EP | 0721131 A2 | 7/1996 |
| EP | 0830984 A2 | 3/1998 |
| EP | 0833183 A1 | 4/1998 |
| EP | 0860729 A2 | 8/1998 |
| EP | 0939273 A1 | 9/1999 |
| EP | 0656555 B1 | 3/2003 |
| EP | 1394593 A1 | 3/2004 |
| EP | 1736702 | 12/2006 |
| EP | 2003394 A2 | 12/2008 |
| EP | 2451180 A2 | 5/2012 |
| EP | 1634119 B1 | 8/2012 |
| GB | 2405542 | 2/2005 |
| JP | H08211334 | 8/1996 |
| JP | H08237691 A | 9/1996 |
| JP | H08254617 | 10/1996 |
| JP | H08070475 | 12/1996 |
| JP | H08340556 | 12/1996 |
| JP | 2000048618 A | 2/2000 |
| JP | 2000200049 A | 7/2000 |
| JP | 2001093321 A | 4/2001 |
| JP | 2001-281456 A | 10/2001 |
| JP | 2002049004 A | 2/2002 |
| JP | 2003215349 A | 7/2003 |
| JP | 2003215705 A | 7/2003 |
| JP | 2004319364 A | 11/2004 |
| JP | 2005116266 | 4/2005 |
| JP | 2005135844 A | 5/2005 |
| JP | 2005183030 A | 7/2005 |
| JP | 2005259361 A | 9/2005 |
| JP | 2006004877 A | 1/2006 |
| JP | 2006031941 A | 2/2006 |
| JP | 2006310269 A | 11/2006 |
| JP | 3968742 B2 | 8/2007 |
| JP | 2007273288 A | 10/2007 |
| JP | 2007286652 | 11/2007 |
| JP | 2008204874 A | 9/2008 |
| JP | 2010160527 A | 7/2010 |
| JP | 20110216281 A | 10/2011 |
| JP | 2013015619 | 1/2013 |
| JP | 2013502693 | 1/2013 |
| JP | 2013540083 | 10/2013 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120048301 A | 5/2012 |
| KR | 20120049890 A | 5/2012 |
| KR | 20130002646 A | 1/2013 |
| KR | 20140139730 | 12/2014 |
| TW | 200528780 A | 9/2005 |
| WO | 9406249 B1 | 4/1994 |
| WO | 9520811 A1 | 8/1995 |
| WO | 9527915 A1 | 10/1995 |
| WO | 9821620 A1 | 5/1998 |
| WO | 9911074 A1 | 3/1999 |
| WO | 0127528 A1 | 4/2001 |
| WO | 0161241 A1 | 8/2001 |
| WO | 0179923 A1 | 10/2001 |
| WO | 2008045681 A1 | 4/2008 |
| WO | 2011020962 A1 | 2/2011 |
| WO | 2011022342 A2 | 2/2011 |
| WO | 2011068907 A1 | 6/2011 |
| WO | 2011149739 A2 | 12/2011 |
| WO | 2012158574 A1 | 11/2012 |
| WO | 2014130860 A1 | 8/2014 |

OTHER PUBLICATIONS

PCT/US2015/038024 International search report and written opinion of international searching authority dated Dec. 30, 2015.
PCT/US2016/027297 International search report and written opinion of international searching authority dated Jul. 26, 2017.
PCT/US2016/027350 International search report and written opinion of the international searching authority dated Jul. 25, 2016.
PCT/US2016/034418 International search report and written opinion of the international searching authority dated Sep. 7, 2016.
Robinson et al., U.S. Appl. No. 14/751,878 entitled "Directional privacy display" filed Jun. 26, 2015. Application is available to Examiner on the USPTO database and has not been filed herewith.
Robinson et al., U.S. Appl. No. 15/097,750 entitled "Wide angle imaging directional backlights" filed Apr. 13, 2016. Application is available to Examiner on the USPTO database and has not been filed herewith.

(56) References Cited

OTHER PUBLICATIONS

Robinson et al., U.S. Appl. No. 15/098,084 entitled "Wide angle imaging directional backlights" filed Apr. 13, 2016. Application is available to Examiner on the USPTO database and has not been filed herewith.
Robinson et al., U.S. Appl. No. 15/165,960 entitled "Wide Angle Imaging Directional Backlights" filed May 26, 2016. Application is available to Examiner on the USPTO database and has not been filed herewith.
Robinson et al., U.S. Appl. No. 15/290,543 entitled "Wide angle imaging directional backlights" filed Oct. 11, 2016. Application is available to Examiner on the USPTO database and has not been filed herewith.
Robinson, U.S. Appl. No. 13/300,293 entitled "Directional flat illuminators" filed Nov. 18, 2011. Application is available to Examiner on the USPTO database and has not been filed herewith.
RU-2013122560 First office action dated Jan. 1, 2014.
RU-2013122560 Second office action dated Apr. 10, 2015.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Travis, et al. "Collimated light from a waveguide for a display," Optics Express, vol. 17, No. 22, pp. 19714-19719 (2009).
Viola and Jones, "Rapid Object Detection using a Boosted Cascade of Simple Features", pp. 1-9 CVPR 2001.
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
Zach et al., "A Duality Based Approach for Realtime TV-L1 Optical Flow", Pattern Recognition (Proc. DAGM), 2007, pp. 214-223.
PCT/US2016/056410 International search report and written opinion of the international searching authority dated Jan. 25, 2017.
EP-14754859.8 European Extended Search Report of European Patent Office dated Oct. 14, 2016.
EP-16150248.9 European Extended Search Report of European Patent Office dated Jun. 16, 2016.
Ho, "Random Decision Forests", Proceedings of the 3rd International Conference on Document Analysis and Recognition, Montreal, QC, pp. 278-282, Aug. 14-16, 1995.
Ian Sexton et al: "Stereoscopic and autostereoscopic display-systems",—IEEE Signal Processing Magazine, May 1, 1999 (May 1, 1999), pp. 85-99, XP055305471, Retrieved from the Internet: RL:http://ieeexplore.ieee.org/ iel5/79/16655/00768575.pdf [retrieved on Sep. 26, 2016].
JP-2009538527 Reasons for rejection dated Jul. 17, 2012 with translation.
JP-200980150139.1 1st Office Action dated Feb. 11, 2014.
JP-200980150139.1 2d Office Action dated Apr. 5, 2015.
JP-2013540083 Notice of reasons for rejection of Jun. 30, 2015.
JP-2013540083 Notice of reasons for rejection with translation dated Jun. 21, 2016.
Kalantar, et al. "Backlight Unit With Double Surface Light Emission," J. Soc. Inf. Display, vol. 12, Issue 4, pp. 379-387 (Dec. 2004).
Kononenko et al., "Learning to Look Up: Realtime Monocular Gaze Correction Using Machine Learning", Computer Vision and Pattern Recognition, pp. 4667-4675, 2015.
KR-20117010839 1st Office action (translated) dated Aug. 28, 2015.
KR-20117010839 2d Office action (translated) dated Apr. 28, 2016.
KR-20137015775 Office action (translated) dated Oct. 18, 2016.
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, XP002239311, pg. 42-49.
Lowe, "Distinctive Image Features from Scale-Invariant Keypoints", International Journal of Computer Vision 60 (2), pp. 91-110, 2004.
Marjanovic, M.,"Interlace, Interleave, and Field Dominance," http://www.mir.com/DMG/interl.html, pp. 1-5 (2001).
Ozuysal et al., "Fast Keypoint recognition in Ten Lines of Code", Computer Vision and Pattern Recognition, pp. 1-8, 2007.
PCT/US2007/85475 International preliminary report on patentability dated May 26, 2009.
PCT/US2007/85475 International search report and written opinion dated Apr. 10, 2008.
PCT/US2009/060686 international preliminary report on patentability dated Apr. 19, 2011.
PCT/US2009/060686 international search report and written opinion of international searching authority dated Dec. 10, 2009.
PCT/US2011/061511 International Preliminary Report on Patentability dated May 21, 2013.
PCT/US2011/061511 International search report and written opinion of international searching authority dated Jun. 29, 2012.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
PCT/US2013/041237 International search report and written opinion of international searching authority dated May 15, 2013.
PCT/US2013/041548 International search report and written opinion of international searching authority dated Aug. 27, 2013.
PCT/US2013/041619 International search report and written opinion of international searching authority dated Aug. 27, 2013.
PCT/US2013/041655 International search report and written opinion of international searching authority dated Aug. 27, 2013.
PCT/US2013/041683 International search report and written opinion of international searching authority dated Aug. 27, 2013.
PCT/US2013/041697 International search report and written opinion of international searching authority dated Aug. 23, 2013.
PCT/US2013/041703 International search report and written opinion of international searching authority dated Aug. 27, 2013.
PCT/US2013/049969 International search report and written opinion of international searching authority dated Oct. 23, 2013.
PCT/US2013/063125 International search report and written opinion of international searching authority dated Jan. 20, 2013.
PCT/US2013/063133 International search report and written opinion of international searching authority dated Jan. 20, 2014.
PCT/US2013/077288 International search report and written opinion of international searching authority dated Apr. 18, 2014.
PCT/US2014/017779 International search report and written opinion of international searching authority dated May 28, 2014.
PCT/US2014/042721 International search report and written opinion of international searching authority dated Oct. 10, 2014.
PCT/US2014/057860 International Preliminary Report on Patentability dated Apr. 5, 2016.
PCT/US2014/057860 International search report and written opinion of international searching authority dated Jan. 5, 2015.
PCT/US2014/060312 International search report and written opinion of international searching authority dated Jan. 19, 2015.
PCT/US2014/065020 International search report and written opinion of international searching authority dated May 21, 2015.
PCT/US2015/000327 International search report and written opinion of international searching authority dated Apr. 25, 2016.
PCT/US2015/021583 International search report and written opinion of international searching authority dated Sep. 10, 2015.
3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT% 20ePrivacy%20Filter%20software%20professional%20version_3MF-EPFPRO&cpncode=37-7582919&srccode=cii_10191459#PO; Copyright 2007-2016.

(56) References Cited

OTHER PUBLICATIONS

AU-2011329639 Australia Patent Examination Report No. 1 dated Mar. 6, 2014.
AU-2013262869 Australian Office Action of Australian Patent Office dated Feb. 22, 2016.
AU-2015258258 Australian Office Action of Australian Patent Office dated Jun. 9, 2016.
Bahadur, "Liquid crystals applications and uses," World Scientific, vol. 1, pp. 178 (1990).
CA-2817044 Canadian office action of Jul. 14, 2016.
CN-201180065590.0 Office first action dated Dec. 31, 2014.
CN-201180065590.0 Office second action dated Oct. 21, 2015.
CN-201180065590.0 Office Third action dated Jun. 6, 2016.
CN-201280034488.9 2d Office Action from the State Intellectual Property Office of P.R. China dated Mar. 22, 2016.
CN-201280034488.9 1st Office Action from the State Intellectual Property Office of P.R. China dated Jun. 11, 2015.
CN-201380026045.X Chinese First Office Action of Chinese Patent Office dated Aug. 29, 2016.
CN-201380026046.4 Chinese 1st Office Action of the State Intellectual Property Office of P.R. China dated Oct. 24, 2016.
CN-201380026047.9 Chinese 1st Office Action of the State Intellectual Property Office of P.R. dated Dec. 18, 2015.
CN-201380026047.9 Chinese 2d Office Action of the State Intellectual Property Office of P.R. dated Jul. 12, 2016.
CN-201380026050.0 Chinese 1st Office Action of the State Intellectual Property Office of P.R. dated Jun. 3, 2016.
CN-201380026058.7 Chinese 1st Office Action of the State Intellectual Property Office of P.R. China dated Nov. 2, 2016.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
CN-201380063047.6 Chinese Office Action of the State Intellectual Property Office of P.R. China dated Oct. 9, 2016.
CN-201380063055.0 Chinese 1st Office Action of the State Intellectual Property Office of P.R. dated Jun. 23, 2016.
CN-201480023023.2 Office action dated Aug. 12, 2016.
Cootes et al., "Active Aplpearance Models", IEEE Trans. Pattern Analysis and Machine Intelligence, 23(6):681-685, 2001.
Cootes et al., "Active Shape Models—Their Training and Application" Computer Vision and Image Understanding 61 (1):38-59 Jan. 1995.
Dalal et al., "Histogram of Oriented Gradients for Human Detection", Computer Vision and Pattern Recognition, pp. 886-893, 2005.
Drucker et al., "Support Vector Regression Machines", Advances in Neural Information Processing Systems 9, pp. 155-161, NIPS 1996.
EP-07864751.8 European Search Report dated Jun. 1, 2012.
EP-07864751.8 Supplementary European Search Report dated May 29, 2015.
EP-09817048.3 European Search Report dated Apr. 29, 2016.
EP-11842021.5 Office Action dated Dec. 17, 2014.
EP-11842021.5 Office Action dated Oct. 2, 2015.
EP-11842021.5 Office Action dated Sep. 2, 2016.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790775.4 Office Action dated Aug. 29, 2016.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Oct. 14, 2015.
EP-13791437.0 European first office action dated Aug. 30, 2016.
EP-13822472.0 European Extended Search Report of European Patent Office dated Mar. 2, 2016.
EP-13843659.7 European Extended Search Report of European Patent Office dated May 10, 2016.
EP-13844510.1 European Extended Search Report of European Patent Office dated May 13, 2016.
EP-13865893.5 European Extended Search Report of European Patent Office dated Oct. 6, 2016.
PCT/US2016/061428 International search report and written opinion of international searching authority dated Jan. 20, 2017.
RU-201401264 Office action dated Jan. 18, 2017.
CN-201180065590.0 Office fourth action dated Jan. 4, 2017.
CN-201380073381.X Chinese Office Action of the State Intellectual Property Office of P.R. China dated Nov. 16, 2016.
AU-2014218711 Examination report No. 1 dated Mar. 20, 2017.
CN-201480023023.2 Office second action dated May 11, 2017.

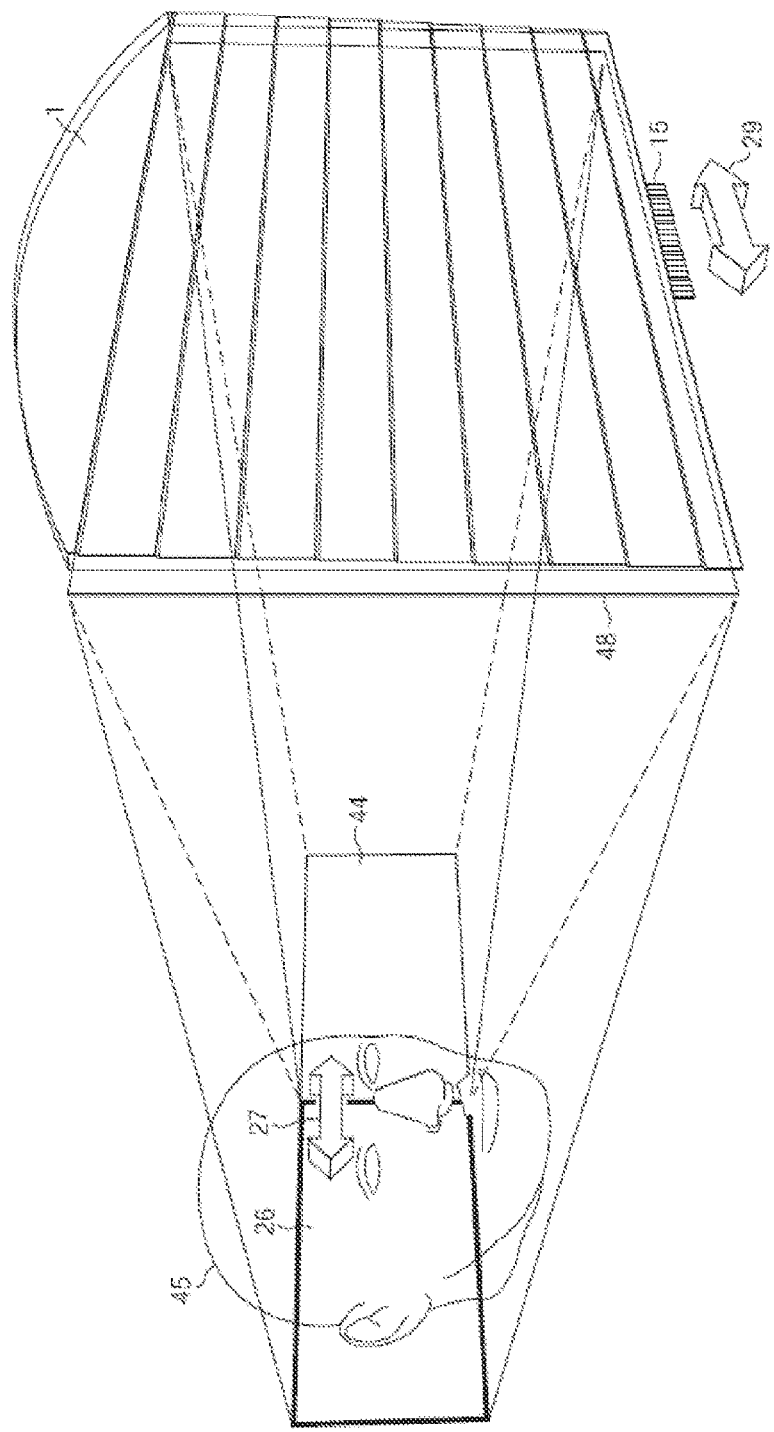

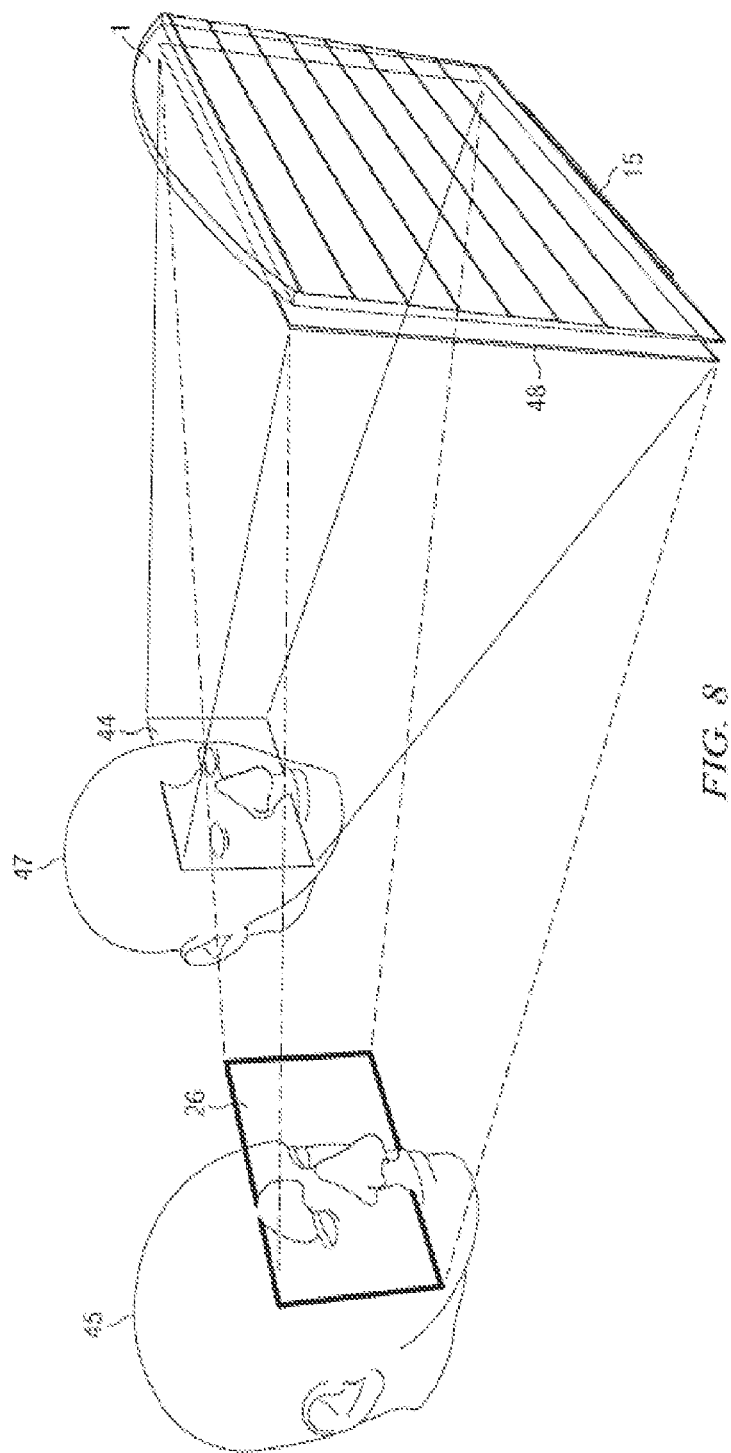

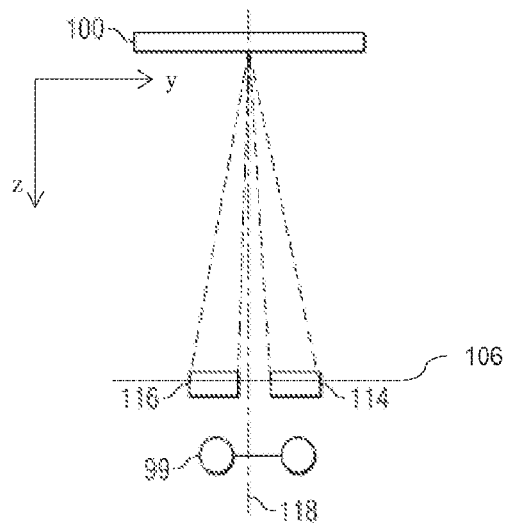
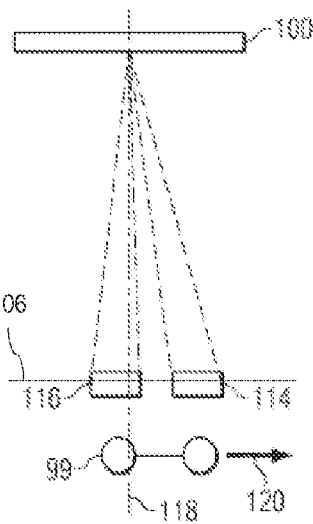
FIG. 14A  FIG. 14B
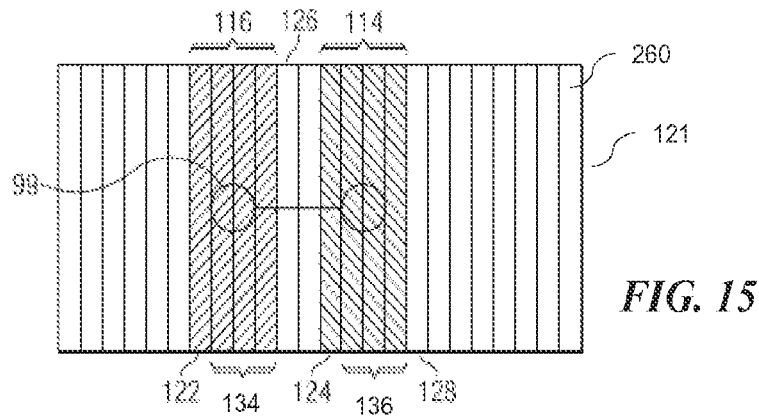
FIG. 15
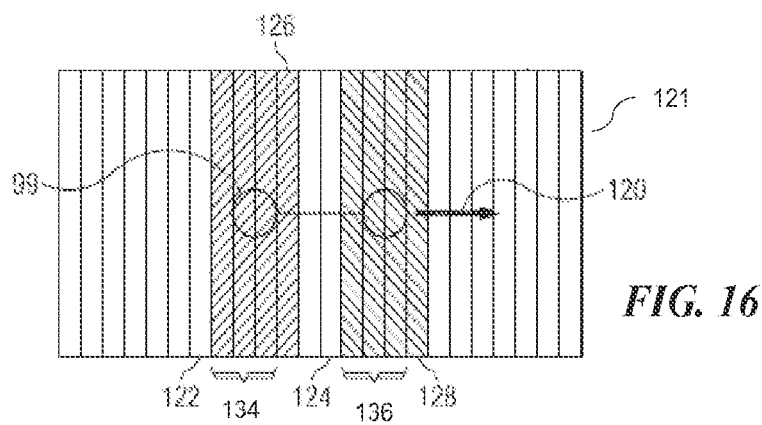
FIG. 16

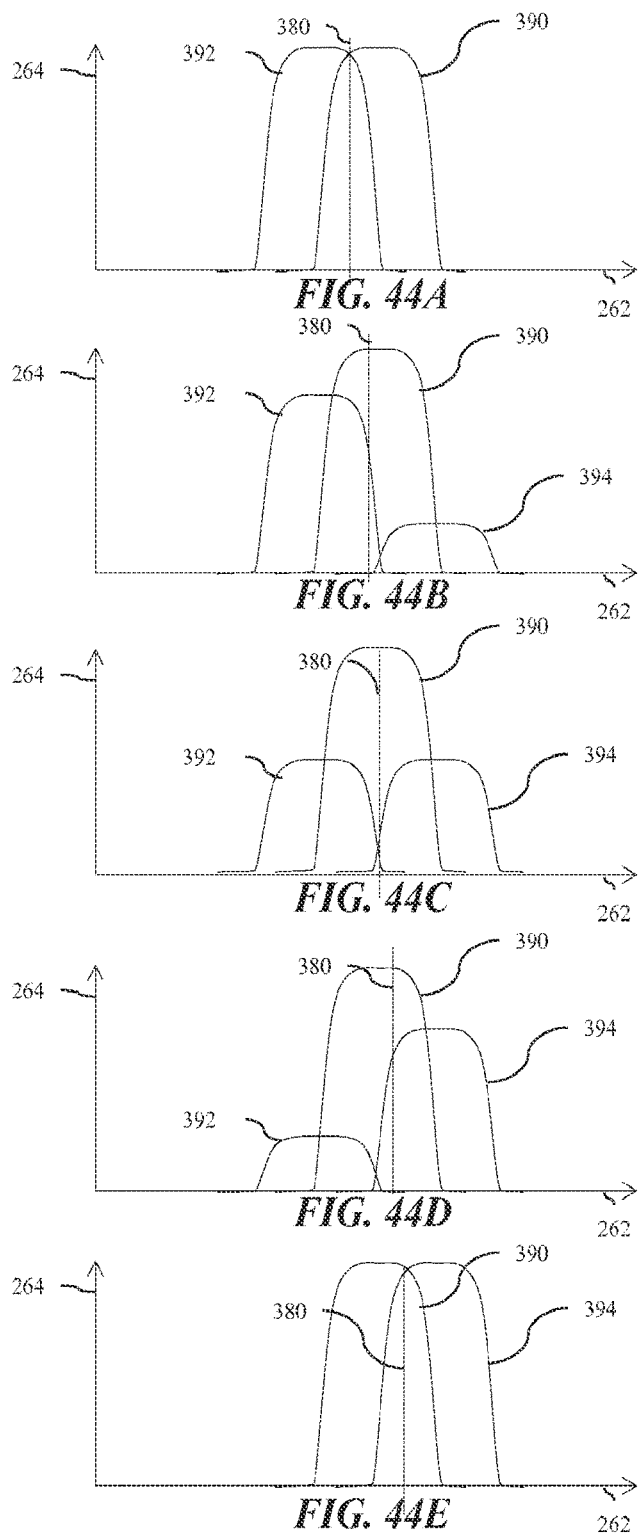

ated to U.S. patent application Ser. No. 13/300,293,
CONTROL OF DIRECTIONAL DISPLAY

CROSS-REFERENCE TO RELATED APPLICATIONS

This application is related to and claims priority to U.S. Provisional Application No. 61/890,469, entitled "Control of directional display," filed Oct. 14, 2013, which is herein incorporated by reference in its entirety. This application is related to U.S. patent application Ser. No. 13/300,293, entitled "Directional flat illuminators," filed Nov. 18, 2011 and U.S. patent application Ser. No. 13/896,870, entitled "Controlling light sources of a directional backlight," filed May 17, 2013, both of which are herein incorporated by reference in their entireties.

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

BRIEF SUMMARY

According to an aspect of the present disclosure, there is provided a directional backlight apparatus comprising: a directional backlight comprising a waveguide comprising first and second, opposed guide surfaces for guiding input light along the waveguide, and an array of light sources arranged to generate the input light at different input positions in a lateral direction across the waveguide, the waveguide further comprising a reflective end for reflecting input light back through the waveguide, the second guide surface being arranged to deflect light after reflection from the reflective end as output light through the first guide surface, and the waveguide being arranged to direct the output light into optical windows in output directions that are distributed in a lateral direction in dependence on the input position of the input light; and a sensor system arranged to detect the position of the head of an observer; and a control system arranged to selectively operate a group of adjacent light sources to direct light into a corresponding group of adjacent optical windows, in a manner in which the identity of the light sources in the group varies, and for a given group of light sources the luminous flux of the light sources varies, in accordance with the detected position of the head of the observer.

The control system may be arranged to selectively operate a group of adjacent light sources in a manner in which for a given group of light sources the luminous flux of the light sources varies across a transitional range of the detected position of the head of the observer. The control system may be arranged to selectively operate a group of adjacent light sources in a manner in which, across the transitional ranges of the detected position of the head of the observer, a new light source is operated as a member of the group with a luminous flux that increases as the detected position of the head of the observer moves towards the output direction corresponding to the new light source.

The control system may be arranged to selectively operate a group of adjacent light sources in a manner in which, across the transitional ranges of the detected position of the head of the observer, a light source is operated at an end of the group opposite from the new light source with a luminous flux that decreases as the detected position of the head of the observer moves towards the output direction corresponding to the new light source. The control system may be arranged to selectively operate a group of adjacent light sources in a manner in which, across ranges of the detected position of the head of the observer intermediate the transitional ranges, the identity and luminous flux of the light sources in the group does not vary.

The first guide surface may be arranged to guide light by total internal reflection and the second guide surface may comprise a plurality of light extraction features oriented to direct light guided through the waveguide in directions allowing exit through the first guide surface as the output light and intermediate regions between the light extraction features that are arranged to guide light through the waveguide. The second guide surface may have a stepped shape comprising facets, that are said light extraction features, and the intermediate regions. The light extraction features may have positive optical power in the lateral direction. The first guide surface may be arranged to guide light by total internal reflection and the second guide surface may be substantially planar and inclined at an angle to direct light in directions that break that total internal reflection for outputting light through the first guide surface, and the display device may further comprise a deflection element extending across the first guide surface of the waveguide for deflecting light towards the normal to the first guide surface. The reflective end may have positive optical power in the lateral direction.

According to another aspect of the present disclosure, there is provided a display apparatus comprising: a backlight apparatus according to the first aspect; and a transmissive spatial light modulator arranged to receive the output light from the first guide surface of the waveguide and to modulate it to display an image. The display apparatus may be an autostereoscopic display apparatus wherein the control system is further arranged to control the spatial light modulator to display temporally multiplexed left and right images and synchronously to selectively operate groups of adjacent light sources to direct the displayed left and right images into respective groups of adjacent optical windows in positions corresponding to left and right eyes of an observer.

Advantageously the flicker for a moving observer with respect to a directional display may be reduced. Further, the longitudinal viewing freedom may be extended and the maximum viewer speed that may be tolerated may be increased before flicker is provided at undesirable levels. The size of viewing windows to achieve desirable image flicker may be increased so that the number of light sources provided in the directional display may be reduced, reducing cost and increasing lifetime of the array of light sources. In a high brightness 2D display the number of light sources illuminated may be reduced so that for a given power consumption the display brightness is optimized and contrast in brightly lit environments increased. In an autostereoscopic 3D display the cross talk may be reduced.

According to another aspect of the present disclosure, there is provided a directional display apparatus comprising: a directional display device capable of directing output light selectively into optical windows of a set of optical windows in output directions that are distributed across the display device; and a control system arranged to control the display device to direct output light into at least one selected optical window of the set, the directional display apparatus being arranged to sense the disposition of a hand of an observer, the control system being arranged to change the control of the display device in response to the sensed disposition of the hand of the observer. The control system may be arranged to shift the at least one selected optical window across the set in response to the directional display apparatus sensing movement of the hand of the observer across the display device in the direction in which the output directions are distributed. The control system may be arranged to change the brightness of the at least one selected optical window in response to the directional display apparatus sensing movement of the hand of the observer across the display device in a direction perpendicular to the direction in which the output directions are distributed. The control system may be arranged to change the number of optical windows that are selected in response to in response to the directional display apparatus sensing a change in separation of fingers of the hand of the observer. The directional display apparatus may be arranged to sense the disposition of a hand of an observer by means of the directional display device being a touch-sensitive directional display device that is arranged to sense the disposition of the hand of the observer in proximity to the directional display device. The directional display apparatus may comprise an image sensor system arranged to sense the disposition of a hand of an observer.

Advantageously a directional display may be provided with control of viewing windows without the requirement for a head tracker, thus reducing processing power and cost of a head tracking system. In comparison to a display with fixed optical windows, the intensity and width of optical windows may be controlled in a dynamic manner by an observer, increasing the viewing freedom or brightness of the display to achieve desirable viewing characteristics. The contrast of an image in a brightly lit environment can be increased without increasing the power consumption of the light source by reducing the number of light sources that are illuminated.

According to another aspect of the present disclosure, there is provided a display apparatus comprising: a spatial light modulator; a backlight arranged to illuminate the entire area of the spatial light modulator; and a control system arranged to control the transmittance of the spatial light modulator in accordance with input image data to display an image, and further arranged to control the brightness of the backlight, the control system being arranged to operate in at least a first and second mode, wherein in the first mode, the control system is arranged to control the brightness of the backlight to a first brightness level and to control the transmittance of the spatial light modulator in accordance with the input image data with a relationship between the input data and the transmittance of the spatial light modulator that is the same across the image, and in the second mode, the control system is arranged to control the brightness of the backlight to a second brightness level greater than the first brightness level, and to control the transmittance of the spatial light modulator in accordance with the input image data with relationships between the input data and the transmittance of the spatial light modulator that are different in different regions of the image. In the second mode, the control system may be arranged to control the transmittance of the spatial light modulator in accordance with the input image data with a relationship between the input data and the transmittance of the spatial light modulator in at least one highlighted region of the image that is the same as the relationship in the first mode. The control system may be arranged to control the transmittance of the spatial light modulator in accordance with the input image data with a relationship between the input data and the transmittance of the spatial light modulator in at least one non-highlighted region of the image that is scaled to have a peak transmittance that is lower than the peak transmittance of the relationship in the first mode. The relationship between the input data and the transmittance of the spatial light modulator in the at least one non-highlighted region of the image may be scaled down to have a peak transmittance that is lower than the peak transmittance of the relationship in the first mode by a factor equal to the ratio of the second brightness level to the first brightness level. The backlight may be a directional backlight that is capable of directing output light selectively into optical windows of a set of optical windows in output directions that are distributed across the display apparatus, the control system being arranged to control the backlight to direct output light into at least one selected optical window of the set. The display apparatus may further comprise a sensor system arranged to detect the position of the head of an observer, the control system being arranged to control the display device to direct output light into at least one selected optical window of the set, selected in response to the detected position of the head of the observer.

According to another aspect of the present disclosure, there is provided method of controlling a display apparatus that comprises a spatial light modulator and a backlight arranged to illuminate the entire area of the spatial light modulator, the method comprising in the first mode, controlling the brightness of the backlight to a first brightness level and controlling the transmittance of the spatial light modulator in accordance with input image data to display an image with a relationship between the input data and the transmittance of the spatial light modulator that is the same across the image, and in the second mode, controlling the brightness of the backlight to a second brightness level greater than the first brightness level, and controlling the transmittance of the spatial light modulator in accordance with input image data to display an image with relationships between the input data and the transmittance of the spatial light modulator that are different in different regions of the image, and may be further arranged to control the brightness of the backlight.

Advantageously an image can be provided that operates in a first mode with a desirable luminance and grey scale characteristic across the whole of the image. Further a second mode may be achieved in which at least a second region of the image has a high luminance compared to a first region of the image. The luminance and grey scale of the first region of the image may be the same for first and second modes of operation. The second region can advantageously be arranged to provide highlighted image regions for applications such as advertising. The power consumption of the high luminance image can be similar to the power consumption of the low luminance image if the high luminance image is provided in a directional mode of operation.

Any of the described aspects of the present disclosure may be applied together in any combination.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. patent application Ser. No. 13/300,293, which is herein incorporated by reference, in its entirety.

U.S. Pat. No. 6,377,295, which is herein incorporated by reference in its entirety, generally discusses that prediction can be used to correct coordinates due to latency in tracking control. This is applied to a mechanically moved parallax optical element, the position of which must be controlled at all times or continuously. By way of comparison the present embodiments provide a predictive generation of the observer location, rather than the tracker latency, at a defined future time set by the display illumination pulses. Advantageously it may not be appropriate to determine locations continuously, but instead at discrete future times of the illumination. U.S. Pat. No. 5,959,664, which is herein incorporated by reference in its entirety, generally discusses longitudinal tracking of an observer and steering by adjusting the content of the display SLM. By way of comparison embodiments described below may achieve longitudinal tracking by adjusting the illumination of the optical valve without adjusting or slicing of the image on the display SLM.

U.S. patent application Ser. No. 13/897,236, entitled "Directional display apparatus," filed May 17, 2013, which is herein incorporated by reference in its entirety, generally discusses that the number of optical windows in viewing windows can be modified in dependence on the measured position, speed or acceleration of an observer.

U.S. patent application Ser. No. 13/896,870, entitled "Controlling light sources of a directional backlight," filed May 17, 2013, which is herein incorporated by reference in its entirety, generally discusses that the greyscale of optical windows may be varied across an array of optical windows.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is only provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 7 is a schematic diagram illustrating an observer tracking autostereoscopic display apparatus including a time multiplexed directional display device, in accordance with the present disclosure;

FIG. 8 is a schematic diagram illustrating a multi-viewer directional display device;

FIG. 14A is a schematic diagram illustrating in front view, a first viewing window arrangement, in accordance with the present disclosure;

FIG. 14B is a schematic diagram illustrating in front view, a second viewing window arrangement for a moving observer, in accordance with the present disclosure;

FIG. 15 is a schematic diagram illustrating the appearance of windows of FIG. 14A in the window plane, in accordance with the present disclosure;

FIG. 16 is a schematic diagram illustrating the appearance of windows of FIG. 14B in the window plane for a moving observer, in accordance with the present disclosure;

FIGS. 44A-44E are schematic diagrams illustrating graphs of optical window luminous intensity against position in the window plane for a vertically observer in the display arrangement of FIG. 33A comprising two optical windows in detent positions for a first control method, in accordance with the present disclosure;

DETAILED DESCRIPTION

Figure 1A:
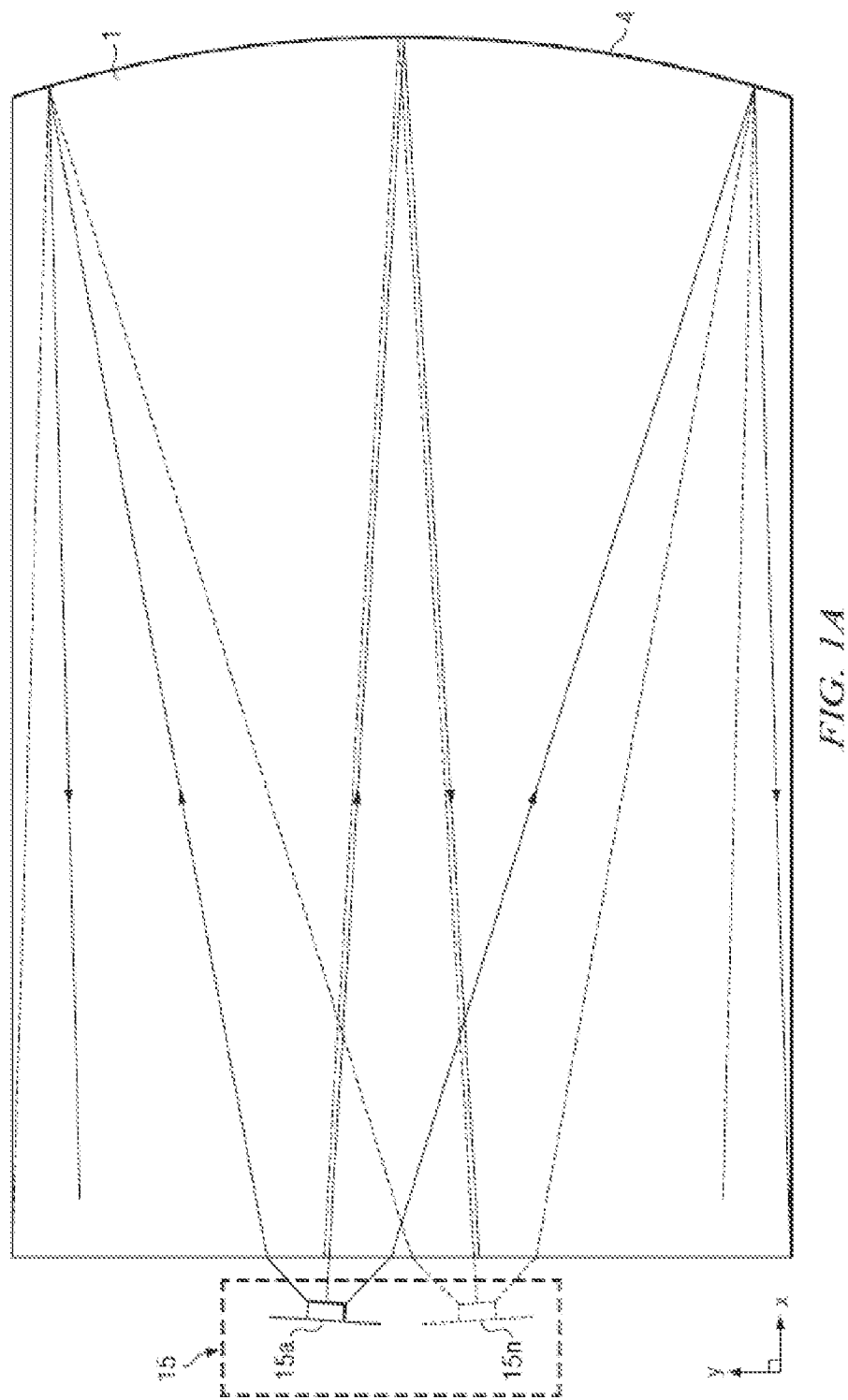
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (which is sometimes referred to as a "light valve"). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. patent application Ser. No. 13/300,293, which is herein incorporated by reference in its entirety.

As used herein, examples of an imaging directional backlight include a stepped waveguide imaging directional backlight, a folded imaging directional backlight, a wedge type directional backlight, or an optical valve.

Additionally, as used herein, a stepped waveguide imaging directional backlight may be an optical valve. A stepped waveguide is a waveguide for an imaging directional backlight comprising a waveguide for guiding light, which may include a first light guiding surface and a second light guiding surface, opposite the first light guiding surface, further comprising a plurality of light guiding features interspersed with a plurality of extraction features arranged as steps.

Moreover, as used, a folded imaging directional backlight may be at least one of a wedge type directional backlight, or an optical valve.

In operation, light may propagate within an exemplary optical valve in a first direction from an input end to a reflective end and may be transmitted substantially without loss. Light may be reflected at the reflective end and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a nominal window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
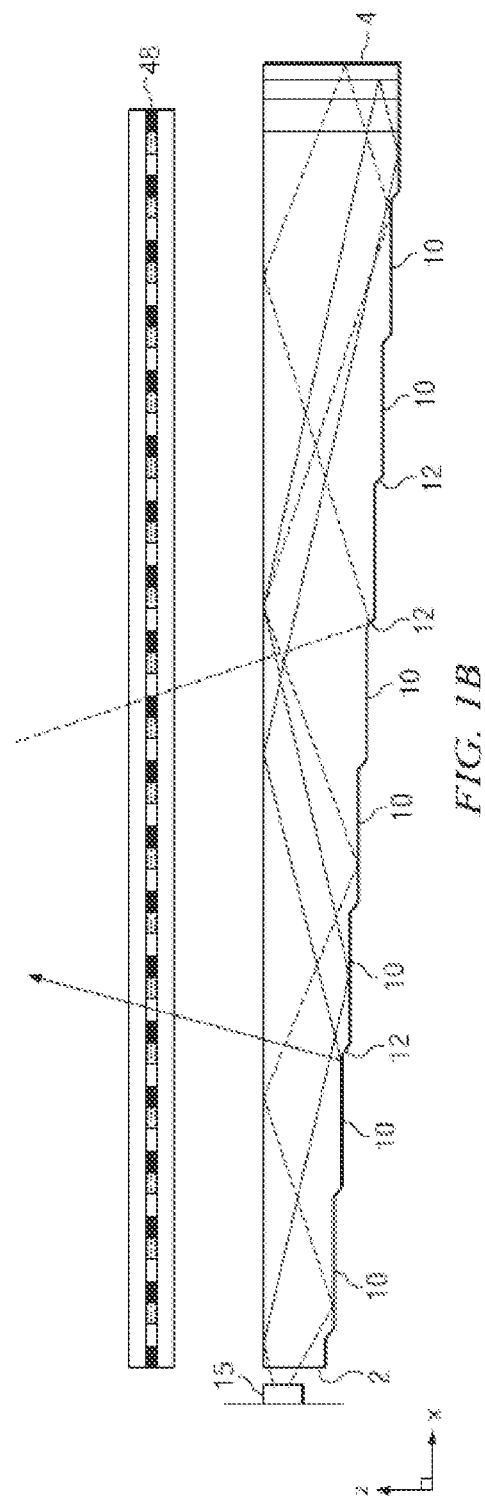
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the optical valve structure of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illuminator elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM (spatial light modulator) 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1 by total internal reflection. The first guide surface is planar. The second guide surface has a plurality of light extraction features 12 facing the reflective end 4 and inclined to reflect at least some of the light guided back through the waveguide 1 from the reflective end in directions that break the total internal reflection at the first guide surface and allow output through the first guide surface, for example, upwards in FIG. 1B, that is supplied to the SLM 48.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape including the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window.

In the present disclosure an optical window may correspond to the image of a single light source in the window plane, being a nominal plane in which optical windows form across the entirety of the display device. Alternatively, optical windows may correspond to the image of groups of light sources that are driven together. Advantageously, such groups of light sources may increase uniformity of the optical windows of the array 121.

By way of comparison, a viewing window is a region in the window plane wherein light is provided comprising image data of substantially the same image from across the display area. Thus a viewing window may be formed from a single optical window or from plural optical windows.

The SLM 48 extends across the waveguide is transmissive and modulates the light passing therethrough. Although the SLM 48 may be a liquid crystal display (LCD) but this is merely by way of example, and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

In one embodiment, a display device may include a stepped waveguide or light valve which in turn, may include a first guide surface that may be arranged to guide light by total internal reflection. The light valve may include a second guide surface which may have a plurality of light extraction features inclined to reflect light guided through the waveguide in directions allowing exit through the first guide surface as the output light. The second guide surface may also have regions between the light extraction features that may be arranged to direct light through the waveguide without extracting it.

In another embodiment, a display device may include a waveguide with at least a first guide surface which may be arranged to guide light by total internal reflection and a second guide surface which may be substantially planar and inclined at an angle to reflect light in directions that break the total internal reflection for outputting light through the first guide surface, The display device may include a deflection element extending across the first guide surface of the waveguide for deflecting light towards the normal to the SLM 48.

In yet another embodiment, a display device may include a waveguide which may have a reflective end facing the input end for reflecting light from the input light back through the waveguide. The waveguide may further be arranged to output light through the first guide surface after reflection from the reflective end.

Figure 2A:
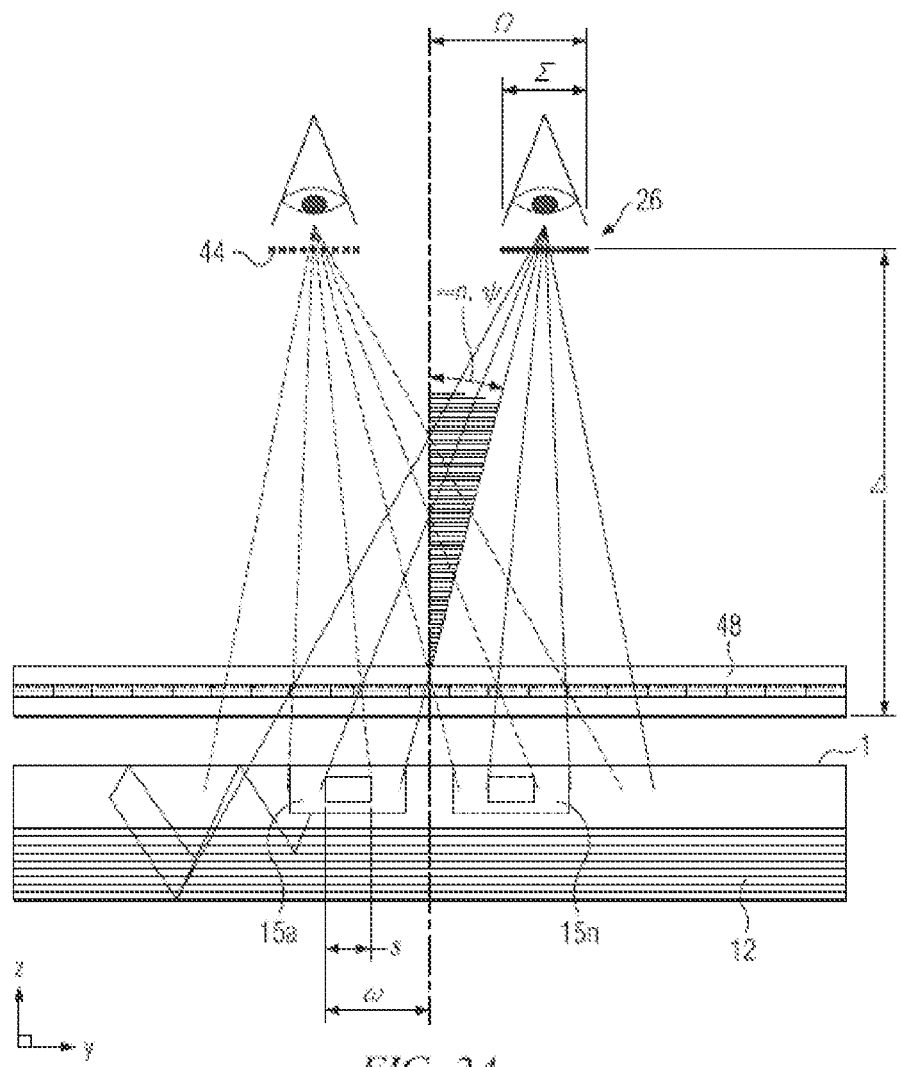
FIG. 2A is a schematic diagram illustrating in a top view of light propagation in another embodiment of a directional display device, in accordance with the present disclosure.
Figure 2B:
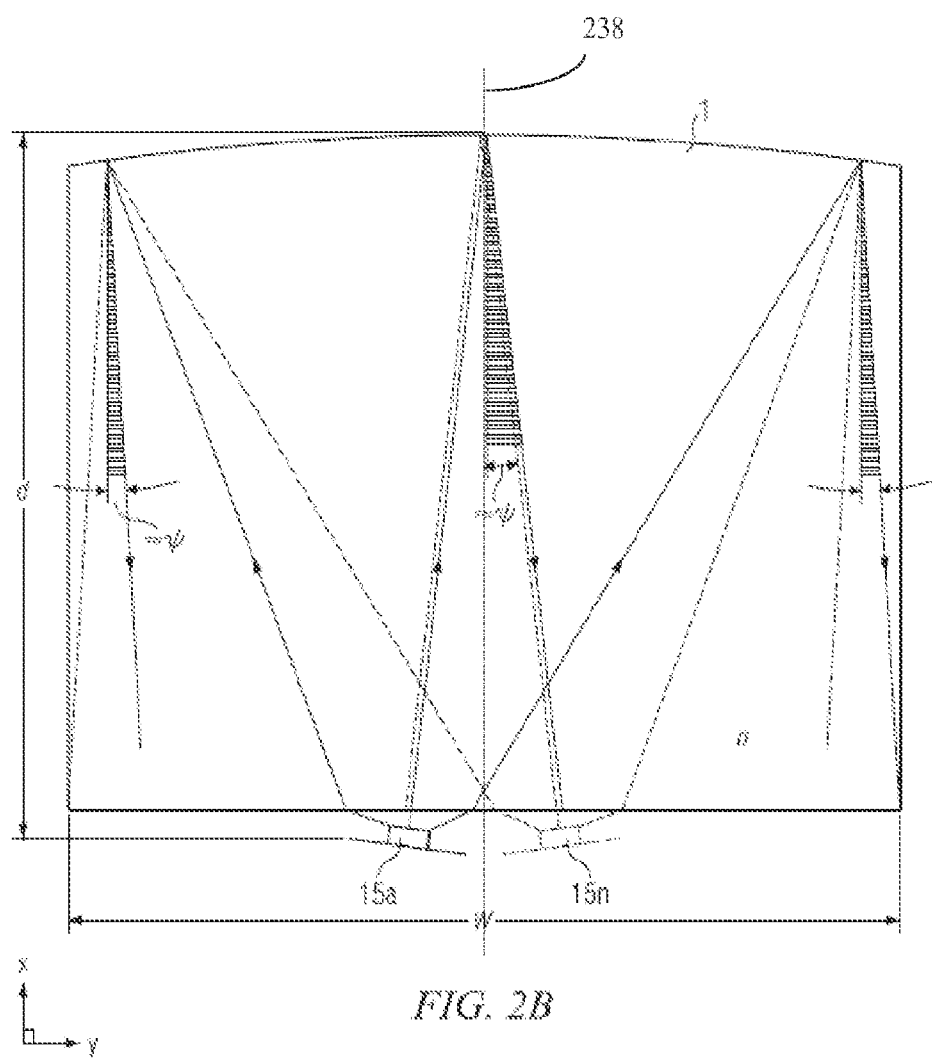
FIG. 2B is a schematic diagram illustrating light propagation in a front view of the directional display device of FIG. 2A, in accordance with the present disclosure.
Figure 2C:
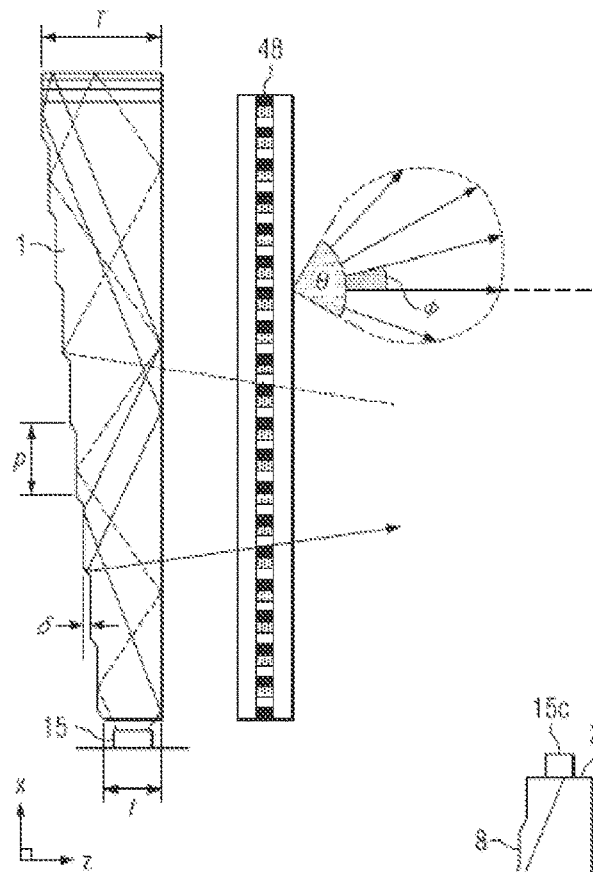
FIG. 2C is a schematic diagram illustrating light propagation in a side view of the directional display device of FIG. 2A, in accordance with the present disclosure.

Illuminating an SLM 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the center of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
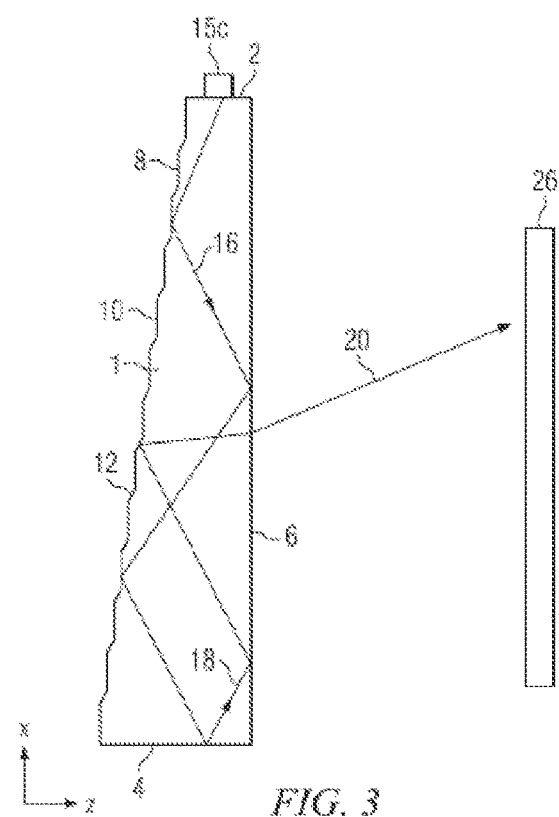
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input end 2, a reflective end 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective end 4, which may be a mirrored surface. Although reflective end 4 may be a mirrored surface and may reflect light, it may in some embodiments also be possible for light to pass through reflective end 4.

Continuing the discussion of FIG. 3, light ray 18 reflected by the reflective end 4 may be further guided in the stepped waveguide 1 by total internal reflection at the reflective end 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input end 2. Thus each viewing window 26 represents a range of separate output directions with respect to the surface normal direction of the SLM 48 that intersect with a plane at the nominal viewing distance.

Figure 4A:
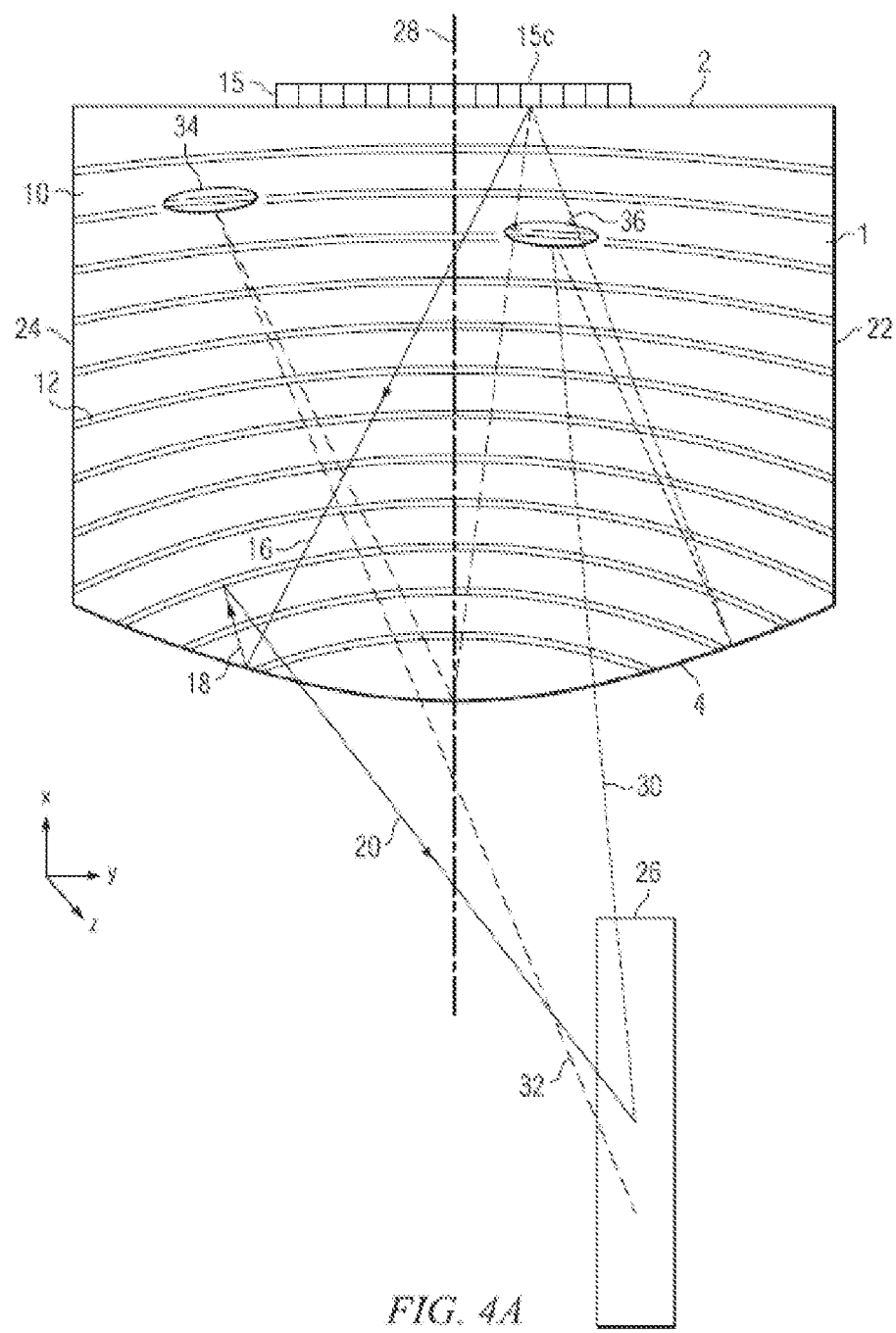
FIG. 4A is schematic diagram illustrating in a front view, generation of a viewing window in a directional display device and including curved light extraction features, in accordance with the present disclosure.

FIG. 4A is a schematic diagram illustrating in front view a directional display device which may be illuminated by a first illuminator element and including curved light extraction features. In FIG. 4A, the directional backlight may include the stepped waveguide 1 and the light source illuminator array 15. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
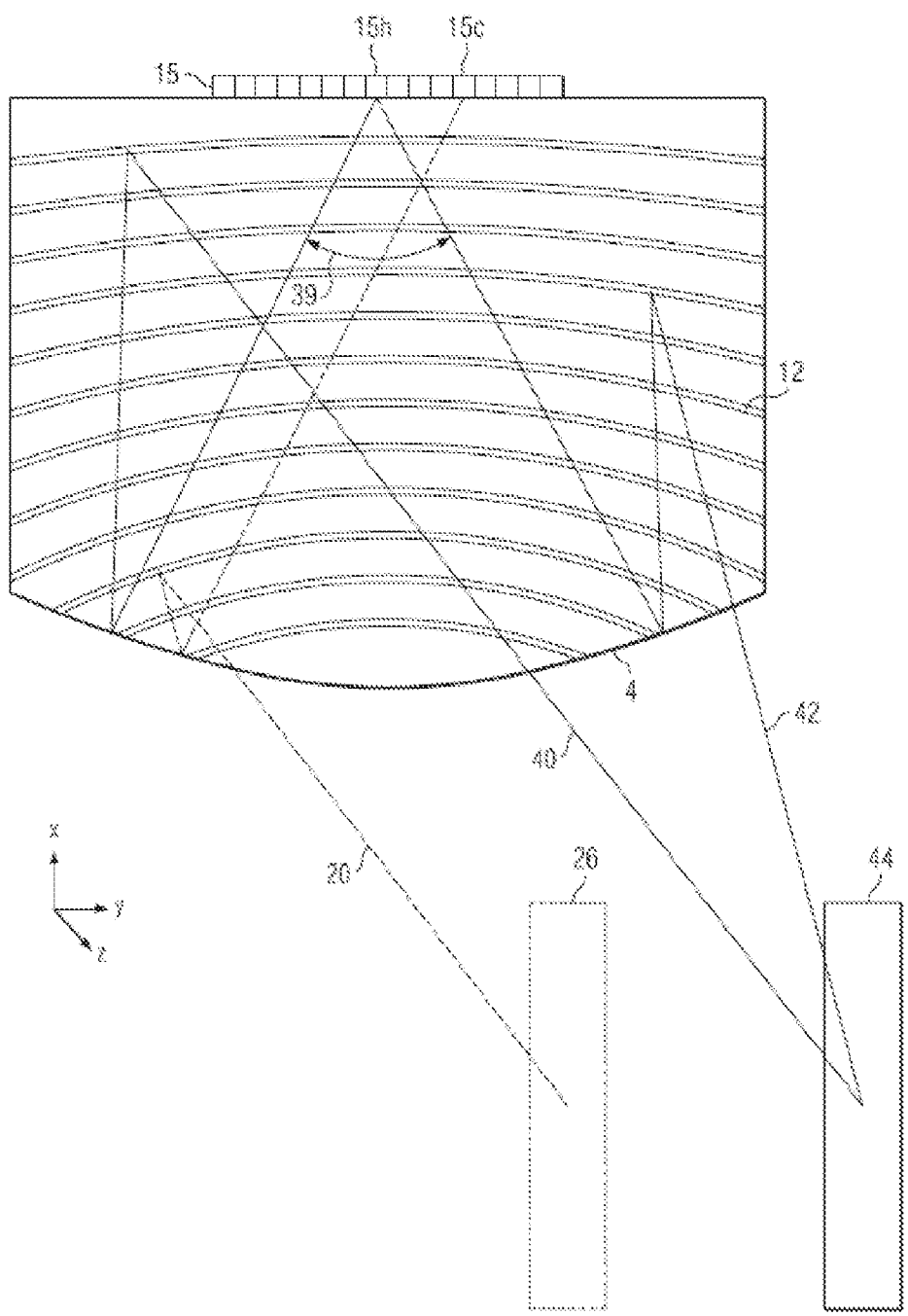
FIG. 4B is a schematic diagram illustrating in a front view, generation of a first and a second viewing window in a directional display device and including curved light extraction features, in accordance with the present disclosure.

FIG. 4B is a schematic diagram illustrating in front view a directional display device which may illuminated by a second illuminator element. Further, FIG. 4B shows the light rays 40, 42 from a second illuminator element 15h of the illuminator array 15. The curvature of the reflective surface on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective end 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
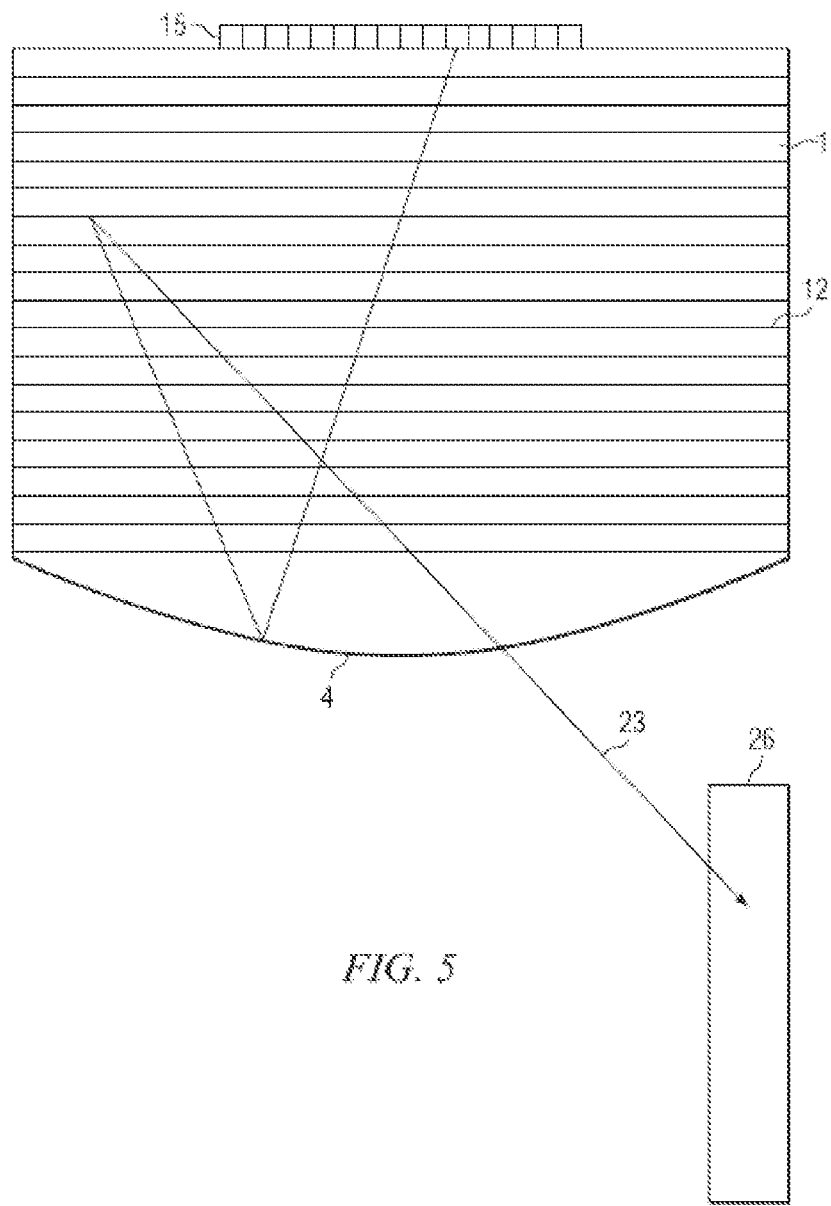
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device comprising a waveguide 1 having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
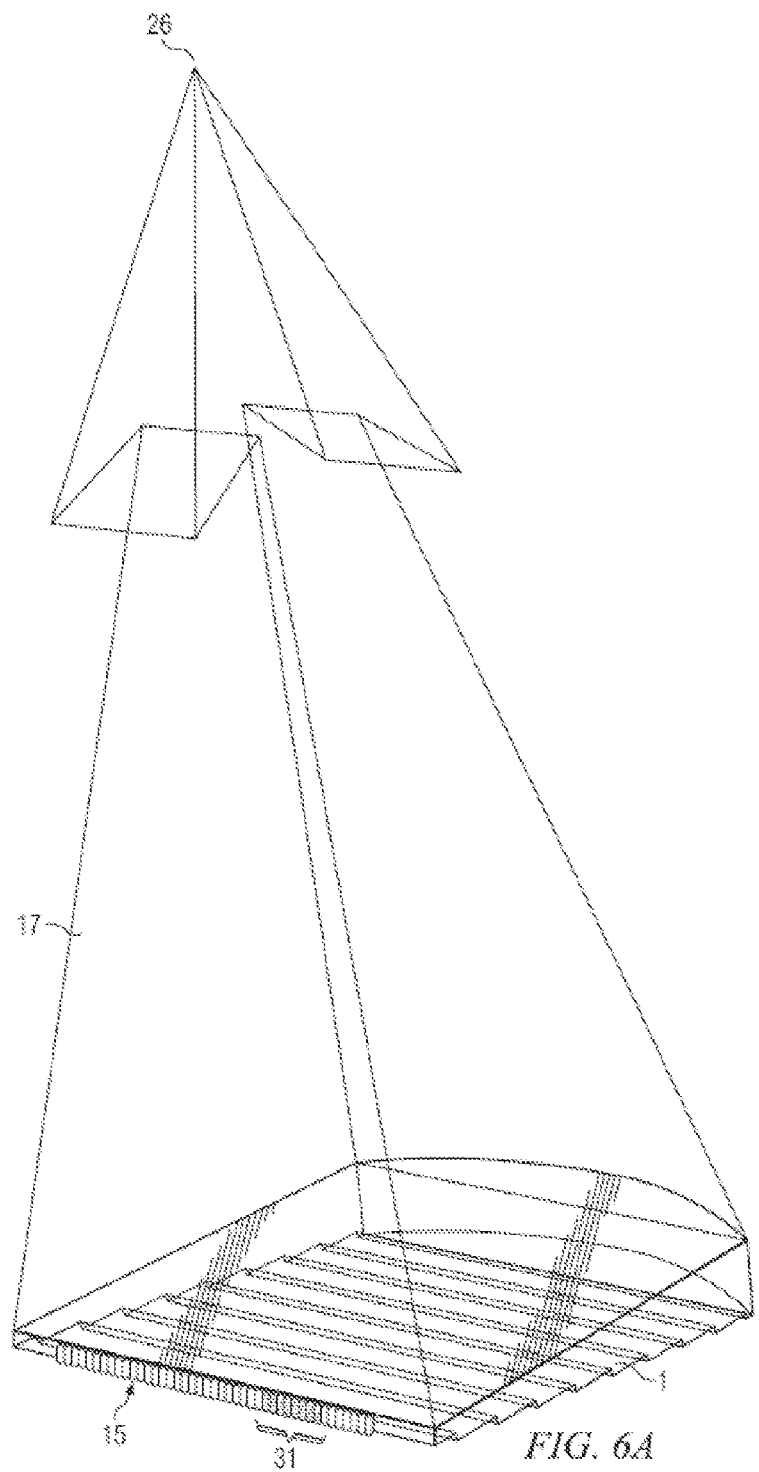
FIG. 6A is a schematic diagram illustrating one embodiment of the generation of a first viewing window in a time multiplexed imaging directional display device in a first time slot, in accordance with the present disclosure.
Figure 6B:
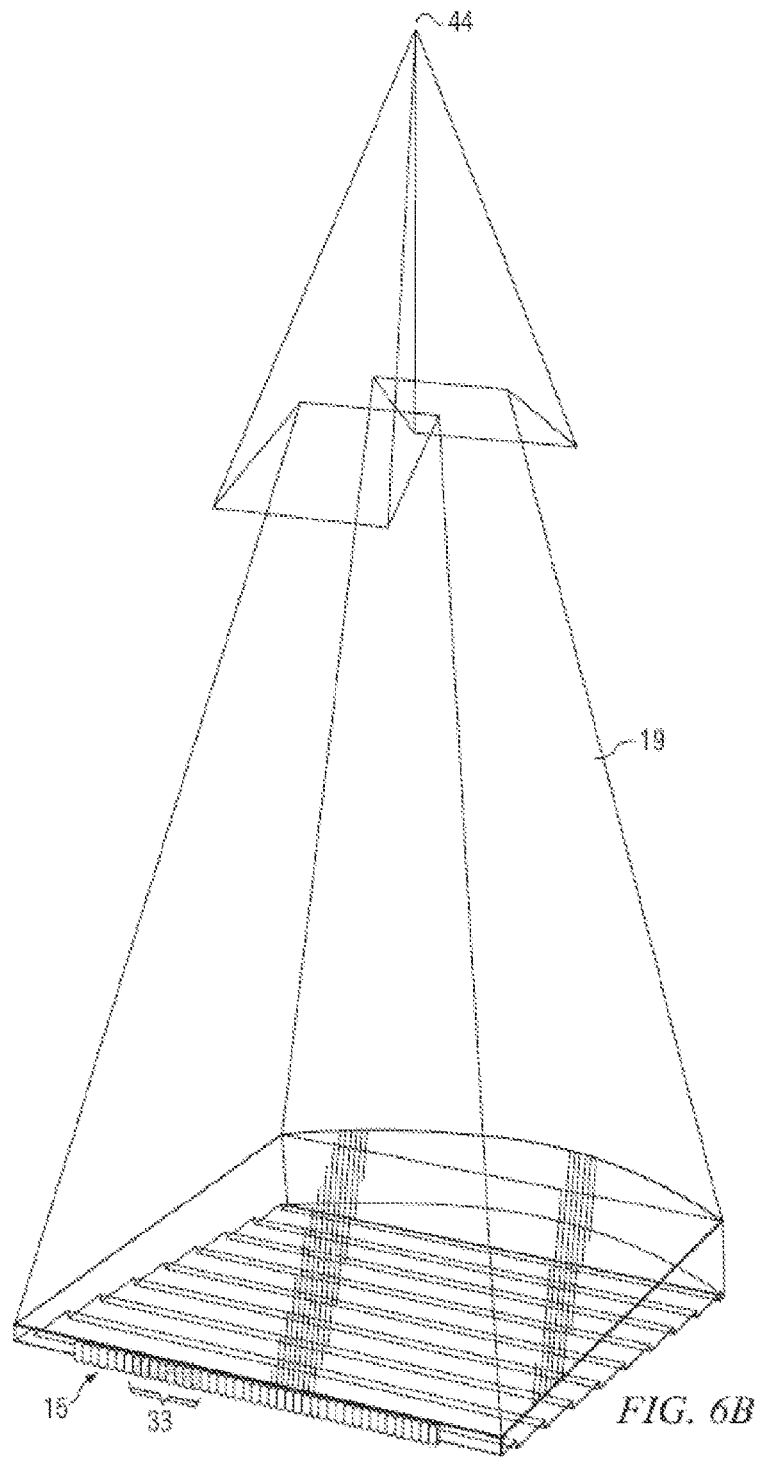
FIG. 6B is a schematic diagram illustrating another embodiment of the generation of a second viewing window in a time multiplexed directional display device in a second time slot, in accordance with the present disclosure.
Figure 6C:
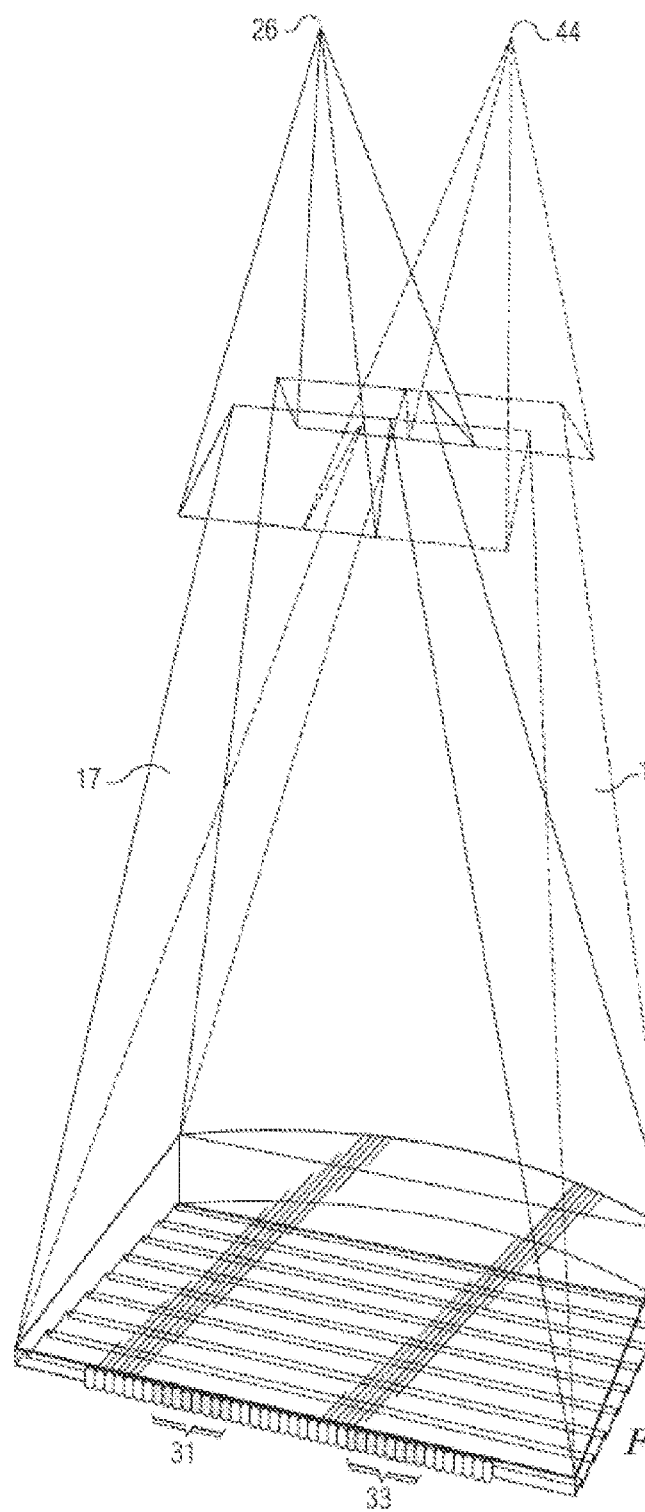
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device, namely an optical valve apparatus in a first time slot. FIG. 6B is a schematic diagram illustrating another embodiment of the generation of a second viewing window in a time multiplexed imaging directional backlight apparatus in a second time slot. FIG. 6C is a schematic diagram illustrating another embodiment of the generation of a first and a second viewing window in a time multiplexed imaging directional display device. Further, FIG. 6A shows schematically the generation of viewing window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a SLM 48 (not shown in FIGS. 6A, 6B, 6C) is adjusted in correspondence with the light direction output, then an autostereoscopic image may be achieved for a suitably placed viewer. Similar operation can be achieved with all the directional backlights and directional display devices described herein. Note that illuminator element groups 31, 33 each include one or more illumination elements from illumination elements 15a to 15n, where n is an integer greater than one.

FIG. 7 is a schematic diagram illustrating one embodiment of an observer tracking autostereoscopic directional display device including a time multiplexed directional backlight. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the directional backlights and directional display devices described herein.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the SLM 48. The two 2D images of FIG. 8 may be generated in a similar manner as described with respect to FIG. 7 in that the two images may be displayed in sequence and in synchronization with sources whose light is directed toward the two viewers. One image is presented on the SLM 48 in a first phase, and a second image is presented on the SLM 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
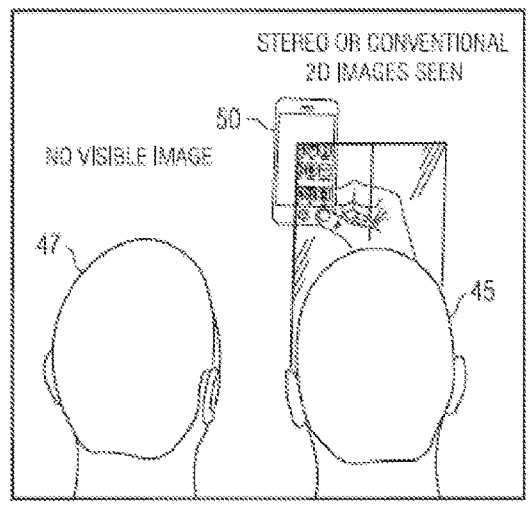
FIG. 9 is a schematic diagram illustrating a privacy directional display device, in accordance with the present disclosure.

FIG. 9 is a schematic diagram illustrating a privacy directional display device which includes an imaging directional backlight. 2D image display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
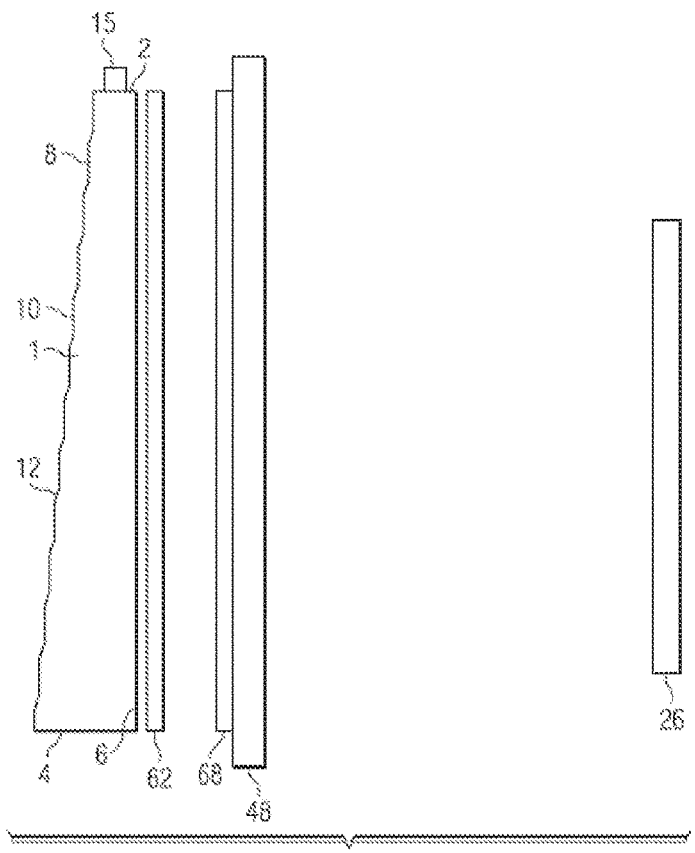
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 for a substantially collimated output across the stepped waveguide 1 output surface. A vertical diffuser 68 may be arranged to extend the height of the viewing window 26 further. The light may then be imaged through the SLM 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and SLM 48 arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

The first guide surface 6, may thus be arranged to guide light by total internal reflection and the second guide surface 8 may comprise a plurality of light extraction features 12 oriented to direct light guided through the waveguide 1 in directions allowing exit through the first guide surface 8 as the output light and intermediate regions 10 between the light extraction features that are arranged to guide light through the waveguide 1. The second guide surface 6 may have a stepped shape comprising facets that are said light extraction features 12, and the intermediate regions 10.

Figure 11A:
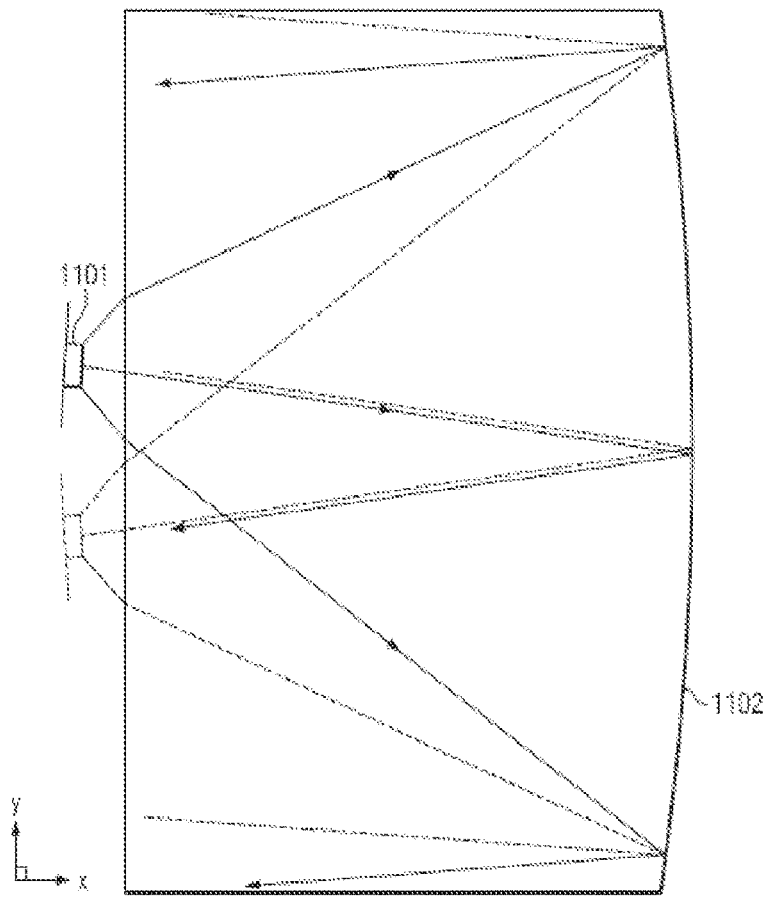
FIG. 11A is a schematic diagram illustrating a front view of a wedge type directional backlight, in accordance with the present disclosure.
Figure 11B:
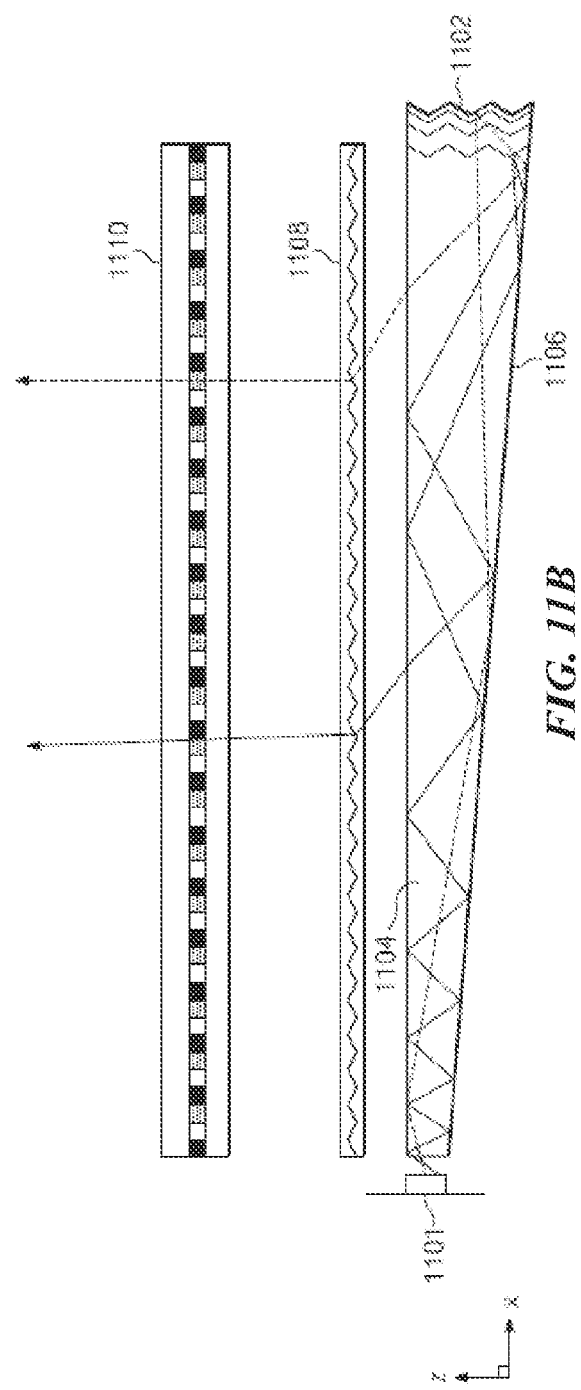
FIG. 11B is a schematic diagram illustrating a side view of a wedge type directional backlight, in accordance with the present disclosure.

FIG. 11A is a schematic diagram illustrating a front view of another imaging directional display device, as illustrated, a wedge type directional backlight, and FIG. 11B is a schematic diagram illustrating a side view of the same wedge type directional display device. A wedge type directional backlight is generally discussed by U.S. Pat. No. 7,660,047 and entitled "Flat Panel Lens," which is herein incorporated by reference in its entirety. The structure may include a wedge type waveguide 1104 with a bottom surface which may be preferentially coated with a reflecting layer 1106 and with an end corrugated surface 1102, which may also be preferentially coated with a reflecting layer 1106. As shown in FIG. 11B, light may enter the wedge type waveguide 1104 from local sources 1101 and the light may propagate in a first direction before reflecting off the end surface. Light may exit the wedge type waveguide 1104 while on its return path and may illuminate a display panel 1110. By way of comparison with an optical valve, a wedge type waveguide provides extraction by a taper that reduces the incidence angle of propagating light so that when the light is incident at the critical angle on an output surface, it may escape. Escaping light at the critical angle in the wedge type waveguide propagates substantially parallel to the surface until deflected by a redirection layer 1108 such as a prism array. Errors or dust on the wedge type waveguide output surface may change the critical angle, creating stray light and uniformity errors. Further, an imaging directional backlight that uses a mirror to fold the beam path in the wedge type directional backlight may employ a faceted mirror that biases the light cone directions in the wedge type waveguide. Such faceted mirrors are generally complex to fabricate and may result in illumination uniformity errors as well as stray light.

A directional backlight apparatus may thus comprise a first guide surface is arranged to guide light by total internal reflection and second guide surface that is substantially planar and inclined at an angle to direct light in directions that break that total internal reflection for outputting light through the first guide surface, and the display device may further comprise a deflection element extending across the first guide surface of the waveguide for deflecting light towards the normal to the first guide surface.

The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There follows a description of some directional display apparatuses including a directional display device and a control system, wherein the directional display device includes a directional backlight including a waveguide and an SLM. In the following description, the waveguides, directional backlights and directional display devices are based on and incorporate the structures of FIGS. 1 to 11B above. Except for the modifications and/or additional features which will now be described, the above description applies equally to the following waveguides, directional backlights and display devices, but for brevity will not be repeated.

Figure 12:
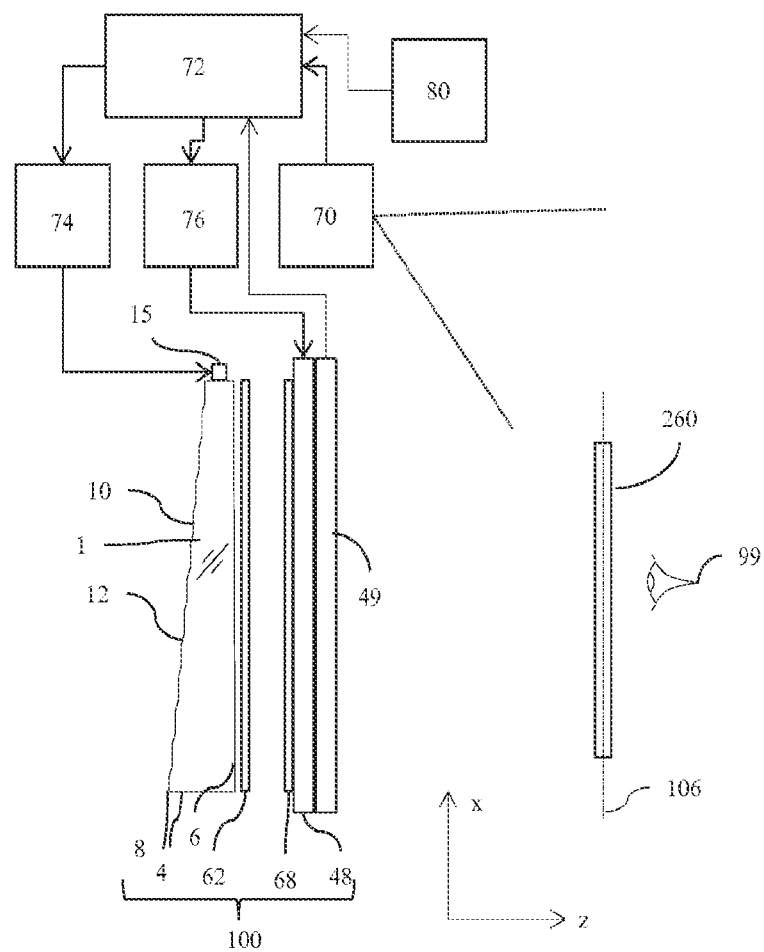
FIG. 12 is a schematic diagram illustrating a directional display apparatus comprising a display device and a control system, in accordance with the present disclosure.

FIG. 12 is a schematic diagram illustrating a directional display apparatus comprising a display device 100 and a control system. The arrangement and operation of the control system will now be described and may be applied, changing that which is appropriate to be changed, to each of the display devices disclosed herein. As illustrated in FIG. 12, a directional display device 100 may include a directional backlight device that may itself include a stepped waveguide 1 and a light source illuminator array 15. As illustrated in FIG. 12, the stepped waveguide 1 includes a light directing side 8, a reflective end 4, guiding features 10 and light extraction features 12. The directional display device 100 may further include an SLM 48.

The waveguide 1 is arranged as described above. The reflective end 4 converges the reflected light. A Fresnel lens 62 may be arranged to cooperate with reflective end 4 to achieve optical windows 260 at a viewing plane 106 observed by an observer 99. A transmissive SLM 48 may be arranged to receive the light from the directional backlight. Further a diffuser 68 may be provided to substantially remove Moiré beating between the waveguide 1 and pixels of the SLM 48 as well as the Fresnel lens structure 62. Viewing windows 26 may be composed of a group of optical windows 260. Each optical window may be formed by one of the array 15 of light emitting elements and thus viewing windows 26 may be formed by groups of light emitting elements of array 15.

The control system may comprise a sensor system arranged to detect the position of the observer 99 relative to the display device 100. The sensor system comprises a position sensor 70, such as a camera, and a head position measurement system 72 that may for example comprise a computer vision image processing system. The control system may further comprise an illumination controller 74 and an image controller 76 that are both supplied with the detected position of the observer supplied from the head position measurement system 72.

The illumination controller 74 selectively operates the illuminator elements 15 to direct light to into the viewing windows 26 in cooperation with waveguide 1. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 76 controls the SLM 48 to display images. To provide an autostereoscopic display, the image controller 76 and the illumination controller 74 may operate as follows. The image controller 76 controls the SLM 48 to display temporally multiplexed left and right eye images. The illumination controller 74 operate the light sources 15 to direct light into respective viewing windows in positions corresponding to the left and right eyes of an observer synchronously with the display of left and right eye images. In this manner, an autostereoscopic effect is achieved using a time division multiplexing technique.

Thus a directional backlight apparatus may comprise a directional backlight comprising a waveguide 1 comprising first and second, opposed guide surfaces 6, 8 for guiding input light along the waveguide 1. An array of light sources 15 may be arranged to generate the input light at different input positions in a lateral direction across the waveguide 1, the waveguide further comprising a reflective end 4 for reflecting input light back through the waveguide 1, the second guide surface 8 being arranged to deflect light after reflection from the reflective end 4 as output light through the first guide surface 6, and the waveguide 1 being arranged to direct the output light into optical windows 260 in output directions that are distributed in a lateral direction in dependence on the input position of the input light; and a sensor system 70 arranged to detect the position of the head of an observer 99. A backlight apparatus may further comprise a transmissive spatial light modulator 48 arranged to receive the output light from the first guide surface 8 of the waveguide 1 and to modulate it to display an image. A display apparatus may be an autostereoscopic display apparatus wherein the control system 72 may be further arranged to control the spatial light modulator 48 to display temporally multiplexed left and right images and synchronously to selectively operate groups of adjacent light sources of the array 15 to direct the displayed left and right images into respective groups of adjacent optical windows 260 in positions corresponding to left and right eyes of an observer.

Further sensors including ambient light sensor 80 and accelerometer 82 may be arranged to provide further data to control system 72. Data from sensor 80 may be arranged to control the total luminous flux 263 for light emitting elements of array 15. For example, in high ambient light conditions, the luminous flux 263 may be increased.

Figure 13:
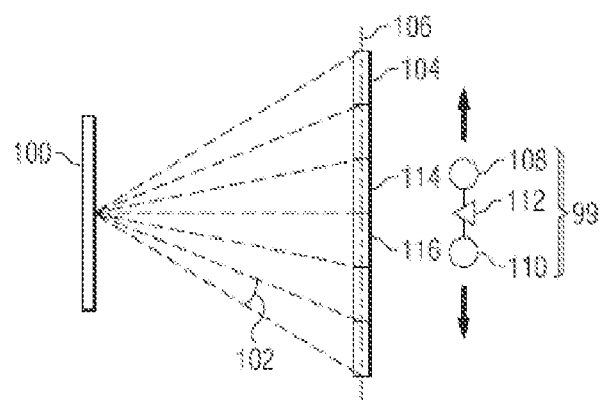
FIG. 13 is a schematic diagram illustrating in top view, the formation of viewing windows, in accordance with the present disclosure.

FIG. 13 is a schematic diagram illustrating in front view, the formation of viewing windows. Further, FIG. 13 shows in top view, the embodiment of FIG. 12. Display 100 may produce a fan of light cones 102 and an array of viewing windows 104 in the window plane 106, being a nominal plane. An observer 99 with nose location 112 may see illumination from display 100. When a left eye 110 is approximately aligned with viewing window 116 and a right eye 108 is approximately aligned with viewing window 114 and image data presented in viewing windows 114 and 116 is a stereo pair, then an autostereoscopic 3D image may be perceived by the observer. The windows 114 and 116 may alternatively show substantially the same data so the display device 100 may function in as a 2D image display device. The windows 114 and 116 may be illuminated in separate time slots in synchronization with the display on the panel of left and right eye image data.

There will now be described various arrangements of viewing windows. Each of these may be provided by appropriate operation of the control system as described above, for example by selectively operating the illuminator elements 15 to direct light to into the viewing windows 26 in synchronization with the display of images on the SLM 48. The directional display apparatus may be operable to provide any one of these viewing window arrangements, or any combination of these viewing window arrangements at the same or different times, for example in different modes of operation of the directional display apparatus.

In the various drawings illustrating arrangements of viewing windows, the structure of optical windows illustrates the nominal position of the optical windows rather than the actual light distributions which may take a variety of forms and may overlap.

FIGS. 14A and 14B illustrate the control performed by the control system on the basis of the output of the sensor system in response to the observer moving. FIG. 14A is a schematic diagram illustrating in front view, a first viewing window arrangement. Further, FIG. 14A shows in front view the embodiment of FIG. 12. The observer 99 is illustrated as slightly to the right of a plane 118 normal to the approximate center of the display 100. Accordingly left and right eye viewing windows 114, 116 may be generated slightly to the right of the display. In FIG. 14B the observer 99 is illustrated as being repositioned in direction 120 to the right and so windows 114, 116 may be steered to the right in response. FIG. 14B is a schematic diagram illustrating in front view, a second viewing window arrangement for a moving observer. The left and right eyes of the observer may be illuminated with left and right eye image data during observer movement.

Window movement may be provided by mechanical movement of the illuminator array 15 in correspondence with observer 99 movement in the window plane 106. However, such movement is complicated and expensive. It is thus desirable to achieve a reduction in the cost and complexity of movement of illuminator elements of illuminator array 15 through switching of discrete illuminator elements, under the control of the control system.

FIG. 15 is a schematic diagram illustrating the appearance of windows of FIG. 14A in the window plane 106. Further, FIG. 15 shows schematically an array 121 of optical windows (that may also be referred to as sub-windows) which may be arranged to achieve a switchable array of viewing windows. Each optical window of the array 121 may correspond to the image in the window plane 106 such as shown in FIGS. 12 and 13 of a illuminator element of the illuminator array 15, as described above.

The illuminated structure of an optical window array 121 in the window plane 106 may approximately correspond to the lateral location of observer 99 as shown in FIG. 14A. In the present embodiment viewing window 116 for the left eye may include optical window 122 and the optical window array 134. The right eye viewing window 114 may include optical window 124 and optical window array 136. Optical windows 126 and 128 may not be illuminated, so that the respective illuminator elements may not be illuminated.

FIG. 16 is a schematic diagram illustrating the appearance of windows of FIG. 14B in the window plane for a moving observer. Further, FIG. 16 shows the detail of the optical window array 121 approximately corresponding to the location of observer 99 as shown in FIG. 14B after movement in direction 120. The left eye viewing window 116 may be arranged to include optical window 126 and optical window array 134. Thus, optical window 122 may be turned off. Similarly for the right eye viewing window, optical window 128 may be turned on and optical window 124 may be turned off, so that the right eye viewing window 114 is arranged to include optical window 128 and optical window array 136.

Further, the image data on the SLM 48 may be adjusted to advantageously achieve a look-around function, a two dimensional image or other image characteristics as described herein.

The luminous intensity of a display device is a measure of the power emitted by the display device in a particular direction per unit solid angle. The brightness of the display device 100 as perceived by the observer 99 is elicited by the luminance which is a photometric measure of the luminous intensity per unit area of light traveling in a given direction. The illuminator elements of the array 15 provide respective luminous flux. The luminous flux under consideration is the total luminous flux emitted. This may be derived by integrating the luminous flux emitted by the illuminator elements 15n over the direction perpendicular to the lateral direction.

Variation of the luminous flux linear density of the light source array allows the perceived brightness to be controlled, for example allowing the perceived brightness (luminance) to be varied for different positions of the observer 99 and/or power consumption to be minimized for a given perceived brightness.

Figure 17:
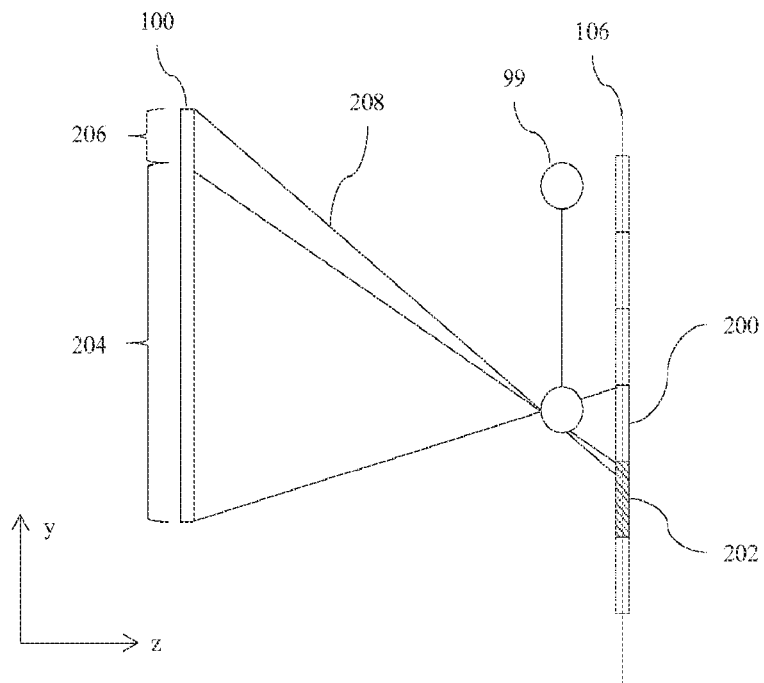
FIG. 17 is a schematic diagram illustrating in top view the propagation of light to optical windows in a directional display, in accordance with the present disclosure.
Figure 18:
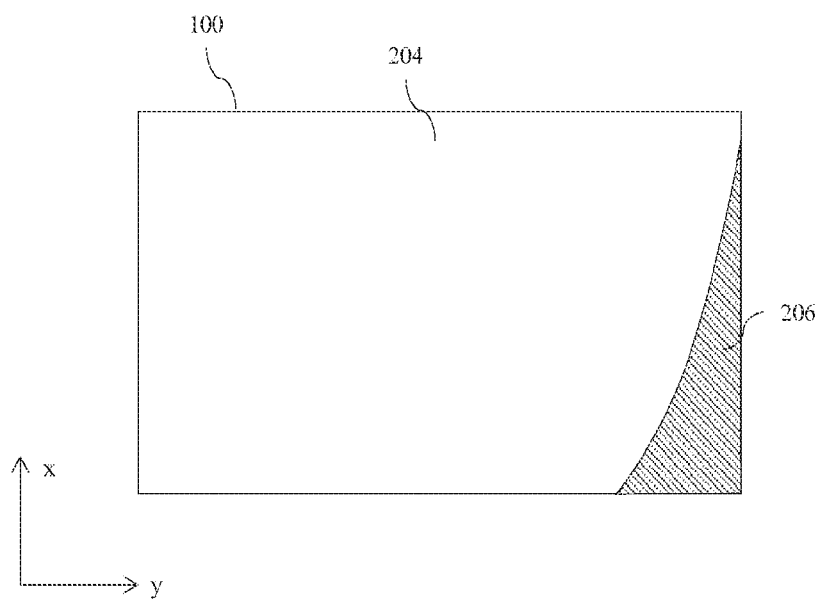
FIG. 18 is a schematic diagram illustrating in front view the appearance of the display for the observer of FIG. 17, in accordance with the present disclosure.

FIG. 17 is a schematic diagram illustrating in top view the propagation of light to optical windows in a directional display. FIG. 18 is a schematic diagram illustrating in front view the appearance of the display for the observer of FIG. 17.

Directional backlight 100 may be arranged to illuminate optical windows 200, 202 at the nominal window plane 106. For an observer 99 not at the window plane, light seen on the display may not arise from illumination of a single optical window. Thus in region 204 light for optical window 200 may be seen from the display, whereas in region 206 light for optical window 202 may be seen from the display. Further, the aberrations in the optical system of the backlight mean that the region from which the display appears illuminated by adjacent optical windows are non-linear; in particular corners of the display, with highest angles may be vulnerable to artifacts arising from illumination of adjacent LEDs of the array 15. In particular in tracking schemes when adjacent LEDs (to form optical window 202) are switched during observer tracking in the manner shown in FIGS. 15-16, then flicker may be seen in the region 206.

Figure 19:
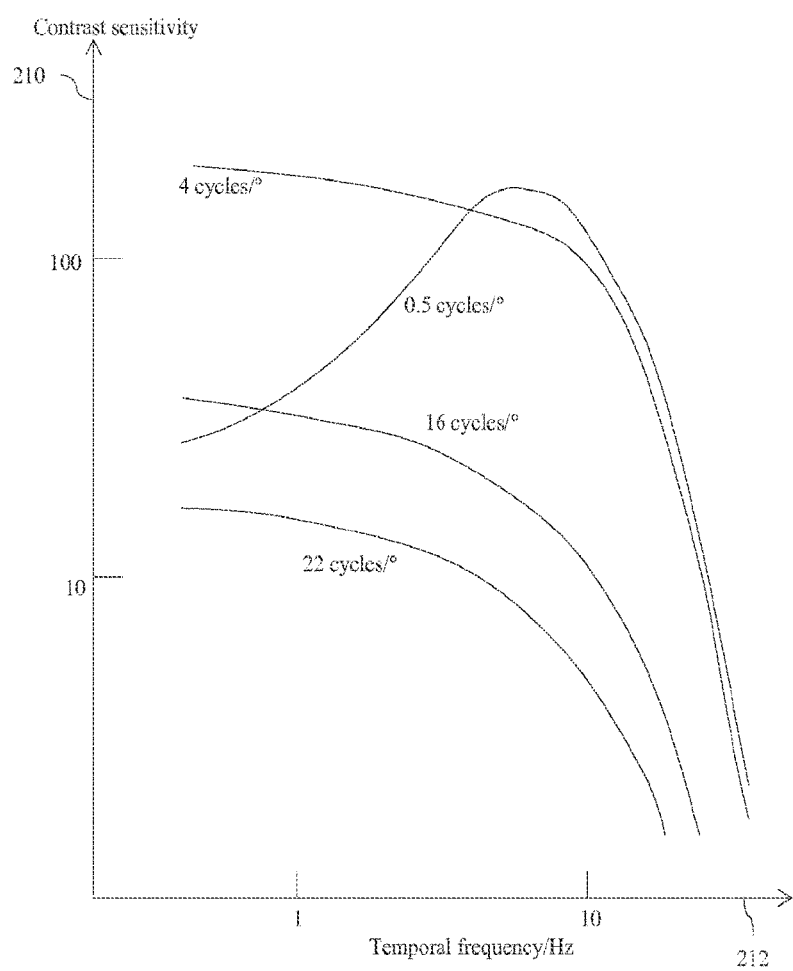
FIG. 19 is a schematic diagram illustrating a graph of contrast sensitivity against temporal frequency for varying spatial frequencies, in accordance with the present disclosure.

FIG. 19 is a schematic diagram illustrating a graph of contrast sensitivity 210 against temporal frequency 212 for varying spatial frequencies, for example as described in "Spatial and Temporal Contrast-Sensitivity Functions of the Visual System", J. G. Robson, J. Opt. Soc. Am. 56, 1141-1142 (1966). In an illustrative example a display viewed from 400 mm with window artifacts such as shown by region 206 in FIG. 18 of size 3.5 mm has a spatial frequency of 0.5 cycles per degree. For an observer with eye spacing of 62 mm moving at 100 mm/s, and five interocular optical windows then the optical windows need to be updated at 8 Hz. Such a combination of characteristics suggests that the flicker artifacts arising in region 206 are close to the peak of human visual contrast sensitivity.

It may be desirable to reduce the visibility of display flicker for a moving tracked observer.

Embodiments for high brightness and high efficiency 2D displays using directional backlights will now be described.

Figure 20A:
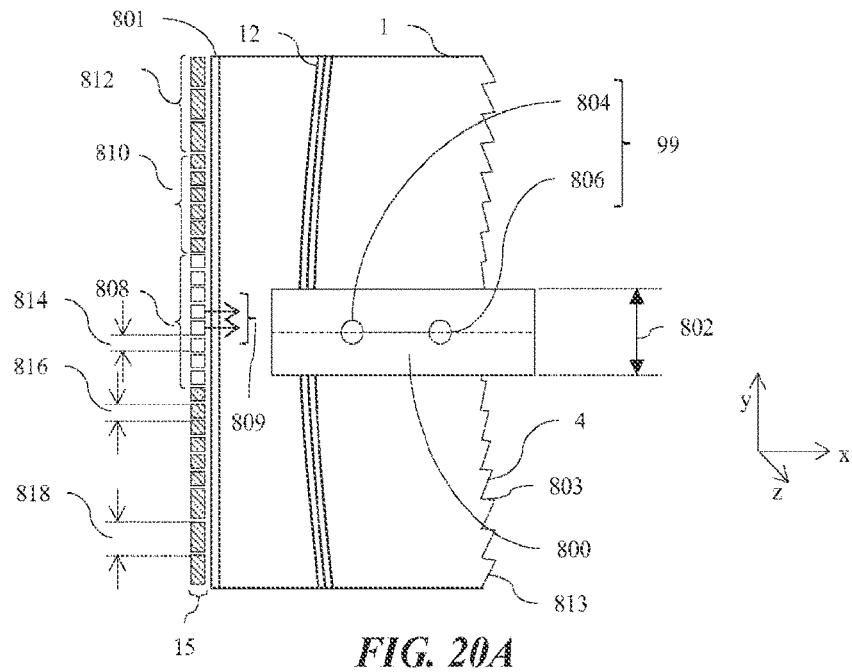
FIG. 20A is a schematic diagram illustrating a front view of an optical valve arranged in portrait orientation to provide a horizontal 2D viewing window, in accordance with the present disclosure.
Figure 20B:
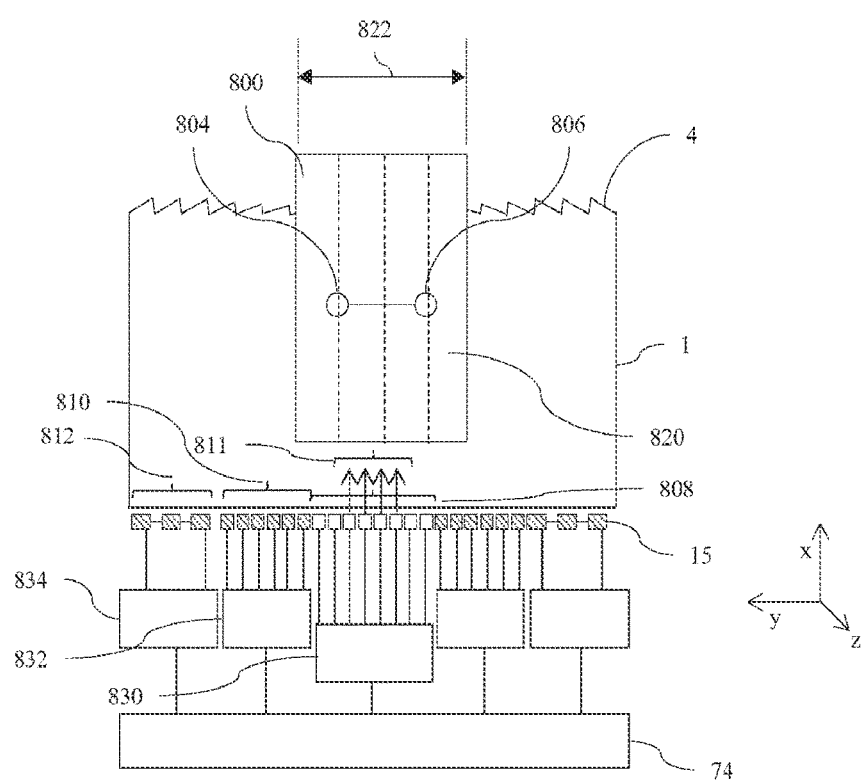
FIG. 20B is a schematic diagram illustrating a front view of an optical valve arranged in landscape orientation to provide a vertical 2D viewing window, in accordance with the present disclosure.

FIG. 20A is a schematic diagram illustrating a front view of an optical valve arranged in portrait orientation to provide a horizontal 2D viewing window. FIG. 20B is a schematic diagram illustrating a front view of an optical valve arranged in landscape orientation to provide a vertical 2D viewing window.

Control system 72 as shown in FIG. 12 may be arranged to selectively operate a group of adjacent light sources of array 15 to direct light into a corresponding group 224 of adjacent optical windows 260.

The backlight arrangement of FIG. 20A produces a horizontal viewing window 800 with a portrait oriented optical valve waveguide 1 illuminated with a vertical LED array 15 for use in a high brightness or high efficiency display apparatus. Note that the coordinate axes are referenced to the waveguide orientation rather than the observer space, thus horizontal viewing window 800 is provided for an observer 99 with left eye position 804 and right eye position 806.

Reflective end 4 may comprise a Fresnel mirror arranged to substantially collimate light from sources of the array 15 from reflecting facets 813. The reflective end 4 may thus have positive optical power in the lateral direction (y-axis). In cooperation with Fresnel mirror at the end 4, the curved extraction features 12 may be arranged to form viewing window 800. The light extraction features 12 thus have positive optical power in the lateral direction.

Advantageously a Fresnel mirror may achieve a small bezel in comparison with the domed surface 4 shown in FIG. 4B for example. The draft facets 803 of the Fresnel mirror may provide scatter in the optical system. Scatter in such a high brightness or high efficiency 2D display may achieve desirable levels of uniformity of viewing windows without the constraints of low image cross talk that are desirable in autostereoscopic displays. Further diffusion properties maybe incorporated in the draft facets 803 to minimize non-uniformity effects of the light reflected from the facets 803.

Input diffuser 801 may be an asymmetric diffuser with high diffusion in the x-y plane and low diffusion in the x-z plane, arranged to reduce the visibility of the gaps between the LEDs of the array 15 without substantially increasing loss of light coupling into the waveguide in the x-z plane.

The input diffuser 801 may be arranged with diffusion properties that are different in the region of groups 812 than in the region of groups 810 for example.

Light emitting element array 15 such as an LED array may comprise a first group 808 of LEDs that may have high brightness output capability; second groups 810 of LEDs that have similar pitch 816 to the pitch 814 LEDs of the group 808 and third groups 812 of LEDs that may have a pitch 818 that may be greater than the pitch 814 of the LEDs of the group 808. Further groups may be incorporated or there may be a gradual increase of pitch from the center of the array 15 to the outer regions for example. The LEDs of the group 808 may have higher brightness output but lower efficiency than the LEDs of the groups 810, 812.

In operation in a high brightness mode of operation, LEDs 809 of the first group 808 may be directed by means of the optical valve arrangement to the viewing window 800 comprising two optical windows and size 802. Thus an observer 99 with eyes located at positions 804, 806 may see an image across the area of the SLM 48 (not shown).

In an illustrative example a display of diagonal may be illuminated by LEDs in the first group 808 of size 2.6×1 mm on a pitch of 3.5 mm. The output of the LEDs may be 50 lumens at 600 mW, thus a total power of 1.2 W may be arranged to provide window 800. An optical valve of height 50 mm suitable for mobile phone applications may be arranged to provide viewing windows at 300 mm viewing distance, with window height 802 of approximately 60 mm. In cooperation with polarization recirculation and faceted reflection film 300, the on-axis output luminance of the display may be approximately at least 2000 nits when used in cooperation with an LCD of transmission of 6.5% to unpolarized light. The reflections from the front of the display may for example be 5%. At screen illuminance of 25,000 lux a contrast ratio of 5:1 may be achieved in comparison to a contrast ratio of 1.3:1 for a display of luminance 500 nits. Thus advantageously the contrast ratio of the display may be substantially enhanced in high brightness environments.

For operation at 500 nits display luminance, a power consumption of 300 mW may be achieved. Advantageously, the brightness of the display is substantially higher than can be achieved for the same input power in a conventional backlight, for example a display comprising ESR™, BEF II™ and DBEF™ from 3M Corporation and diffusers.

Continuing the illustrative example herein, the LEDs of the group 808 may have a luminous efficiency of 60 lumens per Watt (lm/W), whereas the luminous efficiency of the LEDs of the groups 810, 812 may be 80 lm/W at a peak drive luminous flux of 20 lumens. The pitch 818 may be 5 mm or greater. Input diffuser 801 may vary in its diffusion properties along the entrance aperture to accommodate the different LED spacing. Advantageously the cost and number of the LEDs in the groups 810, 812 may be reduced.

Figure 42:
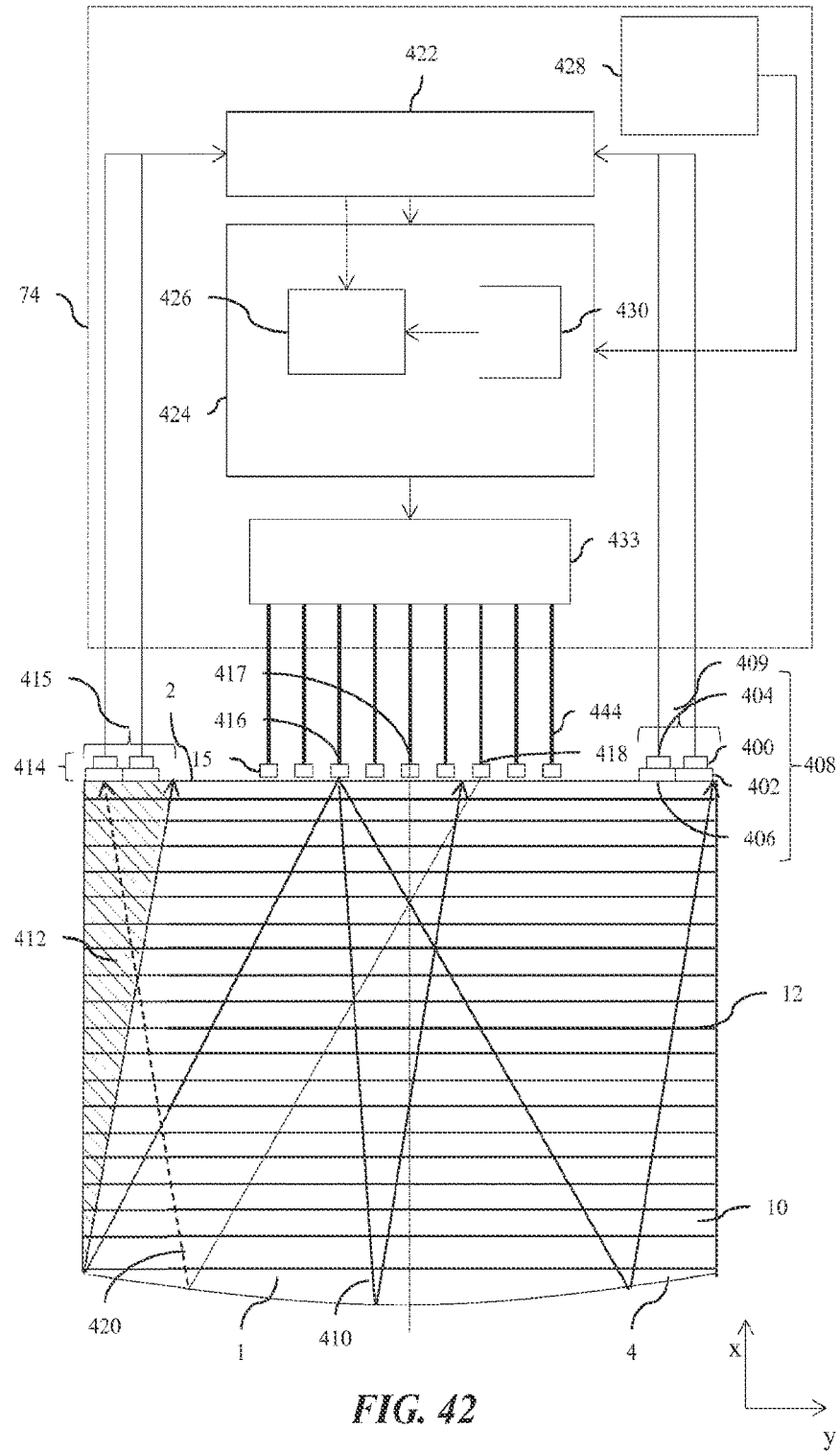
FIG. 42 is a schematic diagram illustrating a control system to calibrate light source array optical output, in accordance with the present disclosure.

FIG. 20B illustrates a similar illumination system to that of FIG. 20A arranged in landscape orientation with respect to observer 99, achieving vertical viewing window 800 comprising four optical windows when illuminated by LEDs of group 811. To continue the illustrative example, the viewing window width may be increased to approximately 120 mm, comprising four optical windows. Further FIG. 42 illustrates LED drive circuits 830, 832, 834 and controller 74 may be arranged to individually drive the LEDs of group 808 with a high current demand and LEDs of group 810 with a lower current demand. Further the LEDs of group 812 may be driven by driver 834 as a string, to reduce the cost of the driver 834 in comparison to the drivers 830, 832. In this manner, angles near the axis of the display can be arranged to provide operation in high brightness environments whereas the angles more off-axis can be arranged to provide observer tracked low power mode operation and LED strings 812 can be driven when the display is required to operate in wide angle mode, that is a directional distribution that is similar to a standard 2D display.

The 2D display optical window arrangements of FIGS. 20A-B may have a reduced number of LEDs compared to autostereoscopic display arrangements. Advantageously the cost of array 15 may be reduced and the mean time between failure of the array may be increased.

It is further desirable to reduce the number of illuminated LEDs to maximize display efficiency.

Figure 21A:
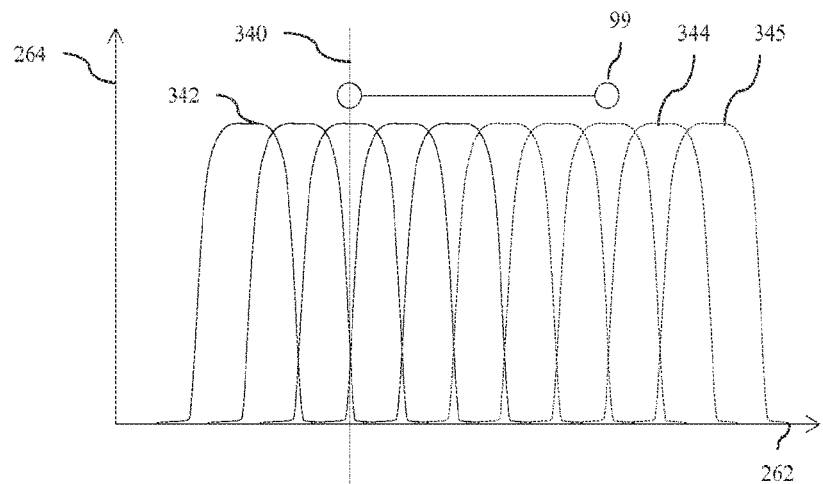
FIG. 21A-21B are schematic diagrams illustrating graphs of optical window luminous intensity against position in the window plane for an autostereoscopic display in first and second viewing positions respectively, in accordance with the present disclosure.
Figure 21B:
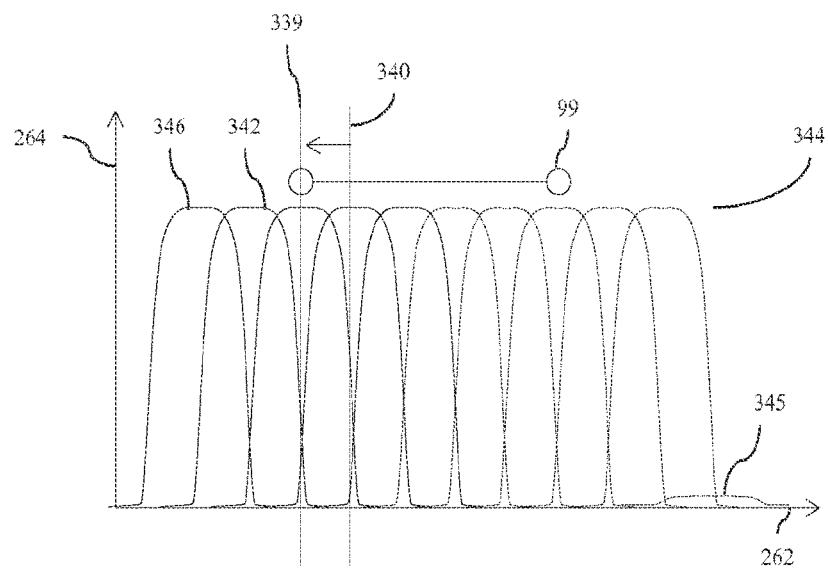
Figure 22A:
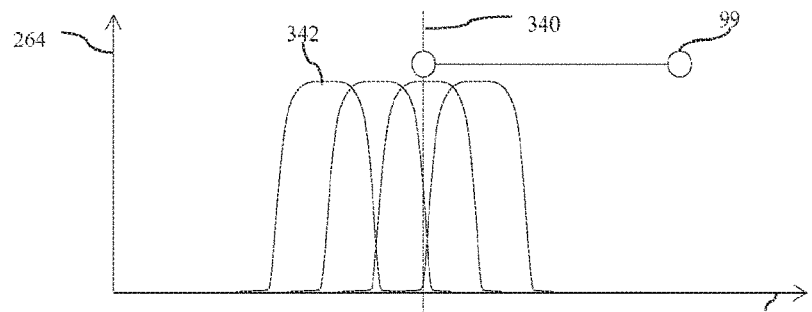
FIG. 22A-22D are schematic diagrams illustrating graphs of optical window luminous intensity against position in the window plane for the control of the intensity of the luminous intensity of optical windows for an autostereoscopic display for a moving observer, in accordance with the present disclosure.
Figure 22B:
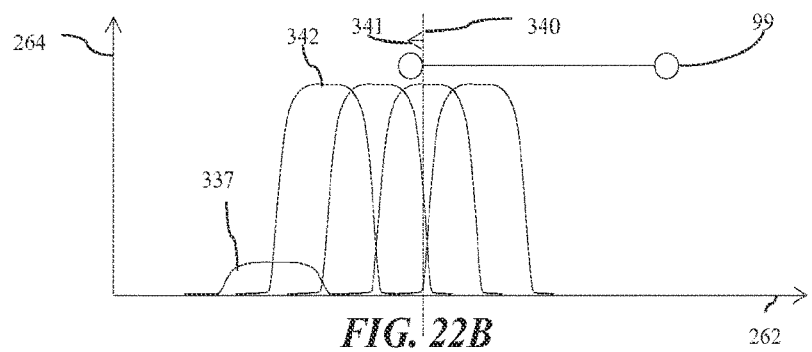
Figure 22C:
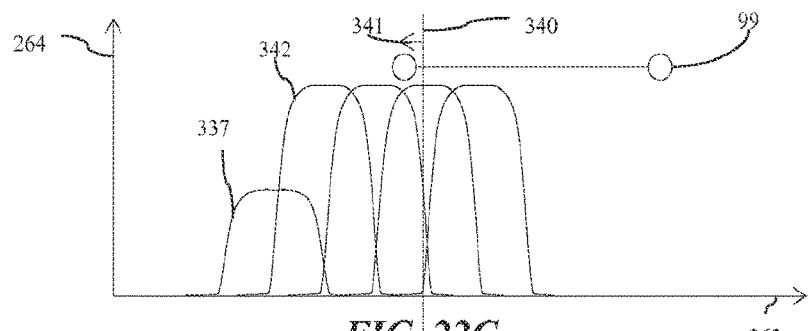
Figure 22D:
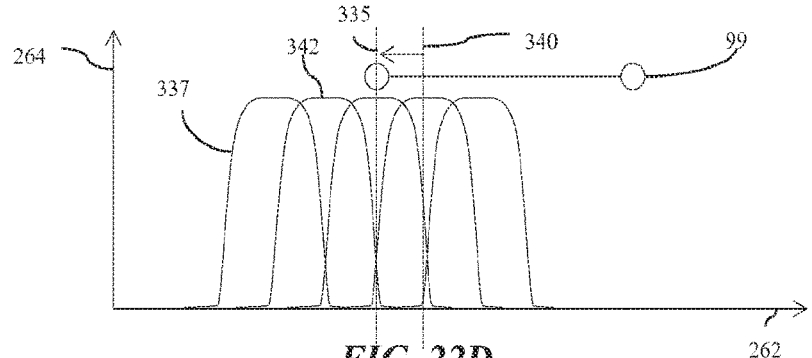

FIG. 21A-21B are schematic diagrams illustrating graphs of optical window luminous intensity 264 against position 262 in the window plane 106 for an autostereoscopic display in first and second viewing positions respectively. Further the tracking methods of FIGS. 15 and 16 are illustrated in FIGS. 21A-21B with large viewing windows, such as with 30 mm pitch. Thus in a first position 340 for the left eye of observer 99 a set of optical windows is provided with outer window 342. In a second position 339 additional optical window 346 may be illuminated. As shown in FIG. 18 the light from optical window 346 can be visible to an observer 99 away from the window plane 106 and can thus create undesirable flicker artifacts in regions 206. Increasing the number of optical windows further can reduce the size of the region 206 during switching of additional optical windows. However increasing the number of optical windows can reduce maximum display brightness, decrease system efficiency or increase display cross talk.

It may be desirable to provide a directional backlight for a display that uses large optical window size while achieving low flicker for a moving observer.

FIG. 22A-22D are schematic diagrams illustrating graphs of optical window luminous intensity against position in the window plane for the control of the luminous intensity of optical windows for an autostereoscopic display for a moving observer. The figures show the left image phase viewing windows for observer 99 at various positions with displacement 341 of the left eye from a starting position 340.

In comparison with the arrangement of FIG. 21A-21B the luminous intensity of outer window 337 may be varied according to position 341 of the left eye of observer 99. A transitional range 335 is provided to define the range of positions over which the luminous intensity of the optical window 337 is arranged to vary.

FIGS. 23A-23D are schematic diagrams illustrating graphs of light emitting element luminous fluxes 263 against position 261 of LEDs in the light emitting element array 15 corresponding to the luminous intensity distributions of FIG. 22A-22D. Thus in a first group 361 outer LED 363 may have a 100% luminous flux output. For the moving observer the number of LEDs in the group 365 of LEDs has increased, and the luminous flux 263 of the outer LED light source 367 has increased by an amount corresponding to measured observer position.

In this manner the identity of the light sources in the group 361 varies (incorporating LED light source 367 for certain observer positions), and for a given group 361 of light sources the luminous flux 263 of the light sources varies, in accordance with the detected position of the head of the observer 99.

The control system 70, 72, 74, 76, 80, 82 as shown in FIG. 12 may be arranged to selectively operate a group of adjacent light sources of the array 15 in a manner in which for a given group 361 of light sources the luminous flux 263 of the light sources varies across a transitional range 335 of the detected position of the head of the observer 99. The transitional range may be the same as the pitch of the optical windows 342, 337 in the window plane 106.

The control system may be arranged to selectively operate a group 361 of adjacent light sources in a manner in which, across the transitional ranges 335 of the detected position 262 of the head of the observer 99, a new light source 367 is operated as a member of the group 361 with a luminous flux 263 that increases as the detected position of the head of the observer 99 moves towards the output direction corresponding to the new light source 367.

The control system may be arranged to selectively operate a group 369 of adjacent light sources 363 in a manner in which, across ranges 335 of the detected position 262 of the head of the observer 99 intermediate positions 341 of the transitional ranges, the identity and luminous flux 263 of the light sources in the group 369 does not vary.

Advantageously the intensity change that may occur in region 206 will have a grey scale characteristic for observer movement. Such a change may achieve a reduction in flicker of the display in the region 206, and thus display performance will be improved. Further the optical window size can be increased, reducing cost and increasing reliability of the array 15.

Figure 23A:
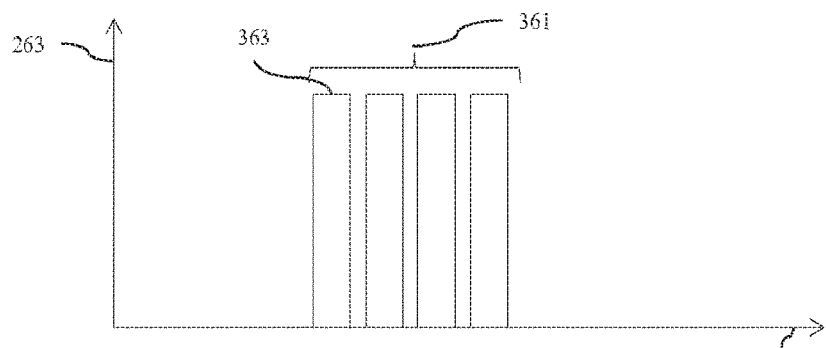
FIGS. 23A-23D are schematic diagrams illustrating graphs of light emitting element luminous flux against position in the light emitting element array for the control of the intensity of the luminous intensity of optical windows for an autostereoscopic display for a moving observer, in accordance with the present disclosure.
Figure 23B:
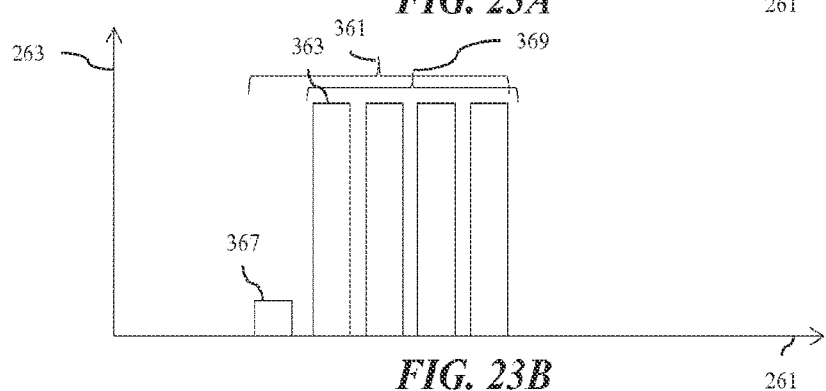
Figure 23C:
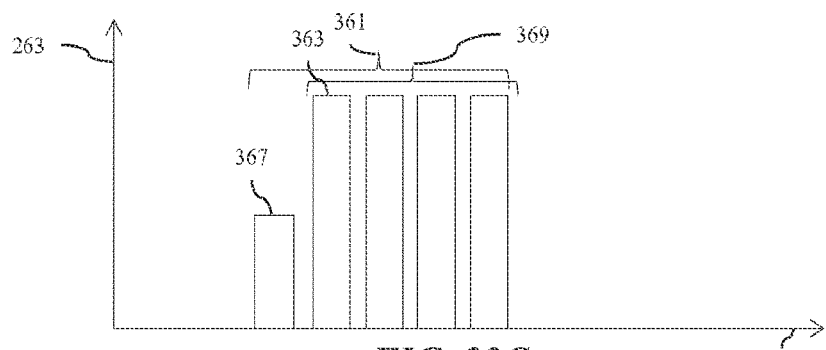
Figure 23D:
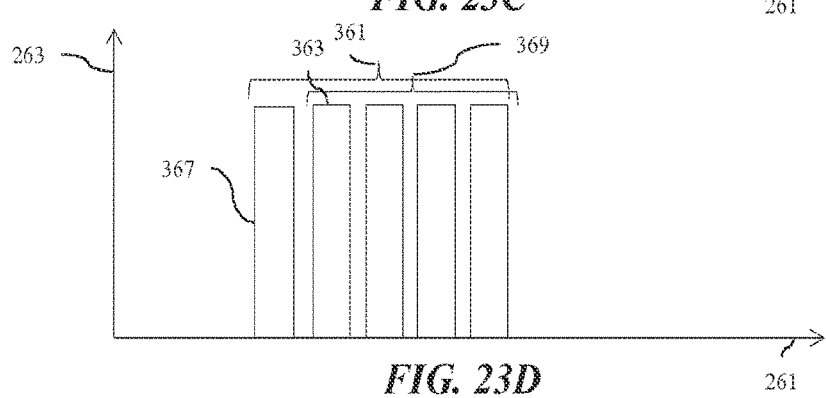
Figure 23E:
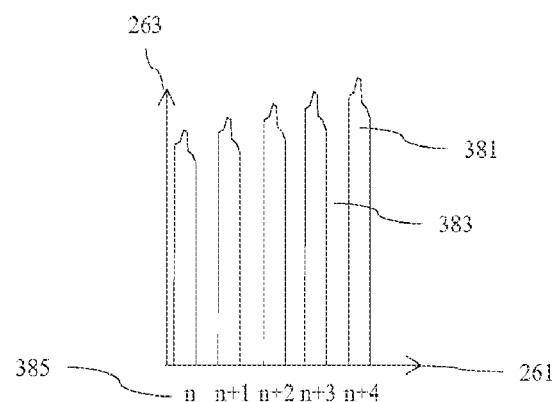
FIG. 23E is a schematic diagram illustrating a graph of light emitting element luminous flux against position showing further detail of the luminous flux distribution in comparison with the arrangements of FIGS. 23A-D, in accordance with the present disclosure.

FIG. 23E is a schematic diagram illustrating a graph of light emitting element luminous flux against position showing further detail of the luminous flux distribution in comparison with the arrangements of FIGS. 23A-23D. The graphs of FIGS. 23A-23D show the luminous flux 263 output across an array of LEDs to be uniform, with gaps therebetween. Typically the luminous flux output will vary as shown in FIG. 23A-23D arising from the combination of the detailed structure of the emitter, phosphor, package and diffusion characteristics.

Figure 24A:
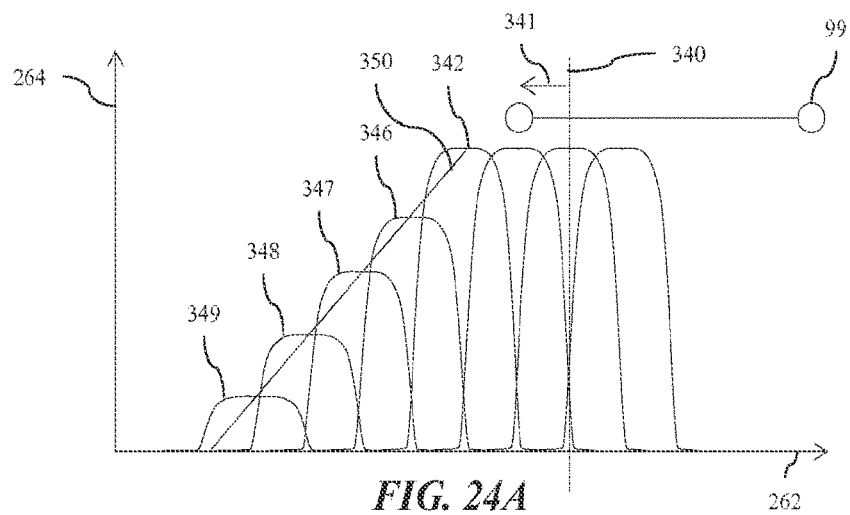
FIGS. 24A-24C are schematic diagrams illustrating graphs of optical window luminous intensity against position in the window plane for an array of optical windows with control of the luminous intensity of optical windows for an autostereoscopic display for a moving observer, in accordance with the present disclosure.
Figure 24B:
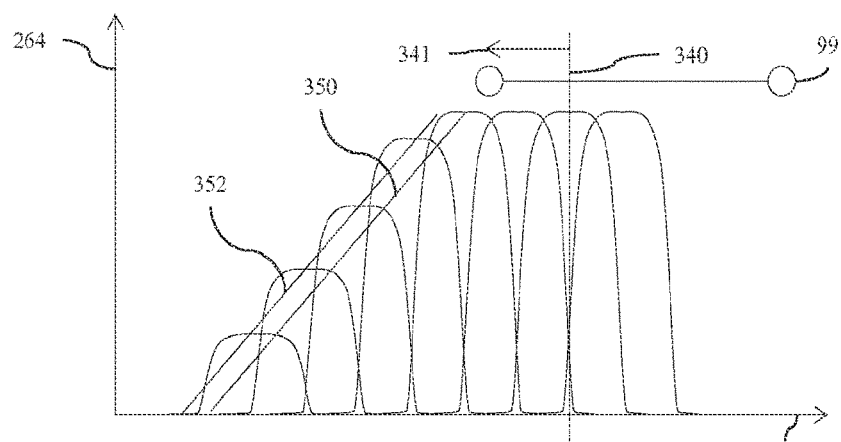
Figure 24C:
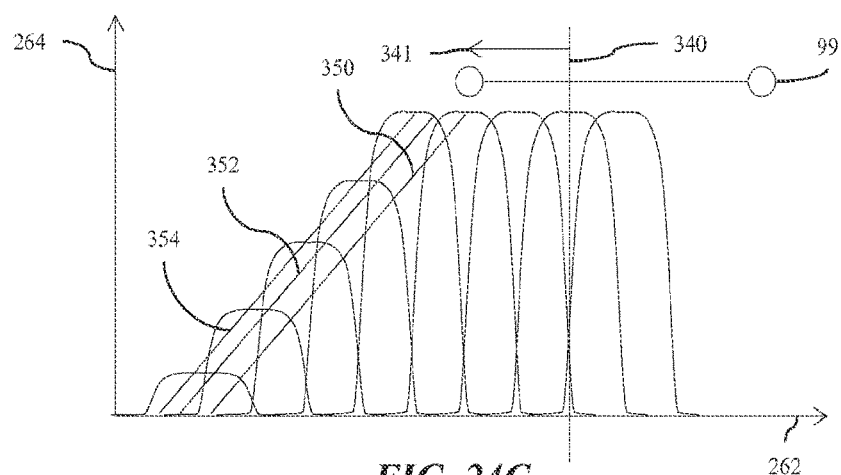

FIGS. 24A-24C are schematic diagrams illustrating graphs of optical window luminous intensity against position in the window plane for an array of optical windows with control of the luminous intensity of optical windows for an autostereoscopic display for a moving observer. For a given position 341, the optical window 342, 346, 347, 348, 349 may be arranged with a luminous intensity distribution that falls with position away from the eye of the observer 99 with a slope profile. As the observer position 341 moves away from position 340, the intensity of the respective optical windows may increase proportionately, maintaining the linear slope profile 350 of edge luminous intensity against position in the window plane 106 but providing displaced slope profiles 352, 354 respectively. Advantageously the visibility of flicker may be reduced and the intensity of additional windows is reduced, reducing power consumption and improving display uniformity.

Figure 25:
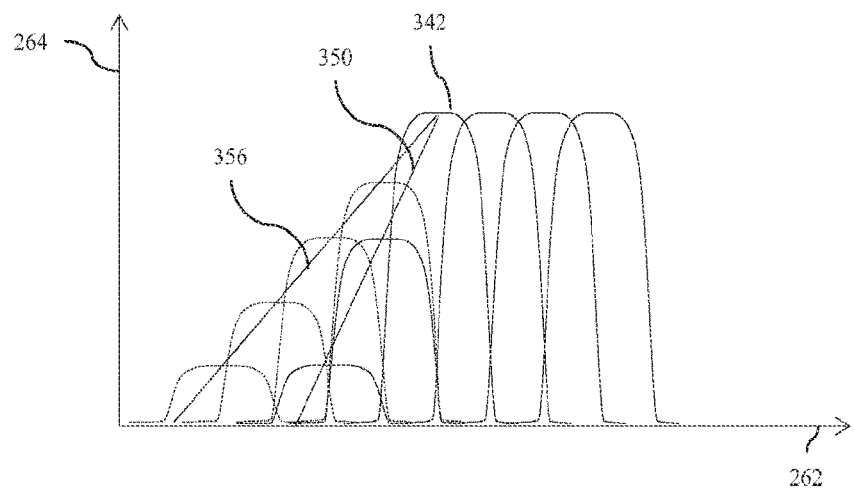
FIG. 25 is a schematic diagram illustrating a graph of optical window luminous intensity against position in the window plane for an array of optical windows with controllable luminous intensity modulation that may be varied in edge slope, in accordance with the present disclosure.

FIG. 25 is a schematic diagram illustrating a graph of optical window luminous intensity 264 against position 262 in the window plane 106 for an array of optical windows with controllable luminous intensity modulation that may be varied in edge slope. Thus the slope profile 350 may be varied from profile 350 to profile 356. The profile 350 may be used in cases of low observer speed, whereas the profile 356 may be used for higher observer speeds for example. In this manner, the system may pre-empt the arrival of the observer's eye at a desired viewing position, or take into account rapid movement of a display. Such movement can be anticipated in cooperation with a head tracking system.

Figure 26:
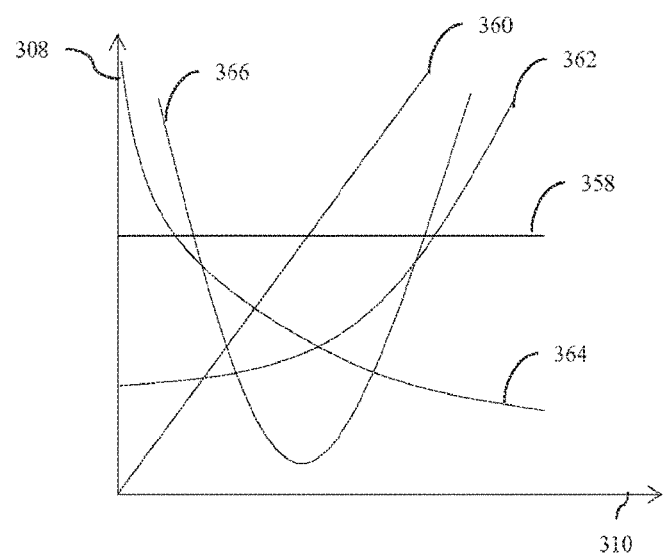
FIG. 26 is a schematic diagram illustrating an graph of optical window luminous intensity variation with speed of an observer, in accordance with the present disclosure.

FIG. 26 is a schematic diagram illustrating graphs of optical window luminous intensity variation 308 with speed 310 of an observer. Function 358 indicates that the speed slope may be constant for observer speed, for example as for slopes 350, 352, 354 illustrated in FIG. 24C. However, as observer speed increases, it may be desirable to increase the number of windows that are displayed. Thus function 360 may be provided with a binary window function for a stationary observer, whereas the slope increases as the observer speed increases. In this manner, flicker may be reduced. Alternatively as shown in function 362, a finite slope may be provided for a stationary observer and the slope may increase for increasing observer speed. Further, the fast the observer the greater the slope. Such an arrangement may increase power consumption or reduce peak luminance of the device, however the flicker for a moving observer may be reduced. Functions 364, 366 show that the slope may be adjusted with other shapes to achieve further control of flicker and efficiency for stationary and moving observers.

Figure 27:
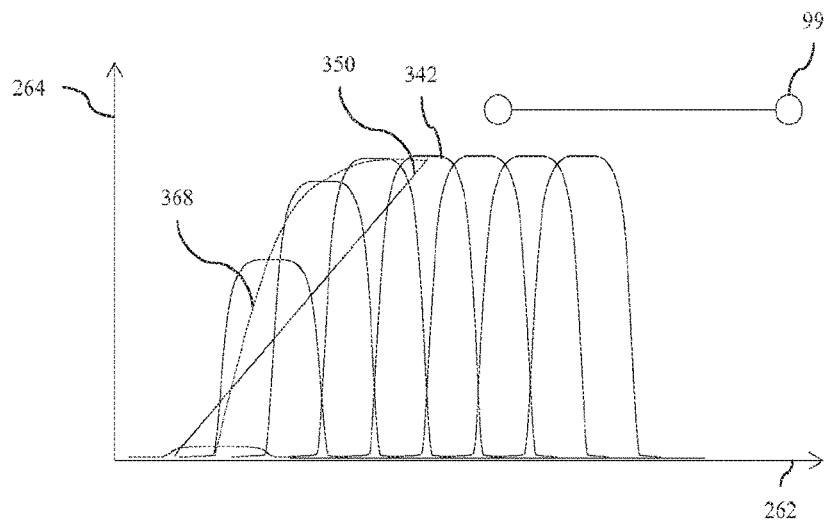
FIG. 27 is a schematic diagram illustrating a graph of optical window luminous intensity against position in the window plane for an array of optical windows with controllable luminous intensity modulation that may be varied in profile, in accordance with the present disclosure.

FIG. 27 is a schematic diagram illustrating a graph of optical window luminous intensity against position in the window plane for an array of optical windows with controllable luminous intensity modulation that may be varied in profile. Thus slope 350 may be replaced with slope profile 368.

Figure 28:
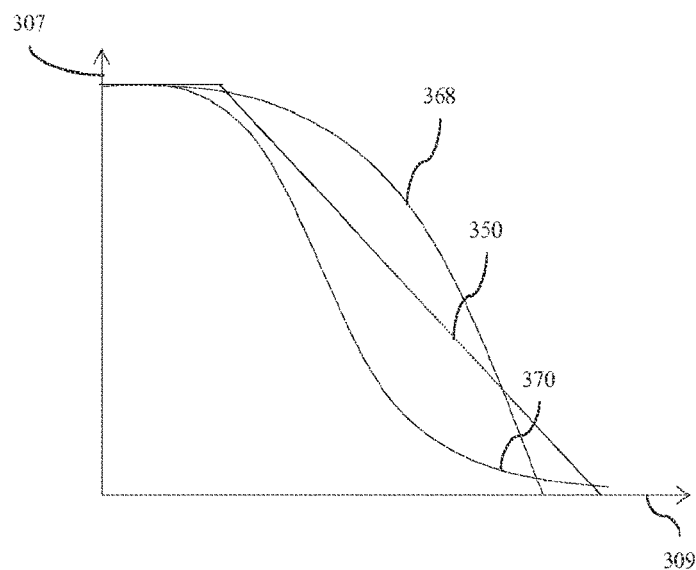
FIG. 28 is a schematic diagram illustrating an graph of optical window luminous intensity variation with position of an optical window within a viewing window that may further be varied in response to the position from the eye of an observer, in accordance with the present disclosure.

FIG. 28 is a schematic diagram illustrating a graph of optical window luminous intensity variation with position of an optical window within a viewing window that may further be varied in response to the position from the eye of an observer. The profiles may be quantized at the spacing of the viewing windows; however diffuser 68 may be arranged to achieve a relatively smooth profile of the viewing window 26 comprising viewing windows 260. Thus profiles 350, 368, 370 may be provided to advantageously achieve different trade-offs between display flicker and power consumption.

Figure 29A:
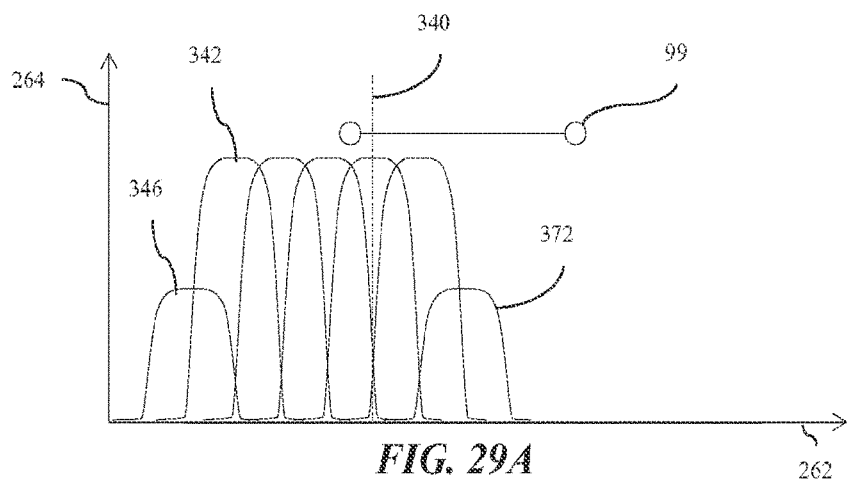
FIGS. 29A-29B are schematic diagrams illustrating graphs of optical window luminous intensity against position in the window plane for an array of optical windows with controllable luminous intensity of inner and outer portions of a viewing window for the left and right eye respectively of an observer, in accordance with the present disclosure.
Figure 29B:
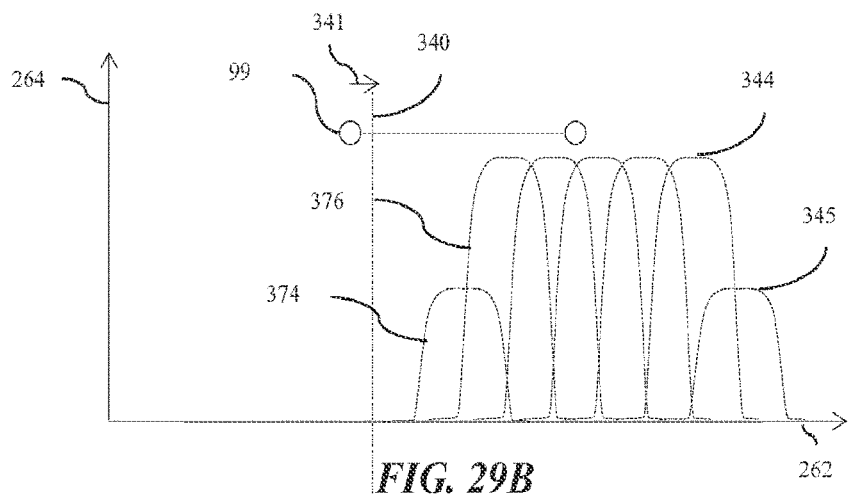
Figure 30A:
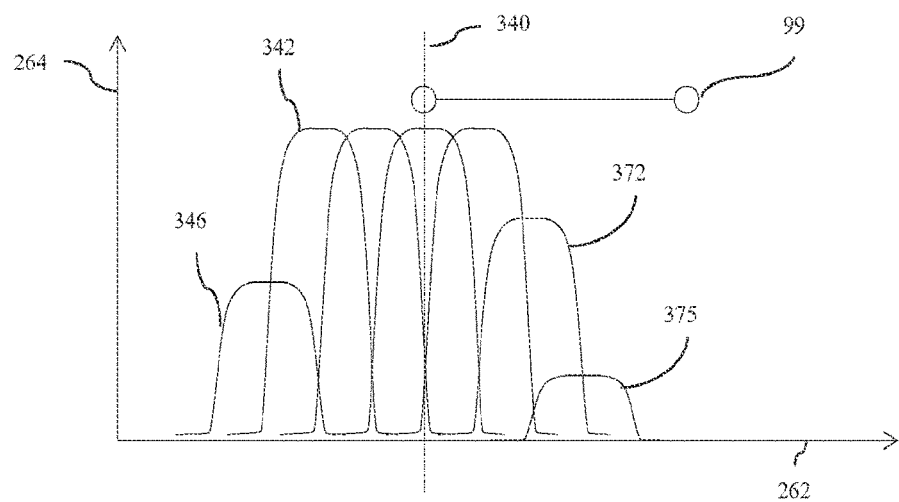
FIGS. 30A-30B are schematic diagrams illustrating graphs of optical window luminous intensity against position in the window plane for an array of optical windows with controllable luminous intensity of inner and outer portions of a viewing window for the left and right eye respectively of an observer, in accordance with the present disclosure.
Figure 30B:
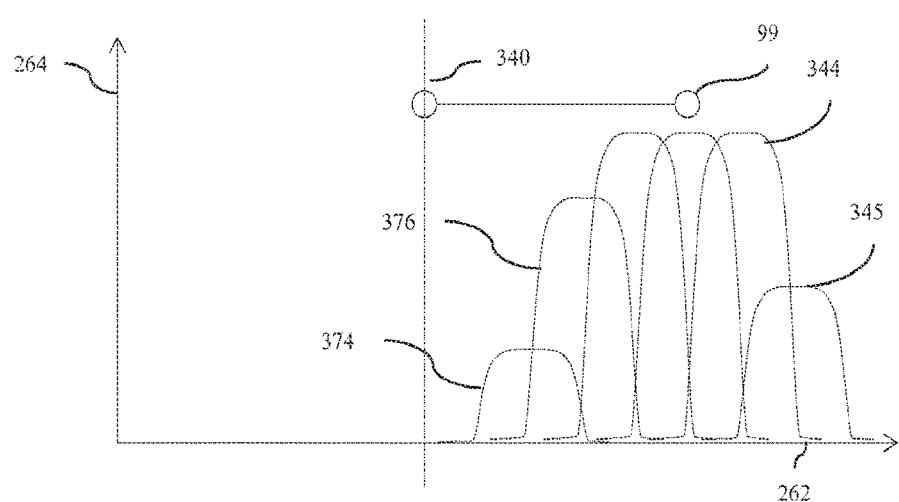
Figure 31A:
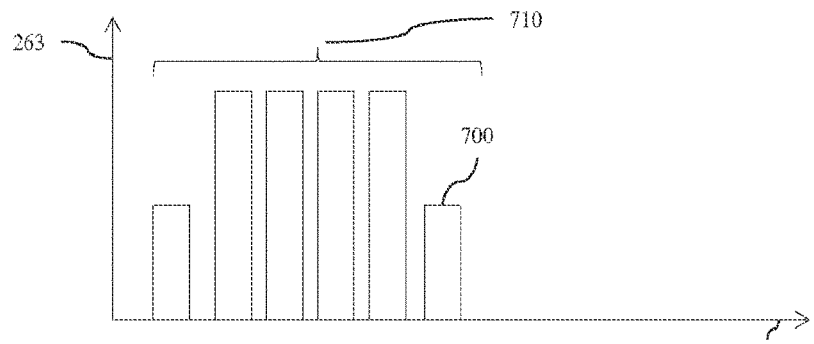
FIG. 31A-31D are schematic diagram illustrating graphs of light emitting element luminous flux against position in the light emitting element array for the control of the intensity of the luminous intensity of optical windows for an autostereoscopic display for a moving observer, in accordance with the present disclosure.
Figure 31B:
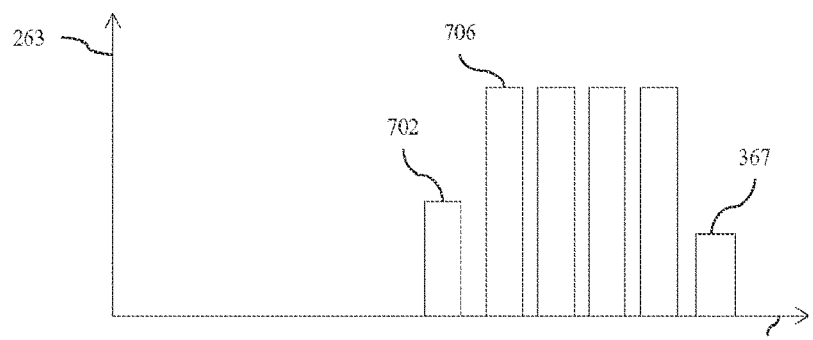
Figure 31C:
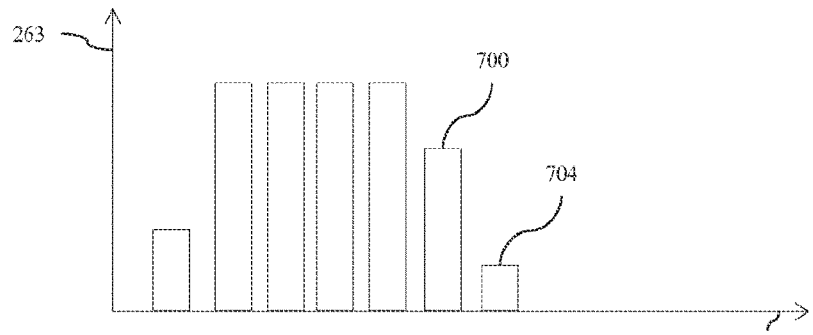
Figure 31D:
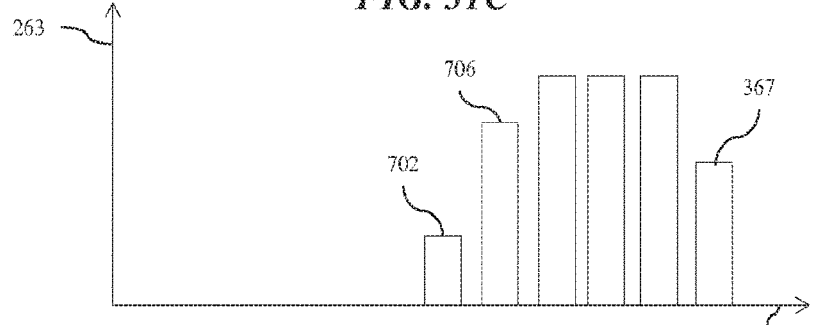

FIGS. 29A, 29B, 30A, and 30B are schematic diagrams illustrating graphs of optical window luminous intensity 264 against position 262 in the window plane 106 for an array of optical windows 260 with controllable luminous intensity of inner and outer portions of a viewing window for the left eye and right eye respectively of observer 99. Thus in FIG. 29A a left eye viewing window comprises optical windows 346, 372 with reduced luminous intensity further comprising optical windows 342 with substantially peak luminous intensity. As shown in FIG. 29B, a left eye viewing window may comprise reduced luminous intensity optical windows 274, 345 and peak luminous intensity optical windows 344.

For convenience, not shown in the present figures, the luminous intensity may have a global distribution with respect to lateral angle, for example a Lambertian distribution of luminous intensity so that the peak luminous intensity varies with position 262. Other global distributions may be used, for example with higher on-axis gain than a Lambertian distribution.

After movement of an observer so that left eye of observer 99 is arranged at the reference line 340, then the luminous intensity of the intraocular viewing windows may be modified so that optical window 372 may have increased luminous intensity and window 375 may be introduced for the left eye. In the right eye, optical windows 374, 376 may have correspondingly reduced luminous intensity so that the overall intensity of the combined viewing windows is substantially maintained. In this manner, advantageously display flicker for the left and right eyes may be reduced in the regions of the display that are illuminated by the intraocular windows.

FIG. 31A-31D are schematic diagram illustrating graphs of light emitting element luminous flux 263 against position 261 in the light emitting element array for the control of the intensity of the luminous intensity of optical windows for an autostereoscopic display for a moving observer 99 as shown in FIGS. 29A, 29B, 30A, and 30B respectively. Thus light sources 700, 704 may be controlled to provide variable flux for left eye phase of illumination depending on observer viewing position. Similarly light sources 702, 706 may be controlled to provide variable flux for right eye phase of illumination depending on observer viewing position.

The control system is thus arranged to selectively operate a group 710 of adjacent light sources of the array 15 in a manner in which, across the transitional ranges 341 of the detected position of the head of the observer 99, a light source 702 is operated at an end of the group opposite from the new light source 367 with a luminous flux that decreases as the detected position of the head of the observer moves towards the output direction corresponding to the new light source 367.

Advantageously the flicker of the display that may arise from intraocular optical window switching may be reduced.

Figure 32A:
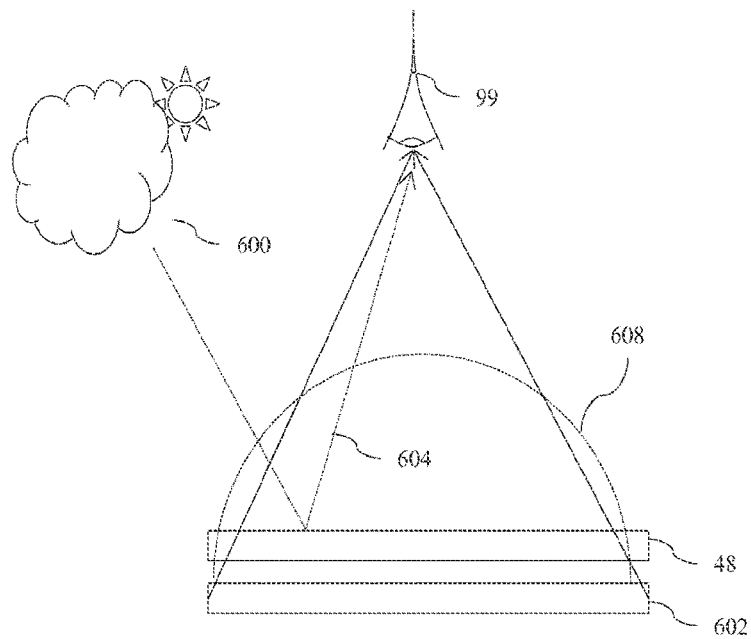
FIG. 32A is a schematic diagram illustrating reduction of image contrast for frontal reflections in a display with substantially Lambertian display illumination, in accordance with the present disclosure.

FIG. 32A is a schematic diagram illustrating reduction of image contrast for frontal reflections in a display with substantially Lambertian display illumination. Backlight 602 may be arranged to illuminate spatial light modulator 48 and provide a Lambertian distribution 608 of luminous intensity with viewing angle. In brightly lit ambient environments, for example when viewing outdoors reflected light rays 604 from the sky 600 may be directed from the spatial light modulator 48 to the observer 99, creating undesirable loss of contrast of the observed images.

In an illustrative embodiment, a backlight 602 arranged to illuminate a 4" diagonal spatial light modulator at a luminance of 500 nits from 1.2 W of backlight power. The display with a frontal reflectivity of 5% may be illuminated in a brightly lit ambient environment by a Lambertian source illuminance of 25,000 lux. The perceived contrast of the display may be 1.25:1. Such a display may be difficult to read in such lighting conditions.

It may be desirable to increase the contrast of images from the spatial light modulator in brightly lit environments, while achieving low power consumption.

Figure 32B:
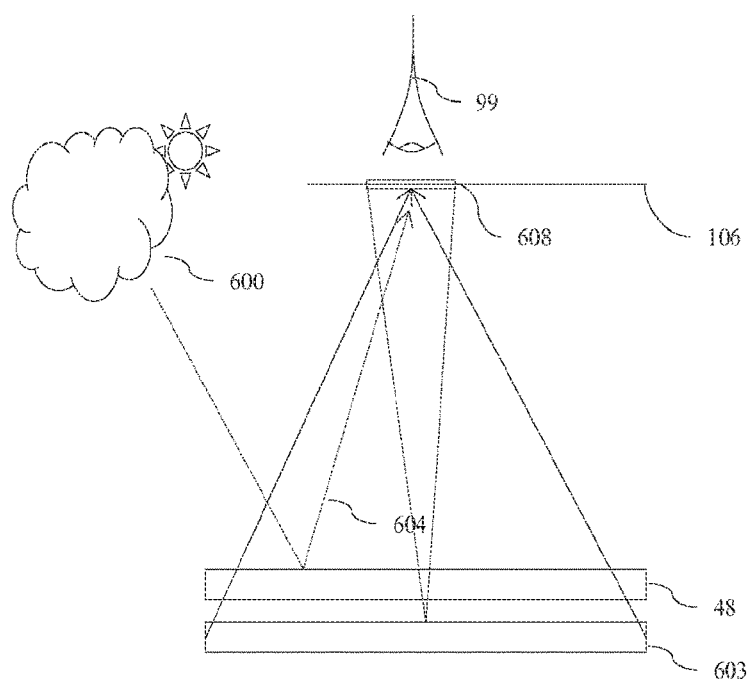
FIG. 32B is a schematic diagram illustrating reduction of image contrast for frontal reflections in a display with controllable directional illumination, in accordance with the present disclosure.

FIG. 32B is a schematic diagram illustrating reduction of image contrast for frontal reflections in a display with controllable directional illumination. Viewing window 608 may be provided at window plane 106 by directional backlight 603. The backlight may direct light into a narrow cone in comparison to the arrangement of FIG. 32A, and thus less power is used to achieve the same brightness for a viewer in the window 608. As will be described, the achievable display luminance for known LEDs may also be substantially increased.

Figure 33A:
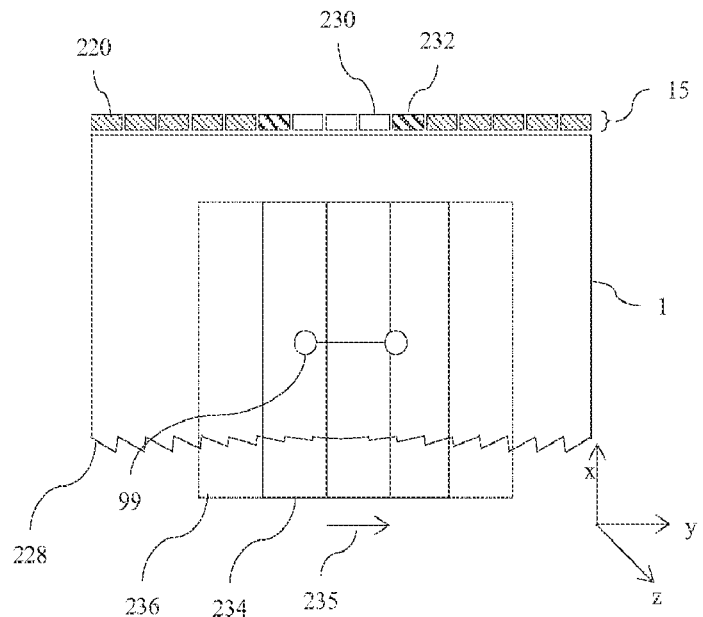
FIG. 33A is a schematic diagram illustrating the formation of optical windows by an optical valve and array of light sources for a directional 2D display in landscape orientation arranged for a high luminance image for both eyes of an observer, in accordance with the present disclosure.

FIG. 33A is a schematic diagram illustrating the formation of optical windows by an optical valve and array of light sources for a directional 2D display in landscape orientation arranged for a high luminance image for both eyes of an observer. Fresnel mirror 228 may be arranged in place of the single curve shown in FIG. 4B for example. Thus three optical windows 234 may be provided by light sources 230 of the array 15. Outside the optical windows 234, further optical windows 236 may be provided that may have reduced luminous intensity and may be provided by light sources 232 of the array 15. Further optical windows, not shown, may be provided by light sources 220.

Spatial light modulator 48 may provide a continuous 2D image and light sources of the array 15 may be operated continuously, or may be operated with phased operation that is not required to be in phase with the operation of the spatial light modulator.

In an illustrative embodiment, a directional backlight arranged to illuminate a 4" diagonal spatial light modulator may be provided with three LEDs, each arranged to provide 33 lumens of output at 400 mW, giving a total backlight power consumption of 1.2 W. Such LEDs may be directed by the backlight 603 to an optical window of size 30 mm at a window plane 106 and may achieve a perceived display luminance for an observer 99 in the window plane 106 of 1300 nits. The display with a frontal reflectivity of 5% may be illuminated in a brightly lit ambient environment by a Lambertian source illuminance of 25,000 lux. The perceived contrast of the display may be 3.3:1. Such a display has significantly higher legibility than the 500 nit example above.

Advantageously, a high brightness image may be achieved with low power consumption. Thus a high contrast image may be achieved in high ambient brightness conditions. In comparison to the autostereoscopic arrangements described elsewhere, the pitch of the optical windows in the window plane may be substantially larger; for example optical window pitch 235 may be approximately half the interocular separation of a nominal observer, for example 30 mm. The number of light sources is reduced in comparison to autostereoscopic display. Advantageously the cost of the array 15 may be reduced and the mean time between failure of the array 15 may be increased.

It may be desirable to further reduce the power consumption of the display while achieving improved contrast in brightly lit ambient environments.

Figure 33B:
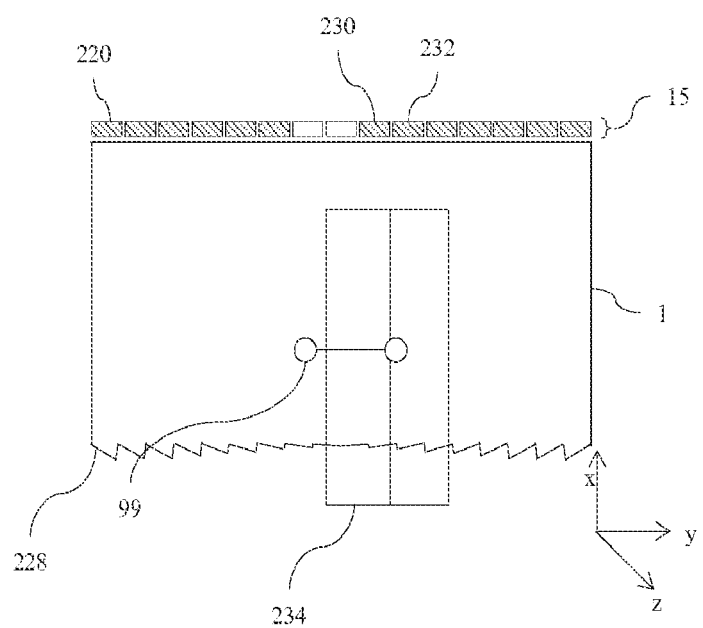
FIG. 33B is a schematic diagram illustrating the formation of optical windows by an optical valve and array of light sources for a directional 2D display in landscape orientation arranged for a high luminance image for one eye of an observer, in accordance with the present disclosure.

FIG. 33B is a schematic diagram illustrating the formation of optical windows by an optical valve and array of light sources for a directional 2D display in landscape orientation arranged for a high luminance image for one eye of an observer. In operation in high brightness environments, increased legibility of the image may be achieved by providing a higher contrast image to a single eye. To continue the illustrative embodiment the two LEDs may be provided with 600 mW of input power and may each achieve an output of 50 lumens. The display luminance may be increased to 2000 nits and thus the contrast for 25,000 lux may be increased to 5:1 for the single eye of the observer 99.

Figure 33C:
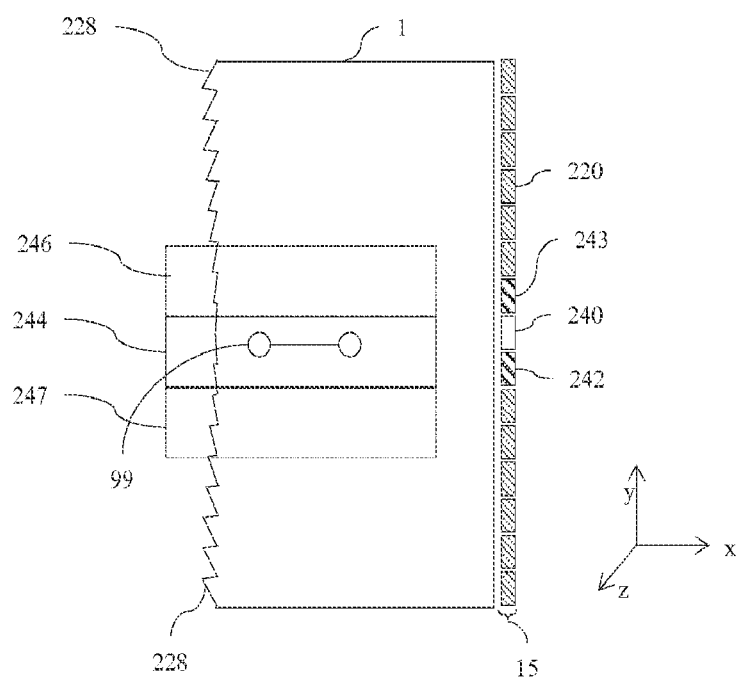
FIG. 33C is a schematic diagram illustrating the formation of optical windows by an optical valve and array of light sources for a directional 2D display in portrait orientation, in accordance with the present disclosure.

FIG. 33C is a schematic diagram illustrating the formation of optical windows by an optical valve and array of light sources for a directional 2D display in portrait orientation. Thus optical window 244 may be provided by single LED 240 and optional optical windows 246, 247 may be provided by LEDs 242, 243. The luminous flux of LEDs 242, 243 may be further reduced. In this arrangement both eyes of the observer 99 may be arranged in the same optical window 244 and thus the number of LEDs required is reduced. Thus a display luminance of 2000 nits may be achieved for a power consumption of 600 mW. Thus the display efficiency is further improved.

The arrangements of FIGS. 33A-33C have limited viewing freedom. It may be desirable to increase the viewing freedom. Observer tracking systems may be used to increase viewing freedom. However, such systems may add complexity, cost and power consumption to the system.

It may be desirable to achieve increased viewing freedom at low additional power consumption and cost. It may be further desirable to change the width of the viewing window by means of detection of the hand of an observer.

Figure 34A:
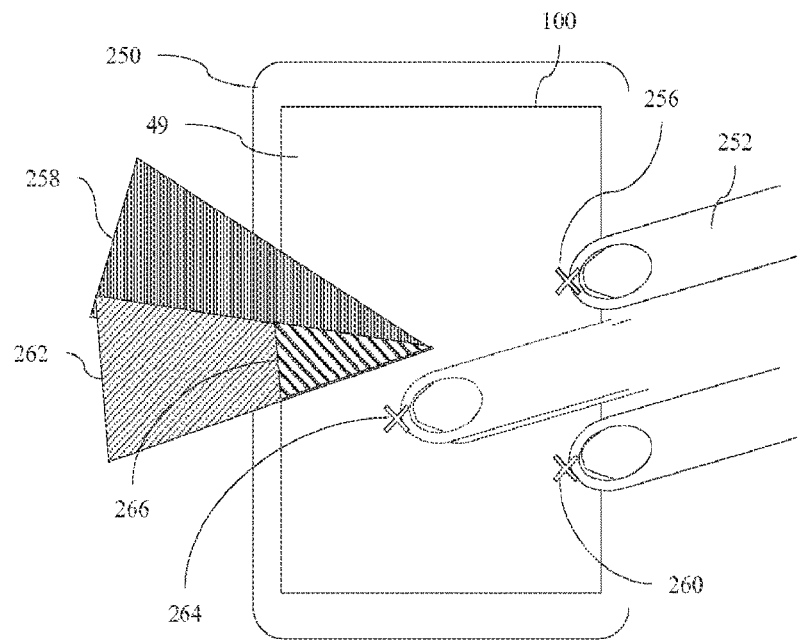
FIG. 34A is a schematic diagram illustrating a sensor system arranged to determine the position of an observer relative to the display device for a first observer position and to control the optical windows from the display device wherein the sensor system is a touch screen, in accordance with the present disclosure.
Figure 34B:
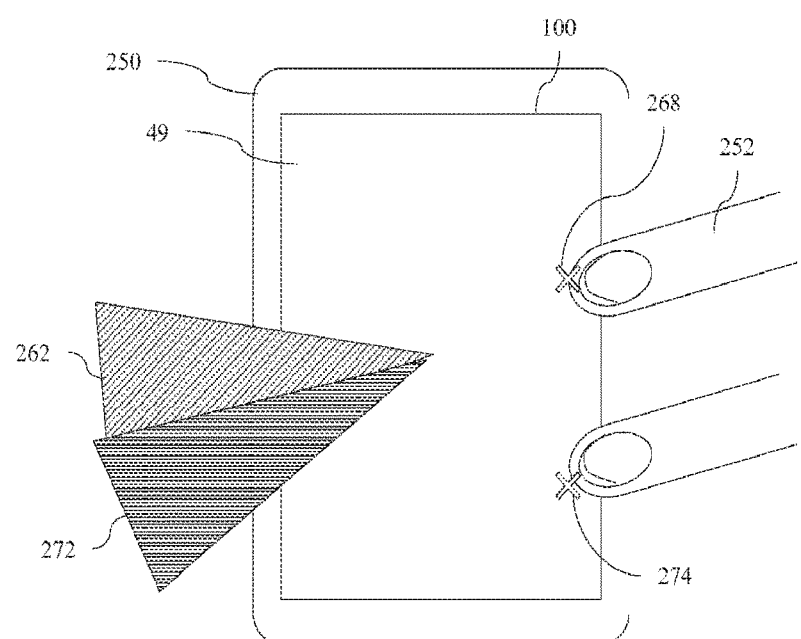
FIG. 34B is a schematic diagram illustrating a sensor system arranged to determine the position of an observer relative to the display device for a second observer position and to control the optical windows from the display device, in accordance with the present disclosure.
Figure 34C:
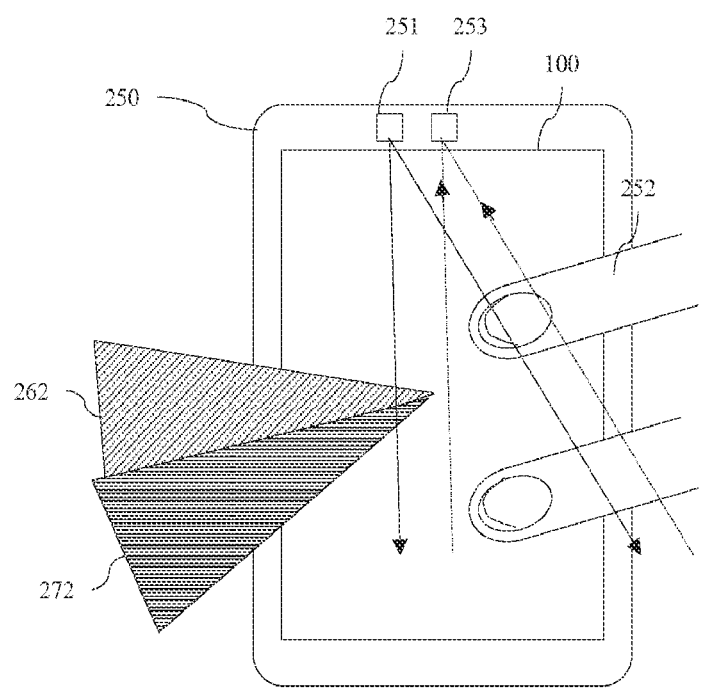
FIG. 34C is a schematic diagram illustrating a sensor system arranged to determine the position of an observer relative to the display device for a second observer position and to control the optical windows from the display device wherein the sensor system is a gesture sensor, in accordance with the present disclosure.

FIG. 34A is a schematic diagram illustrating the a sensor system arranged to determine the position of an observer relative to the display device for a first observer position and to control the optical windows from the display device, wherein the sensor system is a touch screen. FIG. 34B is a schematic diagram illustrating a sensor system arranged to determine the position of an observer relative to the display device for a second observer position and to control the optical windows from the display device. FIG. 34C is a schematic diagram illustrating a sensor system arranged to determine the position of an observer relative to the display device for a second observer position and to control the optical windows from the display device wherein the sensor system is a gesture sensor.

Figure 35:
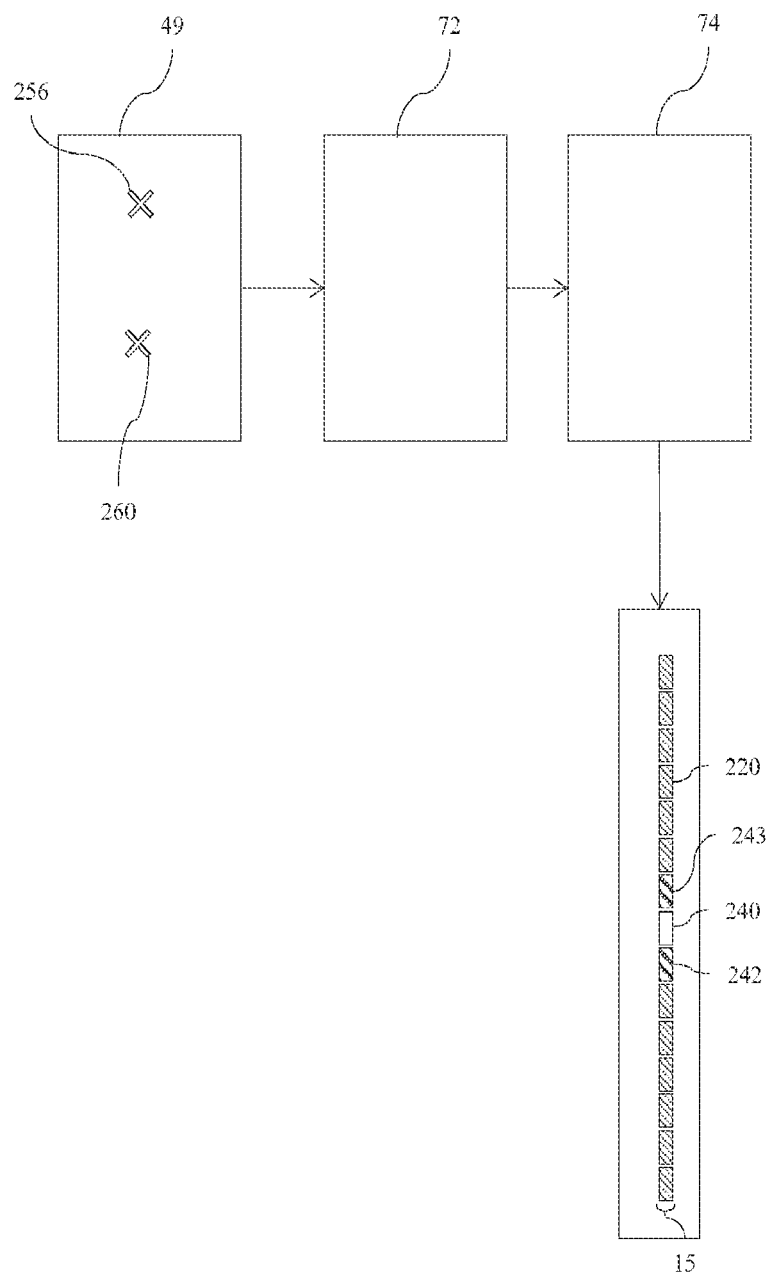
FIG. 35 is a schematic diagram illustrating a control system for control of optical windows from a display device, in accordance with the present disclosure.

FIG. 35 is a schematic diagram illustrating a control system for control of optical windows from a display device.

The directional display apparatus 250 may comprise a directional display 100 device capable of directing output light selectively into optical windows 260 of a set of optical windows 258, 262 in output directions that are distributed across the display device 100. Thus for a given LED arrangement an optical window may be produced and represented by cone 258 in FIG. 34A. Hand 252 (that will typically be the hand of the observer 99) may have a position 256 that is detected, for example by means of touch screen 49 that measures the position a finger of the observer.

Alternatively other sensors may be used to measure hand position, such as gesture detectors as shown in FIG. 34C. In this embodiment, touch screen 49 is replaced by gesture sensor that may comprise a structured light source 251 and camera 253. Such a sensor may be arranged to detect the location of the fingers of the hand 252 using pattern recognition or other known computer vision techniques for example.

Control system comprising touch screen 49, controller 72, LED controller 74 and array 15 may be arranged to control the display device 100 to direct output light into at least one selected optical window of the set, comprising optical window 262; the directional display apparatus 100 being arranged to sense the disposition of a hand 252 of an observer 99, the control system being arranged to change the control of the display device in response to the sensed disposition of the hand 252 of the observer 99.

In one mode of operation, the position of the hand may move from position 256 to position 260. In response to the movement of hand location, the optical window may be controlled to be positioned at position 262. In this manner, the hand of the observer may be used to 'pull' the directionality of light towards their eyes. In a further embodiment, the position 260 may be moved to position 260. Such a movement may be used to reduce the luminous intensity of the window in the cone 262, represented by smaller cone 266. Thus the perceived display luminance can be conveniently controlled in addition to directionality.

FIG. 34B shows that the hand may be re-positioned at position 268 and dragged to position 274, so that the window 262 is translated to window 272. Thus multiple optical windows can be scanned through by multiple hand movements. Advantageously the directionality and luminance of the display may be conveniently controlled with low additional power consumption in comparison to the power consumption required by head tracking algorithms.

Figure 36:
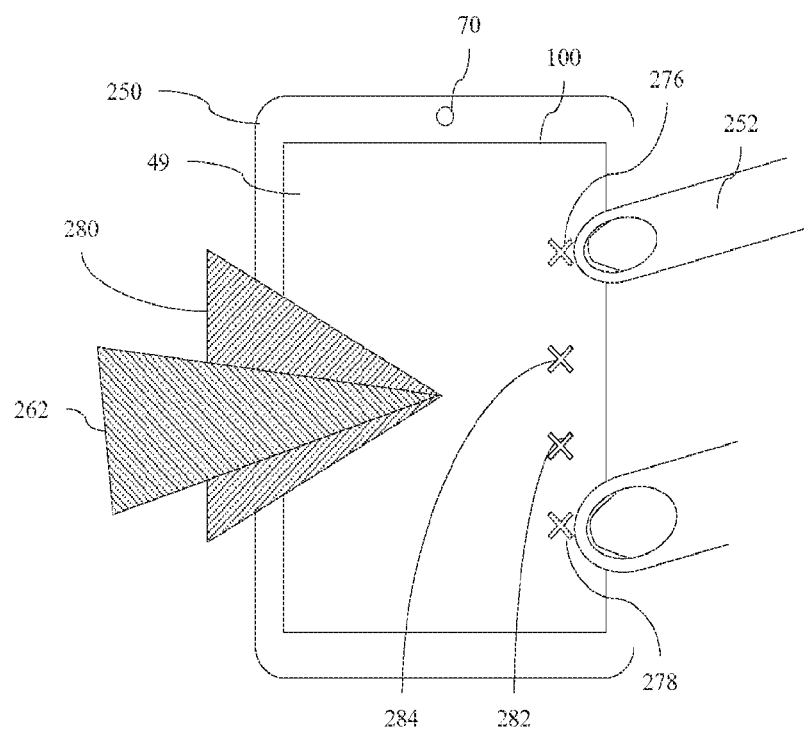
FIG. 36 is a schematic diagram illustrating the a sensor system arranged to control the luminous intensity of optical windows from a display device, in accordance with the present disclosure.
Figure 37A:
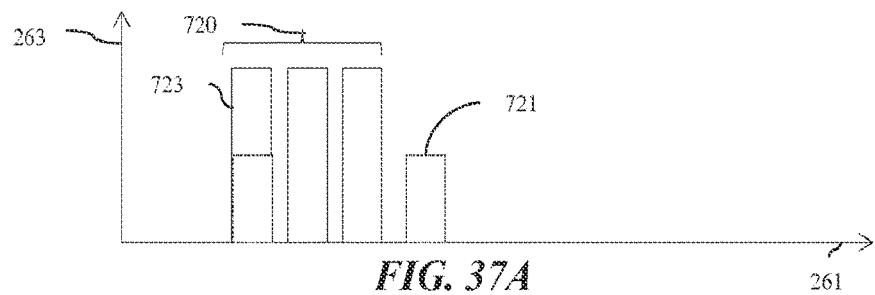
FIGS. 37A-37E are schematic diagrams illustrating graphs of luminous flux output of light source array corresponding to the optical window outputs of FIGS. 34A, 34B and 36 respectively, in accordance with the present disclosure.
Figure 37B:
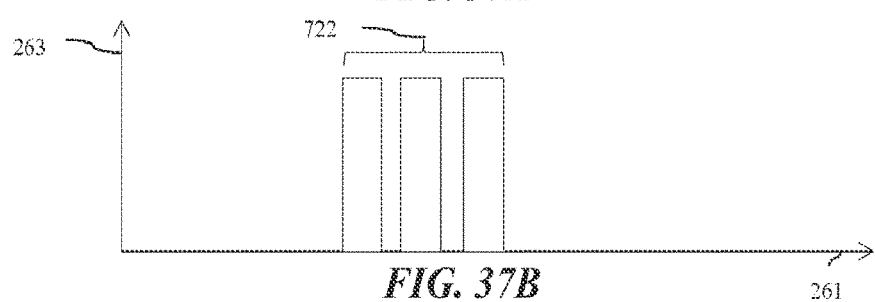
Figure 37C:
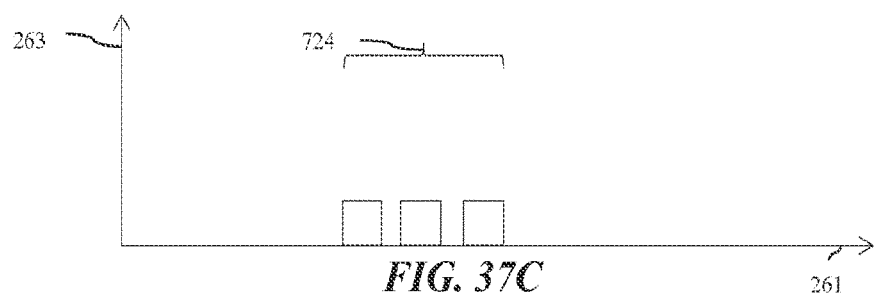
Figure 37D:
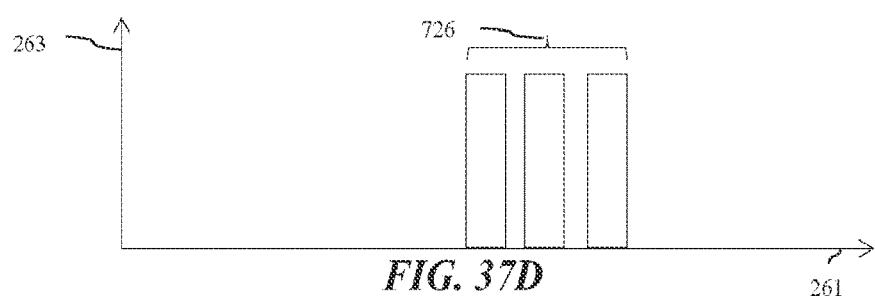
Figure 37E:
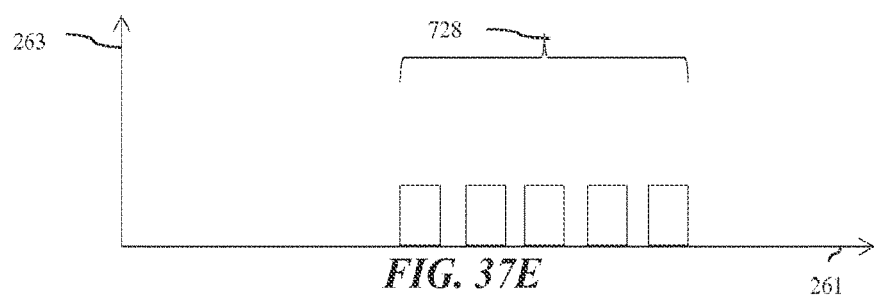
Figure 38:
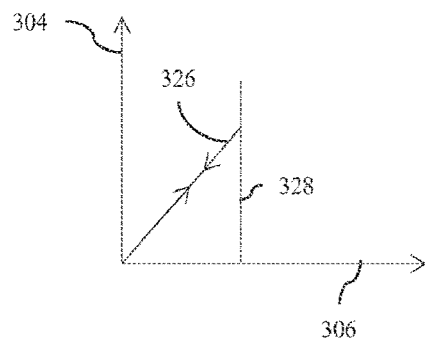
FIGS. 38-41 are schematic diagrams illustrating graphs of optical window luminous intensity against sensor output, in accordance with the present disclosure.

FIG. 36 is a schematic diagram illustrating a sensor system arranged to control the luminous intensity of optical windows from a display device. Thus a hand 252 may use two fingers to provide touch points 276, 278. The fingers may be brought closer together to provide new touch points 282, 284. The closer touch points 282, 284 may vary the viewing window 280 to be a narrower viewing window 262 comprising fewer optical windows. The luminous intensity of the window 281 may be greater than the luminous intensity of the viewing window 280, for example to maintain the same total power consumption of the array 15. Movement of the points 276, 278 together may be further be used to adjust position and intensity of the window 280 as shown in FIG. 34A for example.

The touch control of the display may further cooperate with a head tracking system. The display apparatus may further comprise a sensor system 70 arranged to detect the position of the head of an observer 99, the control system 70 being arranged to control the display device 250 to direct output light into at least one selected optical window of the set, selected in response to the detected position of the head of the observer 99. Advantageously the touch control may be used to increase the robustness of a head tracking system by enabling the user to direct the light into the correct direction for a robust detection point. Such a system may achieve improved detection of an observers face in low light levels for example.

FIGS. 37A-37E are schematic diagrams illustrating graphs of luminous flux output of an array 15 of LEDs corresponding to the optical window outputs of FIGS. 34A, 34B and 36 respectively. Thus groups 720, 722, 724, 726, 728 correspond respectively to optical windows 258, 262, 266, 272, 280. Diffusers and other optical mixing arrangements in the backlight may produce relatively uniform optical window structures.

Advantageously the optical window selection of the display can be controlled in a manner to achieve an intuitive control for observer 99 while trading off display luminance, viewing freedom and viewing position with low cost and low processor power.

It is desirable to minimize the number of LEDs of the array 15 that are illuminated at a given time while maximizing display brightness for a given total backlight power. Further, it may be desirable that adjacent LEDs are switched in a manner to minimize flicker of the display when the windows are adjusted. Methods to adjust adjacent LEDs will now be described.

FIGS. 38-41 are schematic diagrams illustrating graphs of optical window luminous intensity 304 against position 306 of the hand 252 on the touch screen 49 for an LED arranged to provide an optical window adjacent to those optical windows currently illuminated. As the position 256 of the finger of the hand translates vertically in FIG. 34A, the luminous flux of adjacent LED, which is shown as LED 721 in FIG. 37A, may increase along the profile 326 such that the intensity increases as a ramp rather than in a binary switching manner. If the finger does not reach position 328 and is released then the intensity may return to the zero value over a time period, for example 500 milliseconds per half peak flux unit.

Figure 39:
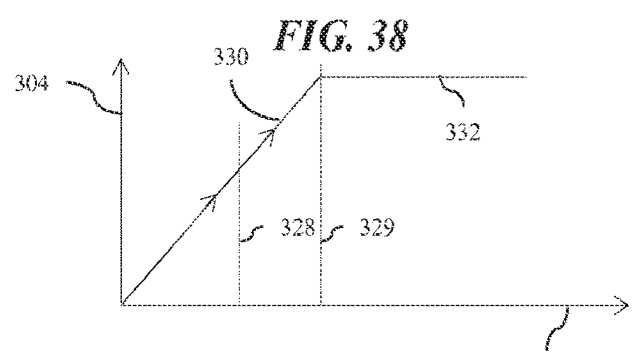

As illustrated in FIG. 39, if the finger is released between positions 328 and 329, the intensity of the LED 721 may increase to its full value as a ramp over a time period, for example 500 milliseconds per half peak flux unit. Advantageously the display flicker may be reduced and the time at which an additional LED 721 is illuminated is reduced to less than a second in this illustrative example. Further LED 723 may have reduced flux in correspondence to the increase in flux for LED 721 so that the total power consumption remains unchanged during the LED switching period.

If the finger movement continues to beyond position 329, the intensity of LED 721 may be fixed at the peak, shown by profile 332.

Advantageously the position of the observer's hand 252 may not be required to maintain accurate control of LED output. Further, a period in which the total LED output may be increased may be limited so that the total energy consumption is minimized, while the display flicker is reduced.

Figure 40:
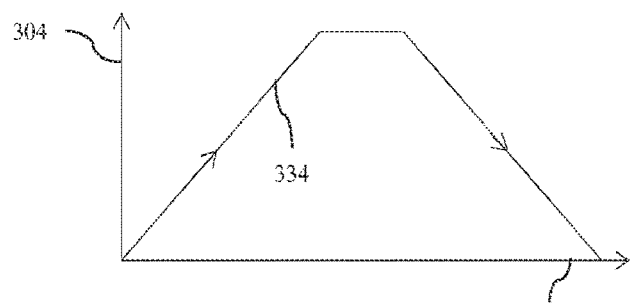
Figure 41:
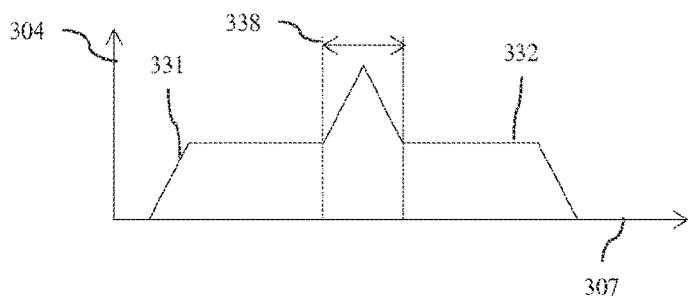

FIG. 40 shows another arrangement wherein the LED 721 luminous flux is varied as the hand 252 causes the optical windows to scan through the desired position. FIG. 41 shows that in certain positions of the hand 252, the intensity of the LED may be arranged to have a higher total luminous flux for a limited range of positions 338. Thus the LED 271 may have ramp profile 331 and nominal flux 332 with a transition flux region 338. Such an arrangement may be desirable to maintain a total display luminance when the LED 271 is a more central LED during the switching between outer LEDs, advantageously reducing flicker.

A directional display apparatus 250 may thus comprise a directional display device 100 capable of directing output light selectively into optical windows of a set of optical windows in output directions that are distributed across the display device; and a control system arranged to control the display device to direct output light into at least one selected optical window of the set, the directional display apparatus being arranged to sense the disposition of a hand 252 of an observer 99, the control system being arranged to change the control of the display device in response to the sensed disposition of the hand 252 of the observer 99.

The control system may be arranged to shift the at least one selected optical window across the set in response to the directional display apparatus sensing movement of the hand 252 of the observer 99 across the display device in the direction in which the output directions are distributed. The control system may be arranged to change the brightness of the at least one selected optical window in response to the directional display apparatus sensing movement of the hand 252 of the observer 99 across the display device in a direction perpendicular to the direction in which the output directions are distributed. The control system may be arranged to change the number of optical windows that are selected in response to in response to the directional display apparatus sensing a change in separation of fingers of the hand 252 of the observer 99.

A directional display apparatus may be arranged to sense the disposition of a hand 252 of an observer 99 by means of the directional display device being a touch-sensitive directional display device that is arranged to sense the disposition of the hand 252 of the observer 99 in proximity to the directional display device.

The directional display apparatus may comprise an image sensor system arranged to sense the disposition of a hand 252 of an observer 99, for example in a gesture sensor.

A directional display device may comprise a directional backlight capable of directing output light selectively into said optical windows 260; and a transmissive spatial light modulator 48 arranged to receive the output light from the directional backlight and to modulate it to display an image. A directional display apparatus may further comprise a sensor system arranged to detect the position of the head of an observer 99, the control system being arranged to change the control of the display device in response to the sensed disposition of the hand 252 of the observer and to the detected position of the head of the observer.

FIG. 42 is a schematic diagram illustrating a control system to calibrate light source array optical output. Further FIG. 42 is a schematic diagram illustrating a control system and front view of a directional backlight apparatus comprising a directional backlight as described above including a waveguide 1 and array 15 of illuminator elements. The directional backlight apparatus includes a control system, as described above, that implements a method of controlling the illuminator elements 15n making a calibration of the drive signals, as follows.

Light rays 410 from illuminator element 416 are directed to reflective end 4, reflected and directed back towards the input end 2. Some of the light from source 416 will be extracted by means of light extraction features 12, while some of the light will be incident on at least a portion of the input end 2. Sensor elements 408, 414 may be arranged at the input end in regions 409, 415 outside the lateral extent of the array 15 on both sides of the array 15. In regions 412, an illumination void is present so that light from source 416 will not be substantially incident on sensor 414; however light rays from source 416 will be incident on sensor 408. Each sensor 408, 414 may include a light intensity measurement sensor. Preferably as shown in FIG. 42, the sensors 408, 414 may include optical filters 402, 406 and light intensity sensors 400, 404. Such an arrangement may advantageously provide a measurement of both the light intensity and a measurement of chromaticity coordinate for the light from source 416. In a similar manner, light rays 420 from source 418 may not be incident on sensor 408, but will incident on sensor 414. For on-axis measurement, sensors 408, 414 may both detect light from respective on-axis illuminator elements 417.

Measured signals from sensors 408, 414 may be passed to illumination controller 74 which drives illuminator elements of array 15 using an illuminator element driver 433 which may be a current driver with grey level control to drive lines 444 to provide drive signals to the array of illuminator elements. The illumination controller 74 calibrates the drive signals supplied to the illuminator elements 15n in response the measured signals representing the sensed light, as follows.

Array luminous flux distribution controller 424 may include for example a stored reference grey level profile 430 from front of screen measurements that may be provided at the time of manufacture. This enables the control system to output scaled luminous fluxes that have a predetermined distribution across the array of light sources, for example to vary the scaled luminous fluxes.

Data from sensors 408, 414 may be supplied for example to calibration measurement system 422 that may provide data to a look up table 426 within the luminous flux distribution controller 424. Further selection of luminous intensity distribution may be provided by selection controller 428. Selection controller may have user input or an automatic input that is determined by sensing of display viewing conditions. For example the number of viewers, the room brightness, display orientation, the image quality settings and/or the power savings mode settings may be used to vary the selected distribution.

In device manufacture, the output of the sensors 408, 414 in response to each of the light sources of the array 15 may be compared to the signal from a camera or detector placed in the window plane of the display. This achieves an initial calibration or referencing of the internal sensors with respect to light in the window plane. Such calibration may be stored in a look up table or similar.

In operation of a calibration mode, a single illuminator element of the array 15 is illuminated and sensors 408, 414 may measure a signal for the said illuminator element. The said illuminator element is extinguished and the next source of the array operated and a measurement taken. The output of the array of measurements is compared with a factory calibration so that the output luminous intensity for the given luminous flux distribution can be interpolated. The appropriate luminous flux distribution for the required luminous intensity distribution is then derived by the controller 424 and the illuminator element controller 433 appropriately configured to achieve the desired luminous flux distribution.

Advantageously the light from the whole array 15 may be measured by a combination of sensors 408, 414 and a desired luminous intensity distribution may be achieved.

Thus said sensing of light incident on the input end 2 may use sensor elements 408 arranged at region 409 of the input end 2 outside the array 15 of illuminator elements in the lateral direction. Said sensing of light incident on the input end 2 may use sensor elements 408, 414 arranged at regions 409, 415 of the input end 2 outside the array 15 of illuminator elements in the lateral direction on both sides of the array of illuminator elements.

The sensor system may be arranged with the waveguide 1 only during the fabrication of the display for characterization purposes and removed after completion of product fabrication. Preferably the sensor system may be arranged with the waveguide 1 during normal operation. The in-field calibration phase may be applied during display switch-on. The spatial light modulator may be arranged with a black image during calibration to remove visibility to the user of the calibration phase. The calibration phase may be repeated on a daily, weekly or monthly basis for example to compensated for ageing artifacts.

It may be desirable to achieve uniform display appearance for displays in which relatively small numbers of optical windows are arranged to illuminate the observer.

Figure 43A:
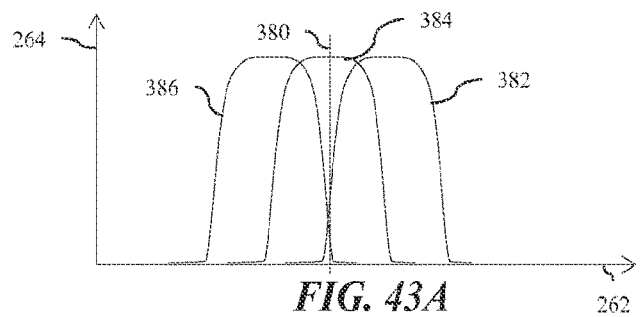
FIGS. 43A-43E are schematic diagrams illustrating graphs of optical window luminous intensity against position in the window plane for a moving observer in the display arrangement of FIG. 33A comprising three optical windows in detent positions, in accordance with the present disclosure.
Figure 43B:
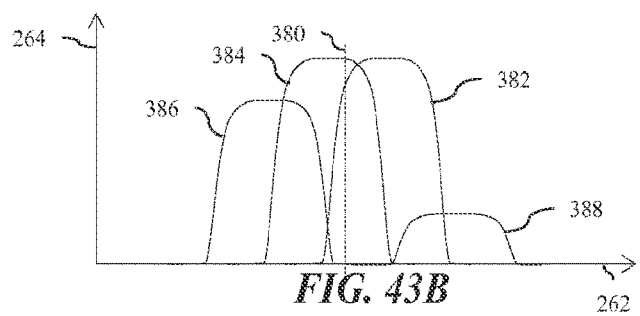
Figure 43C:
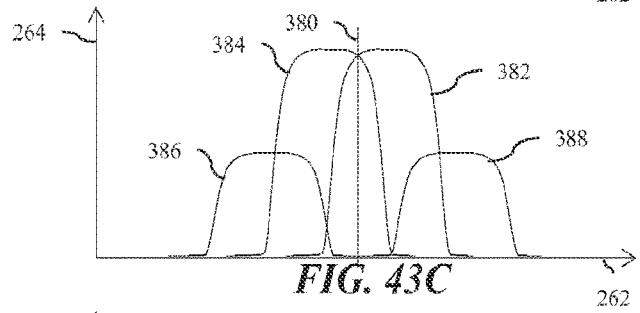
Figure 43D:
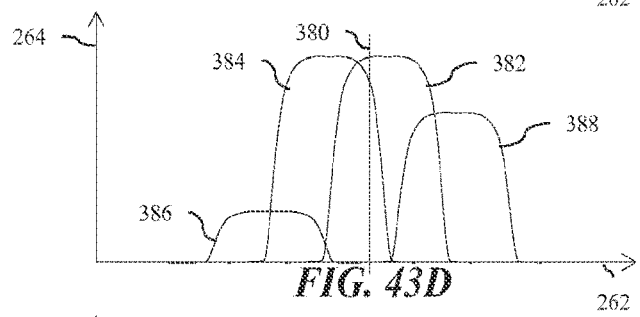
Figure 43E:
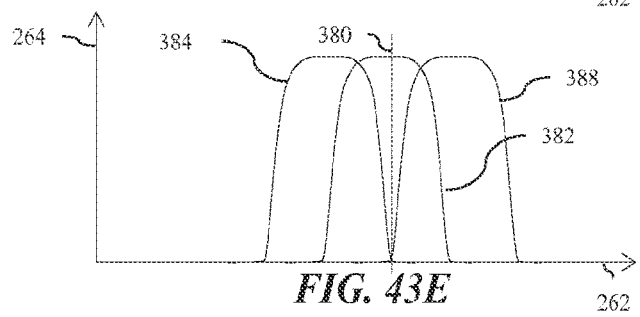
Figure 45A:
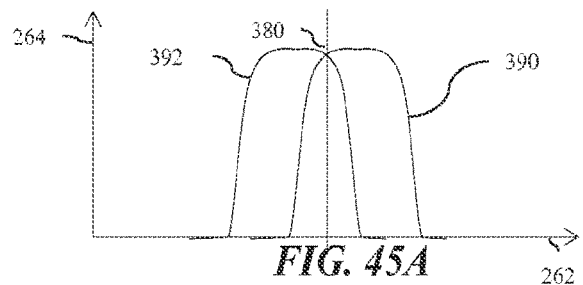
FIGS. 45A-45E are schematic diagrams illustrating graphs of optical window luminous intensity against position in the window plane for a vertically moving observer in the display arrangement of FIG. 33A comprising two optical windows in detent positions for a second control method, in accordance with the present disclosure.
Figure 45B:
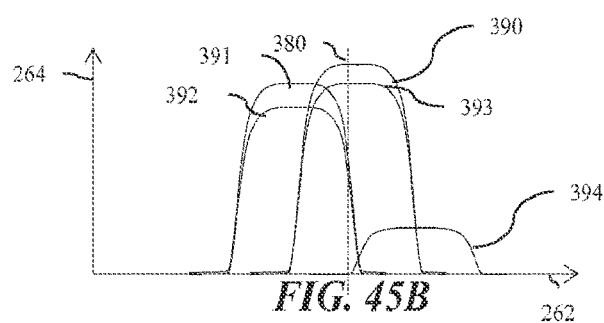
Figure 45C:
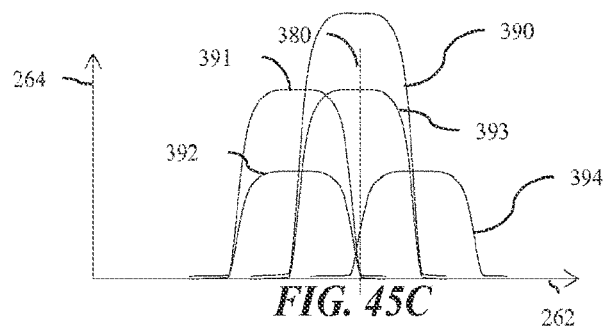
Figure 45D:
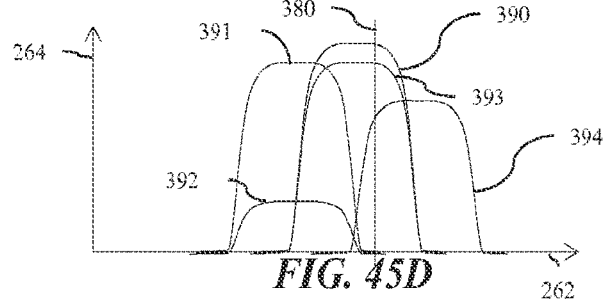
Figure 45E:
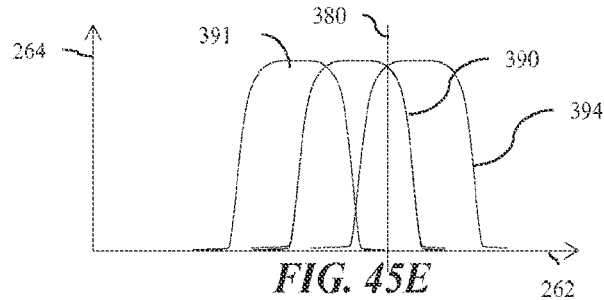

FIGS. 43A-43E are schematic diagrams illustrating graphs of optical window luminous intensity against position in the window plane for a moving observer in the display arrangement of FIG. 33A comprising three optical windows in detent positions. Shown are individual optical window profiles showing luminous intensity 264 against position 262 in the window plane. Thus the arrangement of FIG. 33A is shown in FIG. 43A, comprising optical windows 382, 384, 386 for a nominal interocular position 380 in landscape mode for an observer at the window plane. FIGS. 43B-43D shows that the intensity of window 386 may be reduced and correspondingly the intensity of window 388 may be increased as the observer moves to the right until in FIG. 43E the window 386 is extinguished and the intensity of window 388 maximised. Advantageously the nominal luminance of the display can be increased during observer movement while minimizing backlight power consumption.

FIGS. 44A-44E are schematic diagrams illustrating graphs of optical window luminous intensity against position in the window plane for a vertically observer in the display arrangement of FIG. 33C comprising two optical windows in detent positions for a first control method. Such an arrangement may be more prevalent in portrait orientation of the display. Thus optical windows 390, 392 may be transitioned to windows 390, 394 in a grey scale manner. For each observer position 380, the display luminance may be maintained by adjusting the relative luminous flux of light sources arranged to provide respective optical windows 390, 392, 394.

FIGS. 45A-45E are schematic diagrams illustrating graphs of optical window luminous intensity against position in the window plane for a vertically moving observer in the display arrangement of FIG. 33C comprising two optical windows in detent positions for a second control method. Under normal continuous operation, the peak window luminous intensity is shown in windows 391, 393 in FIGS. 45B-E and windows 390, 392 in FIG. 45A. In typical operation, such a peak intensity is that which reliable operation can be maintained for extended periods, limited for example by thermal management considerations. However, for short periods, for example less than one second, the luminous intensity can be increased somewhat due to the limited heating constraints of short time periods. Thus, windows 390 may be overdriven for a short time period, while windows 392, 394 are ramped down and up respectively during the same time period. In comparison to the arrangement of FIGS. 44A-44E, the luminance during switching of the respective optical windows may be maintained to a greater accuracy, while maximizing display brightness.

It may be desirable to extend the longitudinal viewing freedom of the display.

Figure 46A:
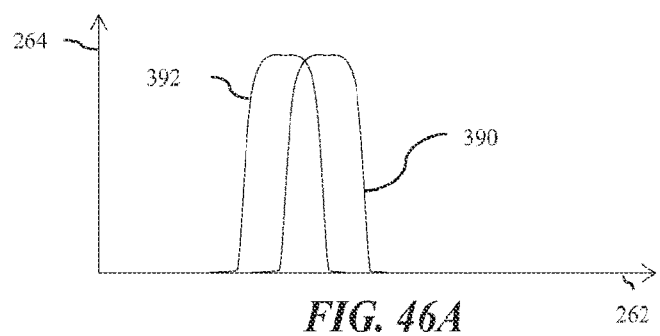
FIGS. 46A-46C are schematic diagrams illustrating graphs of optical window luminous intensity against position in the window plane for a longitudinally moving observer in the display arrangement of FIG. 33A comprising two optical windows in detent positions for a second control method, in accordance with the present disclosure.
Figure 46B:
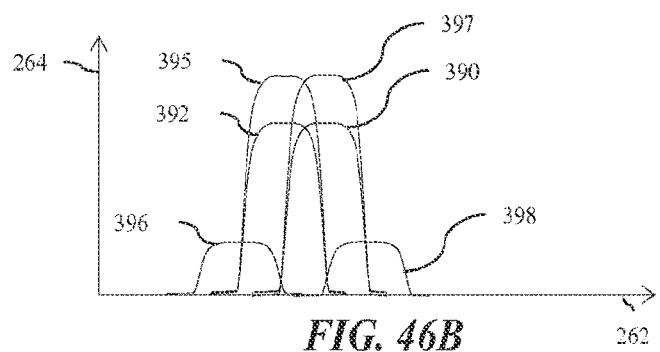
Figure 46C:
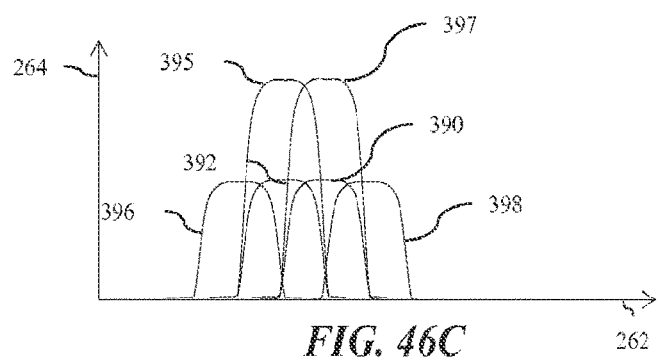

FIGS. 46A-46C are schematic diagrams illustrating graphs of optical window luminous intensity against position in the window plane for a longitudinally moving observer in the display arrangement of FIG. 33C comprising two optical windows in detent positions for a second control method. As an observer moves away from the window plane 106, the number of LEDs that are required to be displayed may increase. Thus the peak intensity of windows 390, 392 may be reduced, while windows 396, 398 may be introduced. Advantageously the display may be viewable from a wider range of viewing positions.

Figure 47:
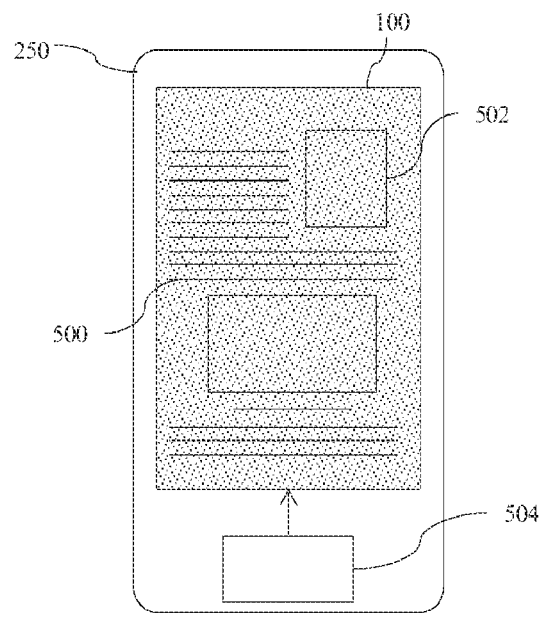
FIG. 47 is a schematic diagram illustrating a directional display operating in a wide angle or low luminance directional mode, in accordance with the present disclosure.

FIG. 47 is a schematic diagram illustrating a directional display operating in a wide angle or low luminance directional mode. A display apparatus 250 may comprise a spatial light modulator 48, a backlight 100 arranged to illuminate the entire area of the spatial light modulator 48. A control system 504 is arranged to control the transmittance of the spatial light modulator 48 in accordance with input image data to display an image that may comprise at least a first region 500 and a second region 502.

As described above, directional displays are capable of achieving high display luminance in limited viewing cones for a given power consumption in comparison to conventional non-directional displays. It may be desirable to achieve enhanced image presentation characteristics using such capability. Particularly, it may be desirable to achieve regions of image that have very high luminance in comparison to background image regions to grab and hold viewer attention, for example for use in advertising applications.

Figure 48:
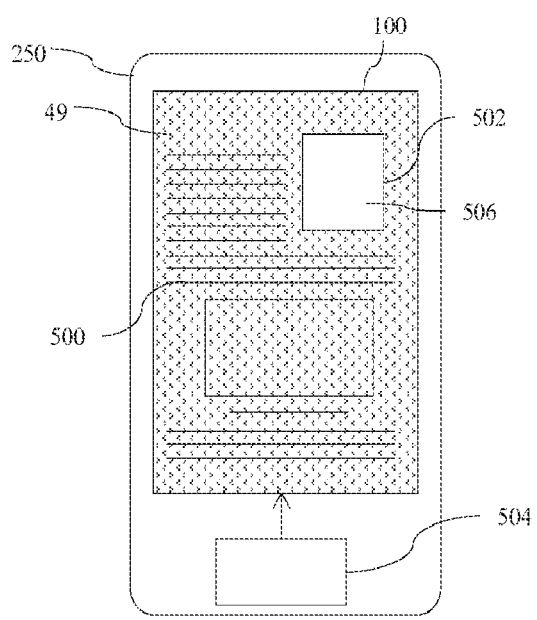
FIG. 48 is a schematic diagram illustrating a directional display operating in a high luminance directional mode, in accordance with the present disclosure.

FIG. 48 is a schematic diagram illustrating a directional display operating in a high luminance directional mode. In this mode the display is arranged so that the perceived luminance of the region 502 is greater than the luminance in the region 500.

The control system 504 is arranged to control the brightness of the backlight 100, the control system 504 being arranged to operate in at least a first mode, corresponding to FIG. 47 and second mode, corresponding to FIG. 48.

In the first mode, the control system 504 is arranged to control the brightness of the backlight 100 to a first brightness level and to control the transmittance of the spatial light modulator 48 in accordance with the input image data with a relationship between the input data and the transmittance of the spatial light modulator 48 that is the same across the image 500.

In the second mode, the control system 504 is arranged to control the brightness of the backlight 100 to a second brightness level greater than the first brightness level, and to control the transmittance of the spatial light modulator 48 in accordance with the input image data with relationships between the input data and the transmittance of the spatial light modulator that are different in different regions of the image. In other words, in the second mode as shown in FIG. 48 the backlight brightness is increased; such an increase raises the input luminance across the whole of the display area. However the grey scale control of the spatial light modulator 48 is adjusted so that the output luminance is different for the region 500 and 502. In this manner, the luminance of the region 506 may be much greater than the region 500 outside the region 502.

Further in the second mode, the control system 504 may be arranged to control the transmittance of the spatial light modulator 48 in accordance with the input image data with a relationship between the input data and the transmittance of the spatial light modulator 48 in at least one highlighted region 502 of the image that is the same as the relationship in the first mode. The control system 504 may be further arranged to control the transmittance of the spatial light modulator 48 in accordance with the input image data with a relationship between the input data and the transmittance of the spatial light modulator 48 in at least one non-highlighted region 500 of the image that is scaled to have a peak transmittance that is lower than the peak transmittance of the relationship in the first mode.

Thus the perceived luminance characteristics such as gamma and peak luminance in the second mode may be the same for region 500 that is the same as the luminance characteristics of the region 500 in the first mode.

Figure 49:
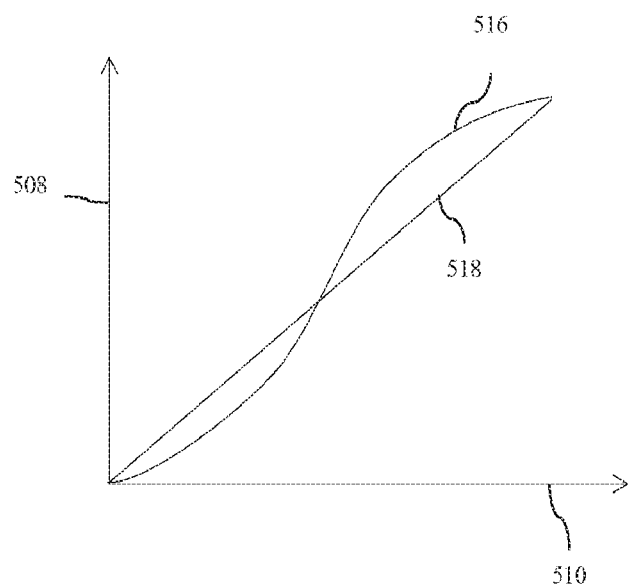
FIG. 49 is a schematic diagram illustrating a graph of output image greyscale against input image greyscale in a wide angle or low luminance directional mode, in accordance with the present disclosure.

FIG. 49 is a schematic diagram illustrating a graph of output image greyscale 508 against input image greyscale 510 in a first mode such as a wide angle or low luminance directional mode. Input and output grey scales may vary for example from 0 to 255 and the relationship between the two may be linear as shown by profile 518 or may have some other shape such as S-curve 516.

Figure 50:
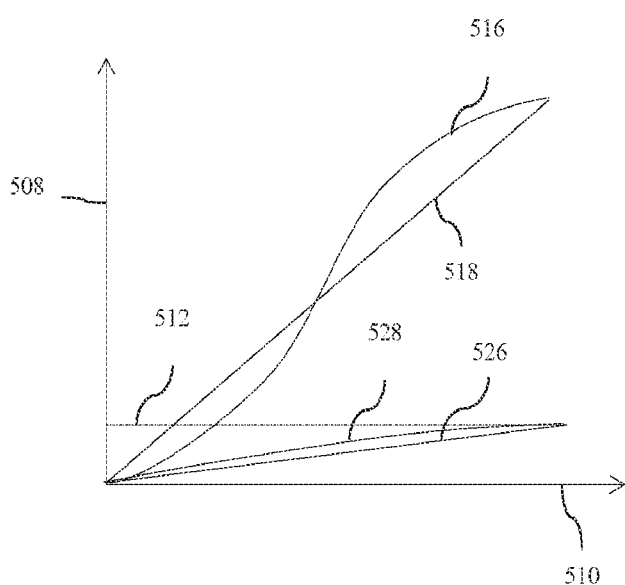
FIG. 50 is a schematic diagram illustrating a graph of output image greyscale against input image greyscale in a high luminance directional mode, in accordance with the present disclosure.

FIG. 50 is a schematic diagram illustrating a graph of output image greyscale 508 against input image greyscale 510 in a second mode such as a high luminance directional mode. In the non-highlighted region 500, the luminance profiles 526 or 528 may be applied to the grey scale mapping function whereas in the highlight region 502, the same profiles 516 or 518 may be applied as used in the first mode. The relationship between the input data and the transmittance of the spatial light modulator 48 in the at least one non-highlighted region of the image is scaled down to have a peak transmittance that is lower than the peak transmittance of the relationship in the first mode by a factor equal to the ratio of the second brightness level to the first brightness level. The scaling of the peak brightness between the highlighted region 502 and non-highlighted region 500 may be represented by the line 512. At this output greyscale, the output luminance of the pixels with peak luminance characteristics are set to map from peak input luminance grey scale.

Figure 51:
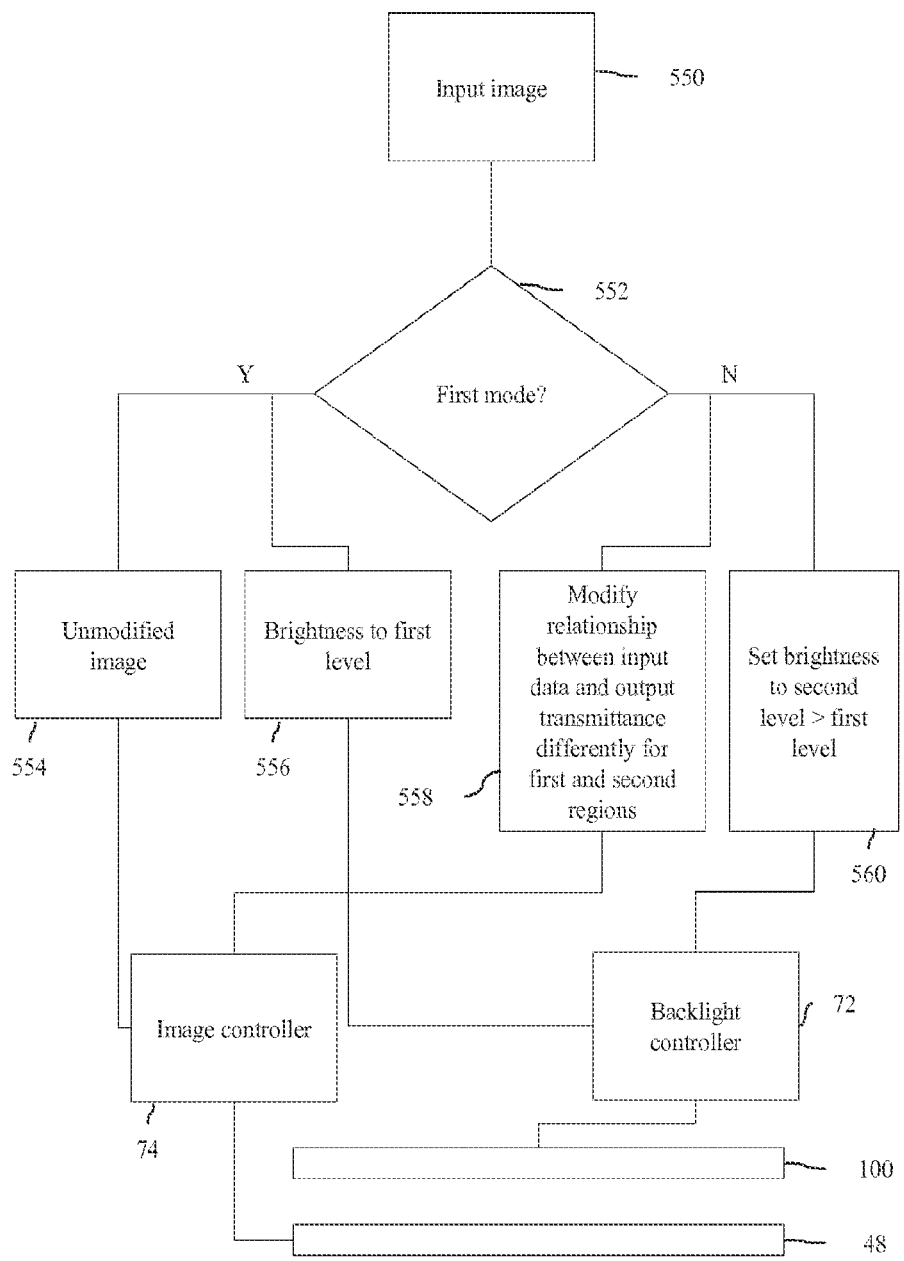
FIG. 51 is a schematic diagram illustrating a control system for a directional display system arranged to provide first image regions with unmodified luminance and second authorized image regions with high luminance, in accordance with the present disclosure.

FIG. 51 is a schematic diagram illustrating a control system for a directional display system arranged to provide first image regions with unmodified luminance and second authorized image regions with high luminance. A method of controlling a display apparatus that comprises a spatial light modulator 48 and a backlight 100 arranged to illuminate the entire area of the spatial light modulator 48, may comprise in the first mode, controlling the brightness of the backlight 100 to a first brightness level and controlling the transmittance of the spatial light modulator 48 in accordance with input image data to display an image with a relationship between the input data and the transmittance of the spatial light modulator 48 that is the same across the image. Thus the image input step 550 is provided and a decision step 552 is provided to provide determination of whether the first or second mode is requested. The request may be means of a user selection, or may be from a content provider, for example an advertiser. If the first mode is requested then the image may be unmodified in step 554 and the brightness may be set to a first level in step 556. The image data and brightness level may be directed to image and backlight controllers 74, 72 respectively.

In the second mode, the method may comprise controlling the brightness of the backlight 100 to a second brightness level greater than the first brightness level, and controlling the transmittance of the spatial light modulator 48 in accordance with input image data to display an image with relationships between the input data and the transmittance of the spatial light modulator 48 that are different in different regions of the image. Thus in the step 552, the second mode may be selected and in step 558 the relationship between the input data and output transmittance may be modified differently for first and second regions of the image. Further in step 560, the brightness of the backlight 100 may be controlled to provide a second level that is greater than the level for the first mode.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

It should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A directional backlight apparatus comprising:
a directional backlight comprising
a waveguide comprising first and second, opposed guide surfaces for guiding input light along the waveguide, and
an array of light sources arranged to generate the input light at different input positions in a lateral direction across the waveguide,
the waveguide further comprising a reflective end for reflecting the input light back through the waveguide, the second guide surface being arranged to deflect light after reflection from the reflective end as output light through the first guide surface, and the waveguide being arranged to direct the output light into optical windows in output directions that are distributed in the lateral direction in dependence on the input position of the input light; and
a sensor system arranged to detect a position of a head of an observer; and
a control system arranged to selectively operate a group of adjacent light sources to direct light into a corresponding group of adjacent optical windows, in a manner in which the identity of the light sources in the group varies, and for a given group of light sources the luminous flux of the light sources varies, in accordance with the detected position of the head of the observer.

2. A directional backlight apparatus according to claim 1, wherein the luminous flux of the light sources varies across a transitional range of the detected position of the head of the observer.

3. A directional backlight apparatus according to claim 2, wherein a new light source is operated as a member of the group of adjacent light sources with a luminous flux that increases as the detected position of the head of the observer moves towards the output direction corresponding to the new light source.

4. A directional backlight apparatus according to claim 3, wherein a light source is operated at an end of the group of adjacent light sources opposite from the new light source with a luminous flux that decreases as the detected position of the head of the observer moves towards the output direction corresponding to the new light source.

5. A directional backlight apparatus according to claim 2, wherein, across ranges of the detected position of the head of the observer intermediate to the transitional ranges, the identity and luminous flux of the light sources in the group does not vary.

6. A directional backlight apparatus according to claim 1, wherein the first guide surface is arranged to guide light by total internal reflection and the second guide surface comprises a plurality of light extraction features oriented to direct light guided through the waveguide in directions allowing exit through the first guide surface as the output light and intermediate regions between the light extraction features that are arranged to guide light through the waveguide.

7. A directional backlight apparatus according to claim 6, wherein the second guide surface has a stepped shape comprising facets, that are said light extraction features, and the intermediate regions.

8. A directional backlight apparatus according to claim 6, wherein the light extraction features have positive optical power in the lateral direction.

9. A directional backlight apparatus according to claim 1, wherein
the first guide surface is arranged to guide light by total internal reflection and the second guide surface is substantially planar and inclined at an angle to direct light in directions that break that total internal reflection for outputting light through the first guide surface, and
a deflection element extending across the first guide surface of the waveguide is arranged to deflect light towards the normal to the first guide surface.

10. A directional backlight apparatus according to claim 1, wherein the reflective end has positive optical power in the lateral direction.

11. A display apparatus comprising:
a backlight apparatus according to any claim 1; and
a transmissive spatial light modulator arranged to receive the output light from the first guide surface of the waveguide and to modulate it to display an image.

12. A display apparatus according to claim 11, being an autostereoscopic display apparatus wherein the control system is further arranged to control the spatial light modulator to display temporally multiplexed left and right images and synchronously to selectively operate groups of adjacent light sources to direct the displayed left and right images into respective groups of adjacent optical windows in positions corresponding to left and right eyes of an observer.

13. A directional display apparatus comprising:
a directional display device capable of directing output light selectively into optical windows of a set of optical windows in output directions that are distributed across the display device; and
a control system arranged to control the display device to direct the output light into at least one selected optical window of the set,
the directional display apparatus being arranged to sense a disposition of a hand of an observer, the control system being arranged to change the control of the display device in response to the sensed disposition of the hand of the observer.

14. A directional display apparatus according to claim 13, wherein the control system is arranged to shift the at least one selected optical window across the set in response to the directional display apparatus sensing movement of the hand of the observer across the display device in the direction in which the output directions are distributed.

15. A directional display apparatus according to claim 14, wherein the control system is arranged to change the brightness of the at least one selected optical window in response to the directional display apparatus sensing movement of the hand of the observer across the display device in a direction perpendicular to the direction in which the output directions are distributed.

16. A directional display apparatus according to claim 13, wherein the control system is arranged to change the number of optical windows that are selected in response to the directional display apparatus sensing a change in separation of fingers of the hand of the observer.

17. A directional display apparatus according to claim 13, wherein the directional display device is a touch-sensitive directional display device that is arranged to sense the disposition of the hand of the observer in proximity to the directional display device.

18. A directional display apparatus according to claim 13, further comprising:
an image sensor system arranged to sense the disposition of the hand of the observer.

19. A directional display apparatus according to claim 13, wherein the directional display device comprises:
a directional backlight capable of directing output light selectively into said optical windows; and
a transmissive spatial light modulator arranged to receive the output light from the directional backlight and to modulate it to display an image.

20. A directional display apparatus according to claim 19, wherein the directional backlight comprises:
a waveguide comprising first and second, opposed guide surfaces for guiding input light along the waveguide; and
an array of light sources arranged to generate the input light at different input positions in a lateral direction across the waveguide,
the waveguide further comprising a reflective end for reflecting input light back through the waveguide, the second guide surface being arranged to deflect light after reflection from the reflective end as output light through the first guide surface, and the waveguide being arranged to direct the output light into optical windows in output directions that are distributed in the lateral direction across the display device in dependence on the input position of the input light.

21. A directional display apparatus according to claim 20, wherein the first guide surface is arranged to guide light by total internal reflection and the second guide surface comprises a plurality of light extraction features oriented to direct light guided through the waveguide in directions allowing exit through the first guide surface as the output light and intermediate regions between the light extraction features that are arranged to guide light through the waveguide.

22. A directional display apparatus according to claim 21, wherein the second guide surface has a stepped shape comprising facets, that are said light extraction features, and the intermediate regions.

23. A directional display apparatus according to claim 21, wherein the light extraction features have positive optical power in the lateral direction.

24. A directional display apparatus according to claim 20, wherein
the first guide surface is arranged to guide light by total internal reflection and the second guide surface is substantially planar and inclined at an angle to direct light in directions that break that total internal reflection for outputting light through the first guide surface, and the display device further comprises a deflection element extending across the first guide surface of the waveguide for deflecting light towards the normal to the first guide surface.

25. A directional display apparatus according to claim 20, wherein the reflective end has positive optical power in the lateral direction.

26. A display apparatus according to claim 19, being an autostereoscopic display apparatus wherein the control system is further arranged to control the spatial light modulator to display temporally multiplexed left and right images and synchronously to control the directional backlight to direct the output light of the left and right images into respective at least one selected optical windows in positions corresponding to left and right eyes of an observer.

27. A directional display apparatus according to claim 13, further comprising a sensor system arranged to detect the position of the head of the observer, the control system being arranged to change the control of the display device in response to the sensed disposition of the hand of the observer and to the detected position of the head of the observer.

28. A display apparatus comprising:
a spatial light modulator;
a backlight arranged to illuminate the entire area of the spatial light modulator; and
a control system arranged to control the transmittance of the spatial light modulator in accordance with input image data to display an image, and further arranged to control the brightness of the backlight,
the control system being arranged to operate in at least a first and second mode, wherein
in the first mode, the control system is arranged to control the brightness of the backlight to a first brightness level and to control the transmittance of the spatial light modulator in accordance with the input image data with a relationship between the input data and the transmittance of the spatial light modulator that is the same across the image, and
in the second mode, the control system is arranged to control the brightness of the backlight to a second brightness level greater than the first brightness level, and to control the transmittance of the spatial light modulator in accordance with the input image data with relationships between the input data and the transmittance of the spatial light modulator that are different in different regions of the image.

29. A display apparatus according to claim 28, wherein in the second mode, a relationship between the input data and the transmittance of the spatial light modulator in at least one highlighted region of the image is the same as the relationship in the first mode.

30. A display apparatus according to claim 29, wherein in the second mode, a relationship between the input data and the transmittance of the spatial light modulator in at least one non-highlighted region of the image is scaled to have a peak transmittance that is lower than the peak transmittance of the relationship in the first mode.

31. A display apparatus according to claim 30, wherein the peak transmittance of the relationship in the second mode is lower than the peak transmittance of the relationship in the first mode by a factor equal to the ratio of the second brightness level to the first brightness level.

32. A display apparatus according to claim 28, wherein the backlight is a directional backlight that is capable of directing output light selectively into optical windows of a set of optical windows in output directions that are distributed across the display apparatus, the control system being arranged to control the backlight to direct output light into at least one selected optical window of the set.

33. A display apparatus according to claim 32, wherein the backlight comprises:
   a waveguide comprising first and second, opposed guide surfaces for guiding input light along the waveguide;
   an array of light sources arranged to generate the input light at different input positions in a lateral direction across the waveguide,
   the waveguide further comprising a reflective end for reflecting input light back through the waveguide, the second guide surface being arranged to deflect light after reflection from the reflective end as output light through the first guide surface, and the waveguide being arranged to direct the output light into optical windows in output directions that are distributed in the lateral direction across the display apparatus in dependence on the input position of the input light.

34. A display apparatus according to claim 33, wherein the first guide surface is arranged to guide light by total internal reflection and the second guide surface comprises a plurality of light extraction features oriented to direct light guided through the waveguide in directions allowing exit through the first guide surface as the output light and intermediate regions between the light extraction features that are arranged to guide light through the waveguide.

35. A display apparatus according to claim 34, wherein the second guide surface has a stepped shape comprising facets, that are said light extraction features, and the intermediate regions.

36. A display apparatus according to claim 34, wherein the light extraction features have positive optical power in the lateral direction.

37. A display apparatus according to claim 33, wherein the first guide surface is arranged to guide light by total internal reflection and the second guide surface is substantially planar and inclined at an angle to direct light in directions that break that total internal reflection for outputting light through the first guide surface, and the display apparatus further comprises a deflection element extending across the first guide surface of the waveguide for deflecting light towards the normal to the first guide surface.

38. A display apparatus according to claim 33, wherein the reflective end has positive optical power in the lateral direction.

39. A display apparatus according to claim 32, further comprising a sensor system arranged to detect a position of a head of an observer, the control system being arranged to control the display apparatus to direct output light into at least one selected optical window of the set, selected in response to the detected position of the head of the observer.

40. A display apparatus according to claim 32, being an autostereoscopic display apparatus wherein the control system is further arranged to control the spatial light modulator to display temporally multiplexed left and right images and synchronously to control the backlight to direct the output light of the left and right images into respective at least one selected optical windows in positions corresponding to left and right eyes of an observer.

41. A method of controlling a display apparatus that comprises a spatial light modulator and a backlight arranged to illuminate the entire area of the spatial light modulator, the method comprising:
   in a first mode, controlling the brightness of the backlight to a first brightness level and controlling the transmittance of the spatial light modulator in accordance with input image data to display an image with a relationship between the input data and the transmittance of the spatial light modulator that is the same across the image; and
   in a second mode, controlling the brightness of the backlight to a second brightness level greater than the first brightness level, and controlling the transmittance of the spatial light modulator in accordance with input image data to display an image with relationships between the input data and the transmittance of the spatial light modulator that are different in different regions of the image.

* * * * *